(12) United States Patent
Agee

(10) Patent No.: US 10,917,268 B2
(45) Date of Patent: Feb. 9, 2021

(54) ADAPTIVE EXCISION OF CO-CHANNEL INTERFERENCE USING NETWORK SELF COHERENCE FEATURES

(71) Applicant: Brian G. Agee, San Jose, CA (US)

(72) Inventor: Brian G. Agee, San Jose, CA (US)

(*) Notice: Subject to any disclaimer, the term of this patent is extended or adjusted under 35 U.S.C. 154(b) by 0 days.

(21) Appl. No.: 16/239,097

(22) Filed: Jan. 3, 2019

(65) Prior Publication Data
US 2019/0140872 A1 May 9, 2019

Related U.S. Application Data

(63) Continuation of application No. 15/219,145, filed on Jul. 25, 2016, now Pat. No. 10,177,947.

(60) Provisional application No. 62/282,064, filed on Jul. 24, 2015.

(51) Int. Cl.
| | |
|---|---|
| H04L 25/08 | (2006.01) |
| H04W 52/52 | (2009.01) |
| H04W 28/14 | (2009.01) |
| H04B 7/06 | (2006.01) |
| H04L 27/26 | (2006.01) |

(52) U.S. Cl.
CPC .......... *H04L 25/08* (2013.01); *H04B 7/0617* (2013.01); *H04L 27/264* (2013.01); *H04W 28/14* (2013.01); *H04W 52/52* (2013.01)

(58) Field of Classification Search
CPC ..... H04B 7/0617; H04L 25/08; H04L 27/264; H04L 43/028; H04W 28/14; H04W 52/52
See application file for complete search history.

(56) References Cited

U.S. PATENT DOCUMENTS

| | | | |
|---|---|---|---|
| 5,225,210 A | 10/1993 | Gardner et al. | |
| 5,299,148 A * | 3/1994 | Gardner | H04B 7/0854 342/378 |
| 5,875,216 A | 2/1999 | Martin | |
| 5,887,037 A | 3/1999 | Golden et al. | |
| 5,887,038 A | 3/1999 | Golden et al. | |
| 5,982,327 A | 11/1999 | Vook et al. | |

(Continued)

OTHER PUBLICATIONS

S. Schell, B. Agee, "Application of the SCORE Algorithm and SCORE Extensions to Sorting in the Rank-L Spectral Self-Coherence Environment," in Proc. Twenty-Second Asilomar Conf. Signals, Systems, Comp., Nov. 1988.

(Continued)

*Primary Examiner* — Freshteh N Aghdam
(74) *Attorney, Agent, or Firm* — Steven J Shattil

(57) ABSTRACT

An apparatus and digital signal processing means are disclosed for excision of co-channel interference from signals received in crowded or hostile environments using spatial/polarization diverse arrays, which reliably and rapidly identifies communication signals with transmitted features that are self-coherent over known framing intervals due to known attributes of the communication network, and exploits those features to develop diversity combining weights that substantively excise that co-channel interference from those communication signals, based on differing diversity signature, timing offset, and carrier offset between the network signals and the co-channel interferes. In one embodiment, the co-channel interference excision is performed in an appliqué that can be implemented without coordination with a network transceiver.

20 Claims, 18 Drawing Sheets

(56) References Cited

U.S. PATENT DOCUMENTS

| | | | |
|---|---|---|---|
| 6,038,272 | A | 3/2000 | Golden et al. |
| 6,441,786 | B1* | 8/2002 | Jasper .................. H01Q 3/2605 342/380 |
| 6,519,477 | B1 | 2/2003 | Baier et al. |
| 6,985,466 | B1 | 1/2006 | Yun et al. |
| 7,299,071 | B1 | 11/2007 | Barratt et al. |
| 7,894,554 | B2 | 2/2011 | Kim et al. |
| 2003/0031234 | A1 | 2/2003 | Smee et al. |
| 2006/0128310 | A1* | 6/2006 | Leabman ............. H04B 7/0669 455/63.1 |
| 2006/0209761 | A1* | 9/2006 | Moshavi ............. H04B 1/7085 370/331 |

OTHER PUBLICATIONS

B. Agee, S. Schell, W. Gardner, "Self-Coherence Restoral: A New Approach to Blind Adaptive Signal Extraction Using Antenna Arrays," IEEE Proceedings, vol. 78, No. 4, pp. 753-767, Apr. 1990.

E. Franke, "UHF SATCOM Downlink Interference for the Mobile Platform," in Proc. 1996 IEEE Military Comm. Conf., vol. 1, pp. 22-28, Oct. 1996.

C. Creusere, S. Mitra, "A Simple Method for Designing High-Quality Prototype Filters for M-Band Pseudo QMF Banks," IEEE Trans. Signal Processing, vol. 43, No. 4, pp. 1005-1007, Apr. 1995.

S. MacMullen, B. Strachan, "Interference on UHF SATCOM Channels," in Proc. 1999 IEEE Military Comm. Conf., pp. 1141-1144, Oct. 1.

T. Karp, H. Fliege, "Modified DFT Filter Banks with Perfect Reconstruction," IEEE Trans. Circuits Systems—II: Analog and Digital Signal Proc., vol. 46, No. 11, Nov. 1999.

J. Sadowsky, D. Lee, "The MUOS-WCDMA Air Interface," in Proc. 2007 IEEE Military Comm. Conf., pp. 1-6, Oct. 2007.

A. Kumar, G. Singh, R. Anand, "Near Perfect Reconstruction Quadrature Mirror Filter," International Journal Computer Science and Engineering, vol. 2, No. 3, pp. 121-123, Feb. 2008.

P. Okrah, R. Bahr, "Channel and Interference Mitigation in the MUOS Base-to-User Link," in Proc. IEEE Military Comm. Conf., 2008, Nov. 2008.

N. Butts, "MUOS Radio Resource Management Algorithms," in Proc. IEEE Military Comm. Conf., 2008, Nov. 2008.

Federal Spectrum Use Summary: 30 Mhz-3000 GHz, National Telecommunications and Information Administration Office of Spectrum Management, Jun. 2010.

M. G. Amin, and Wei Sun, "A Novel Interference Suppression Scheme for Global Navigation Satellite Systems Using Antenna Array," IEEE Journal on Selected Areas in Communications, vol. 23, No. 5, pp. 999-1012, May 2005.

M. Sahmoudi, M. Amin, "A Maximum-Likelihood Synchronization Scheme for GPS Positioning in Multipath, Interfer-ence, and Weak Signal Environments," in Proc. IEEE Vehicular Technology Conference, Sep. 2006, pp. 1-5.

P. Li, D. Lu, R. Wu, Z. Su, W. Huang, "Adaptive Anti-Jamming Algorithm Based on the Spatial and Temporal Character-istics of GPS Signal," in Proc. Asia-Pacific Conference on Communications, Oct. 2007, pp. 193-196.

A.S. Besicovich; Almost Periodic Functions, Dover Publications, Inc. and Cambridge University Press, 1954.

W.A. Gardner, Intro. to Random Processes, With Application to Signals and Systems, MacMillan Pub. Co., NY 1986.

J. Brom, "The theory of almost periodic functions in constructive mathematics"; Pacific Journal of Mathematics, vol. 70, No. 1, 1977, pp. 67-81.

W.A. Gardner, Statistical Spectral Analysis: A Nonprobabalistic Theory, Prentice Hall, 1988.

* cited by examiner

Exemplary Analyzer/Synthesizer Parameters, 29.568 Msps Analyzer Input Rate

| Number analyzer channels | 32 | 64 | 128 | 256 | 512 |
|---|---|---|---|---|---|
| Channel separation | 924 kHz | 462 kHz | 231 kHz | 115.5 kHz | 57.75 kHz |
| Output sample rate | 1,838 ksps | 924 ksps | 462 ksps | 231 ksps | 115.5 ksps |
| Samples/channel/frame | 18,380 | 9,240 | 4,620 | 2,310 | 1,155 |
| Decimator FFT size | 16 | 32 | 64 | 128 | 256 |
| Prototype filter taps | 192 | 384 | 768 | 1,536 | 3,072 |
| Complexity* | 1.76 Gcps | 1.88 Gcps | 1.99 Gcps | 2.11 Gcps | 2.22 Gcps |
| Active channels/subband | 5 | 10 | 20 | 40 | 80 |
| Active channels, subband 0 | -10:-6 | -20:-11 | -40:-21 | -81:-42 | -163:-83 |
| Active channels, subband 1 | -4:0 | -9:0 | -19:0 | -38:+1 | -76:+4 |
| Active channels, subband 2 | +1:+5 | +2:+11 | +3:+22 | +6:+45 | +10:+90 |
| Active channels, subband 3 | +7:+11 | +13:+22 | +25:+44 | +49:+88 | +97:+177 |

*Total real adds and multiplies, ½ cycle per real add and per real multiply

Figure 8

Summary of FC-FSFE Processing Requirements Per Subband, DSP Mcps (cycles/µs)

| Operation | 64×2 FSFE | 32×4 FSFE | 16×8 FSFE | 8×16 FSFE | Comments |
|---|---|---|---|---|---|
| Input data | 0.00 | 0.00 | 0.00 | 0.00 | N/A |
| FSFE statistics generation | 111.23 | 128.41 | 138.72 | 147.32 | All |
| FSFE surface generation | 15.21 | 36.16 | 76.90 | 181.29 | Acq only |
| FC-FSFE spectrum generation | 0.29 | 0.57 | 1.15 | 2.29 | Acq only |
| FC-FSFE spectrum optimization | 17.44 | 33.12 | 64.49 | 127.22 | All |
| Spatial signature estimation | 11.50 | 11.50 | 11.50 | 11.50 | All |
| FC-BFN estimation | 1.07 | 1.07 | 1.07 | 1.07 | All |
| FC-FSFE acquisition | 156.74 | 210.83 | 293.83 | 470.69 | All |
| FC-FSFE tracking | 141.24 | 174.10 | 215.78 | 287.11 | Non-acq |

Figure 17

Summary of FC-FSFE Memory Requirements Per Subband, KB (1,024B)

| Operation | 64×2 FSFE | 32×4 FSFE | 16×8 FSFE | 8×16 FSFE | Comments |
|---|---|---|---|---|---|
| Data from FPGA | 716.00 | 716.00 | 716.00 | 716.00 | 4B/rail |
| FSFE statistics generation | 59.17 | 338.80 | 1,054.80 | 3,560.80 | All |
| FSFE surface generation | 25.72 | 51.45 | 102.91 | 205.85 | Acq only |
| FC-FSFE spectrum generation | 0.04 | 0.05 | 0.09 | 0.15 | Acq only |
| FC-FSFE spectrum optimization | 6.43 | 6.43 | 6.43 | 6.43 | All |
| Spatial signature estimation | 7.15 | 7.15 | 7.15 | 7.15 | All |
| FC-BFN estimation | 5.59 | 5.59 | 5.59 | 5.59 | All |
| FC-FSFE acquisition | 462.10 | 767.47 | 1,534.97 | 4,143.97 | All |
| FC-FSFE tracking | 436.34 | 715.97 | 1,431.97 | 3,937.97 | Non-acq |

Figure 18

ADAPTIVE EXCISION OF CO-CHANNEL INTERFERENCE USING NETWORK SELF COHERENCE FEATURES

CROSS-REFERENCE TO RELATED APPLICATIONS

This application is a Continuation of U.S. patent application Ser. No. 15/219,145, titled INTERFERENCE-EXCISING DIVERSITY RECEPTION FEATURES USING FRAME SYNCHRONOUS SIGNAL FEATURES AND ATTRIBUTES, filed on Jul. 24, 2016, now U.S. Pat. No. 10,177,947, which claims priority to U.S. Provisional Patent Application Ser. No. 62/282,064, titled DIVERSITY RECEIVER ADAPTATION USING FRAME SYNCHRONOUS SIGNAL FEATURES, filed on Jul. 24, 2015, all of which are hereby incorporated by reference in their entireties and all of which this application claims priority under at least 35 U.S.C. 120 and/or any other applicable provision in Title 35 of the United States Code.

GOVERNMENT RIGHTS

A portion of the work was done in conjunction with efforts as a subcontractor to a governmental contract through S.A. Photonics, Inc. and any required governmental licensing therefrom shall be embodied in any resulting utility patent(s), depending on identity of the accepted and approved claims thereof, with the governmentally-funded work.

FIELD OF THE INVENTION

This is an improvement in the field of multiple-user, mobile, electromagnetic signals processed through digital computational hardware (a field more publically known as 'digital signals processing' or DSP). The hardware environment necessarily incorporates receiving elements to sense the electromagnetic waves in the proper sub-set of the electromagnetic (EM) spectra (frequencies), analog-to-digital converter (ADC) elements to transform the electromagnetic waves into digital representations thereof, computational and memory and comparative processing elements for the digital representations (or 'data'), and a number of implementation and use-specific digital and analog processing elements comprising beamforming, filtering, buffering (for frames and weights), which may be in the form of field-programmable gate arrays (FPGAs), electronically erasable and programmable read-only memory (EEPROM), application specific integrated circuits (ASIC) or other chips or chipsets, to remove interference and extract one or more signals of interest from the electromagnetic environment. In one embodiment, the invention also includes digital-to-analog converter (DAC) elements and frequency conversion elements to convert digital representations of the extracted signals to outgoing analog electromagnetic waves for subsequent reception by conventional radio equipment.

BACKGROUND OF THE INVENTION

Commercial and military wireless communication networks continue to be challenged by the increasingly dense and dynamic environments in which they operate. Modern commercial radios in these networks must receive, detect, extract, and successfully demodulate signals of interest (SOI's) to those radios in the presence of time and frequency coincident emissions from both fixed and mobile transmitters. These emissions can include both "multiple-access interference" (MAI), emitted from the same source or other sources in the radio's field of view (FoV), possessing characteristics that are nearly identical to the intended SOI's; and signals not of interest (SNOI's), emitted by sources unrelated to the intended SOI's, e.g., in unlicensed communication bands, or at edges of dissimilar networks, possessing characteristics that are completely different than those signals. In many cases, these signals can be quite dynamic in nature, both appearing and disappearing abruptly in the communications channel, and varying in their power level (e.g., due to power management protocols) and internal characteristics (e.g., transmission of special-purpose waveforms for synchronization, paging, or network acquisition purposes) over the course of a single transmission. The advent of machine-type communications (MTC) and machine-to-machine (M2M) communications for the Internet of Things (IoT) is expected to accelerate the dynamic nature of these transmissions, by increasing both the number of emitters in any received environment, and the burstiness of those emitters. Moreover, in groundbased radios and environments where the SOI or SNOI transmitters are received at low elevation angle, all of these emissions can be subject to dynamic, time-varying multipath that obscures or heavily distorts those emissions.

Radios in military communication networks encounter additional challenges that further compound these problems. In addition to multipath and unintended "benign" interference, these systems are also subject to intentional jamming designed to block communications between radios in the network. In many scenarios, they may be operating in geographical regions where they must contend with strong emissions from host country networks. Lastly, these radios must impose complex transmission security (TRANSEC) and communications security (COMSEC) protocols on their transmissions, in order to protect the radios and connected network from corruption, cooption, or penetration by malicious actors.

The Mobile User Objective System (MUOS), developed to provide the next-generation of tactical U.S. military satellite communications, is an example of such a network. The MUOS network comprises a fleet of geosynchronous MUOS satellite vehicles (SV's), which connects ground, air, and seabased MUOS tactical radios to MUOS ground stations ("segments") using "bent-pipe" transponders. The SV's receive signals from MUOS tactical radios over a 20 MHz (300-320 MHz) User-to-Base (U2B) band comprising four contiguous 5 MHz subbands, and transmit signals to MUOS tactical radios over a 20 MHz (360-380 MHz) "Base-to-User" (B2U) band comprising four contiguous 5 MHz subbands, using a physical layer (PHY) communication format based heavily on the commercial WCDMA standard (in which the MUOS SV acts as a WCDMA "Base" or "Node B" and the tactical radios act as "User Equipment"), with modifications to provide military-grade TRANSEC and COMSEC to those radios, and with a simplified common pilot channel (CPICH), provided for SV detection, B2U PHY synchronization, and network acquisition purposes, which is repeated continuously over 10 ms MUOS frames so as to remove PHY signal components that could otherwise be selectively targeted by EA measures. Each MUOS satellite employs 16 "spot" beams covering different geographical regions of the Earth, which transmits a CPICH, control signals and information-bearing traffic signals to tactical radios in the same beam using CDMA B2U signals that are (nominally) orthogonal within each spot beam, i.e., which employ orthogonal spreading codes that allow complete removal of signals intended for other radios within that beam (in absence of multipath that may degrade that orthogonality); and which transmits CPICH, control signals, and traffic signals to radios in different beams using CDMA B2U signals and CPICH's that are nonorthogonal between spot beams, i.e., which employ nonorthogonal "Gold code" scrambling codes that provide imperfect separation of signals "leaking through" neighboring beams. In some network instantiations, multiple MUOS SV's may be visible to tactical radios and transmitting signals in the same B2U band or subbands, using nonorthogonal scrambling codes that provide imperfect separation of signals from those satellites. Hence, the MUOS network is subject to MAI from adjacent beams and SV's (Interference "Other Beam" and "Other Satellite"), as well as in-beam MAI in the presence of multipath (Interference "In-Beam"). See N. Butts, "MUOS Radio Management Algorithms," in in *Proc. IEEE Military Comm. Conf.*, 2008, November 2008" (Butts 2008) for a description of this interference. Moreover, the MUOS system is deployed in the same band as other emitters, including narrowband "legacy" tactical SatCom signals transmitted from previous generation networks, e.g., the UHF Follow-On (UFO) network, and is subject to both wideband co-channel interference (WBCCI) and narrowband CCI (NBCCI) from a variety of sources. See [E. Franke, "UHF SATCOM Downlink Interference for the Mobile Platform," in *Proc. 1996 IEEE Military Comm. Conf.*, Vol. 1, pp. 22-28, October 1996 (Franke 1996)] and [S. MacMullen, B. Strachan, "Interference on UHF SATCOM Channels," in *Proc. 1999 IEEE Military Comm. Conf.*, pp. 1141-1144 October 1999 (MacMullen 1999)] for a description of exemplary interferes. Lastly, the MUOS network is vulnerable to electronic attack (EA) measures of varying types, including jamming by strong WBCCI and spoofing by MUOS-like signals (also WBCCI), which may also be quite bursty in nature in order to elude detection by electronic countermeasures.

Developing hardware and software to receive, transmit, and above all make sense out of the intensifying 'hash' of radio signals received in these environments requires moving beyond the static and non-adaptive approaches implemented in prior generations of radio equipment. This requires the use of digital signal processing (DSP) methods that act on digital representations of analog received radio signals-in-space (SiS's), e.g., signals received by MUOS tactical radios, transformation between an analog representation and a digital representation thereof. Once in the digital domain, these signals can be operated on by sophisticated DSP algorithms that can detect, and demodulate SOI's contained within those signals at a precision that far exceeds the capabilities of analog processing. In particular, these algorithms can be used to excise even strong, dynamically varying CCI from those SOI's, at a precision that cannot be matched by fully or even partially analog interference excision systems (e.g., digitally-controlled analog systems).

For example, consider the environment described above, where a radio is receiving one or more SOI's in the presence of strong CCI, i.e., wideband SNOI's occupying the same band as those SOI's. Even SNOIs that are extremely strong (e.g. much stronger than any SOIs) can be removed from those received SOI's, by connecting the radio to multiple spatial or polarization diverse antenna feeds, e.g., multielement antenna arrays, that allow those SOI's and SNOI's to possess linearly-independent channel characteristics (e.g., strengths and phases) within the signals-in-space received on each feed, and using DSP which, by linearly combining (weighting and summing) those diverse feeds using diversity combiner weights that are preferentially calculated to substantively excise (cancel or remove) the SNOI's and maximize the power of each of the SOI's. This linear combining can be implemented using analog weighting and summing elements; however, such elements are costly and imprecise to implement in practice, as are the algorithms used to control those elements (especially if also implemented in analog form). This is especially true in scenarios where the interference is much stronger than the SOI's, requiring development of "null-steering" diversity combiners that must substantively remove the interferes without also substantively degrading the signal-to-noise ratio (SNR) of the SOI's. Moreover, analog linear combiners are typically only usable over wide bandwidths, e.g., MUOS bands or (at best) subbands, and can only separate as many SOI's and SNOI's as the number of receiver feeds in the system.

These limitations can be overcome by transforming the received signals-in-space from analog representation to digital representation, and then using digital signal processing to both precisely excise the CCI contained within those now-digital signals, e.g., using high-precision, digitally-implemented linear combiners, and to implementing methods for adapting those excision processors, e.g., to determine the weights used in those linear combiners. Moreover, the DSP based methods can allow simultaneous implementation of temporal processing methods, e.g., frequency channelization (analysis and synthesis filter banks) methods, to separately process narrowband CCI present in separate frequency bands, greatly increasing the number of interferes that can be excised by the system. DSP methods can react quickly to changes in the environment as interferes enter and leave the communication channel, or as the channel varies due to observed movement of the transmitter (e.g., MUOS SV), receiver, or interferes in the environment. Lastly, DSP methods facilitate the use of "blind" adaptation algorithms that can compute interference-excising or null-steering diversity weights without the need for detailed knowledge of the communication channel between the receiver and the SOI or SNOI transmitter (sometimes referred to as "channel state information," or CSI). This capability can be extremely important if the radio is operating in the presence of heavy multipath that could obscure that CSI, eliminates the need for complex calibration procedures to learn and maintain array calibration data (sometimes referred to as "array manifold data"), or for addition or exploitation of complex and easily corruptible communication protocols to allow the receive to learn that CSI.

In the following embodiments, this invention describes methods for accomplishing such interference excision, to aid operation of a MUOS tactical radio operating in the presence of NBCCI and WBCCI. The MUOS tactical radio is assumed to possess a fully functional network receiver, able to detect and synchronize to an element of that network, e.g., a MUOS SV; and perform all operations needed to receive, demodulate, and additionally process (e.g., descramble, despread, decode, and decrypt) signals transmitted from that network element, e.g., MUOS B2U downlink transmissions. The radio is also assumed to possess a fully functional network transmitter that can perform all operations needed to transmit signals which that network element can itself receive, demodulate and additionally process, e.g., MUOS U2B signals intended for a MUOS SV. The radio is also assumed to be capable of performing all ancillary functions needed for communication with the network, e.g., network access, association, and authentication operations; exchange of PHY attributes such as B2U and U2B Gold code scrambling keys; exchange of PHY channelization code assignments needed for transmission of control and traffic information to/from the radio and network element; and exchange of encryption keys allowing implementation of TRANSEC and COMSEC measures during such communications. In addition, the radio and DICE appliqué are assumed to require no intercommunication to perform their respective functions. That is, the operation of the appliqué is completely transparent to the radio, and vice verse.

In these embodiments, the set of receive antennas ('receive array') can have arbitrary placement, polarization diversity, and element shaping, except that at least one receive antenna must have polarization and element shaping allowing reception of the signal received from the network element, e.g., it must be able to receive right-hand circularly polarized (RHCP) emissions in the 360-380 MHz MUOS B2U frequency band, and in the direction of the MUOS satellite. Additionally, the receive array should have sufficient spatial, polarization, and gain diversity to allow excision of interference also received by the receive array, such that it can achieve an signal-to-interference-and-noise ratio (SINR) that is high enough to allow the radio to despread and demodulate the receive array output signal. The antennas that form the receive array attached to the DICE system can be collocated with the system or radio, or can be physically removed from the system and/or connected through a switching or feed network; in particular, the location, physical placement, and characteristics of these antennas can be completely transparent or unknown to the system, except that they should allow the receive array to achieve an SINR high enough to allow the radio to demodulate the network receive signals.

The use of FPGA architecture allows hardware to be implemented which can adapt or change (within broader constraints that ASIC implementations) to match currently experienced conditions; and to identify transmitted components in, and transmitted features of, a SOI and/or SNOI. Particularly when evaluating diversity or multipath transmissions, identifying a received (observed) feature may be exploited to distinguish SOI from SNOI(s). The use of active beamforming can enable meaningful interpretation of the signal hash by letting the hardware actively extract only what it needs—what it is listening for, the signal of interest (SOI)—out of all the noise to which that hardware is exposed to and experiencing. One such development is the Dynamic Interference Cancellation and Excision (DICE) Appliqué. For such complex, and entirely reality-constrained, operational hardware and embedded processing firmware, DSP adaptation implementations of algorithms can best provide usable and sustainable transformative computations and constraints that enable both the transformation of the environmental hash into the ignored noise and meaningful signal subsets, and the exchange of meaningful signals.

In its embodiments, the invention will provide and transform the digital and analog representations of the signal between a radio (that receives and sends the analog radio transmissions) and the digital signal processing and analyzing elements (that manage and work with the digital representations of the signal). While separation of specialized hardware for handling the analog and digital representations is established in the industry, that is not true for exploitation of the 10 ms periodicity within the transformation and representation processes, which both improves computational efficiency and escapes problems arising from GPS antijam approaches in the prior art, used in the present invention.

BRIEF DESCRIPTION OF THE DRAWINGS

The present invention is illustrated in the attached drawings explaining various aspects of the present invention, which include DICE hardware with embedded software ('firmware') and implementations of adaptation algorithms.

FIG. 8 summarizes exemplary Analyzer/Synthesizer Parameters for a 29.568 Msps Analyzer Input Rate, figuring the total real adds and multiplies at a ½ cycle per real add and real multiples, and expressing operations in giga (billions of) cycles-per-second (Gcps).

FIG. 17 shows a summary of FC-FSFE Processing Requirements Per Subband, measured in millions of cycles per microsecond (Mcps, or cycles/µs).

FIG. 18 shows a summary of FC-FSFE Memory Requirements Per Subband, measured in kilobytes (KB, 1 KB=1,024 bytes).

DETAILED DESCRIPTION OF EXEMPLARY EMBODIMENTS

Figure 1:
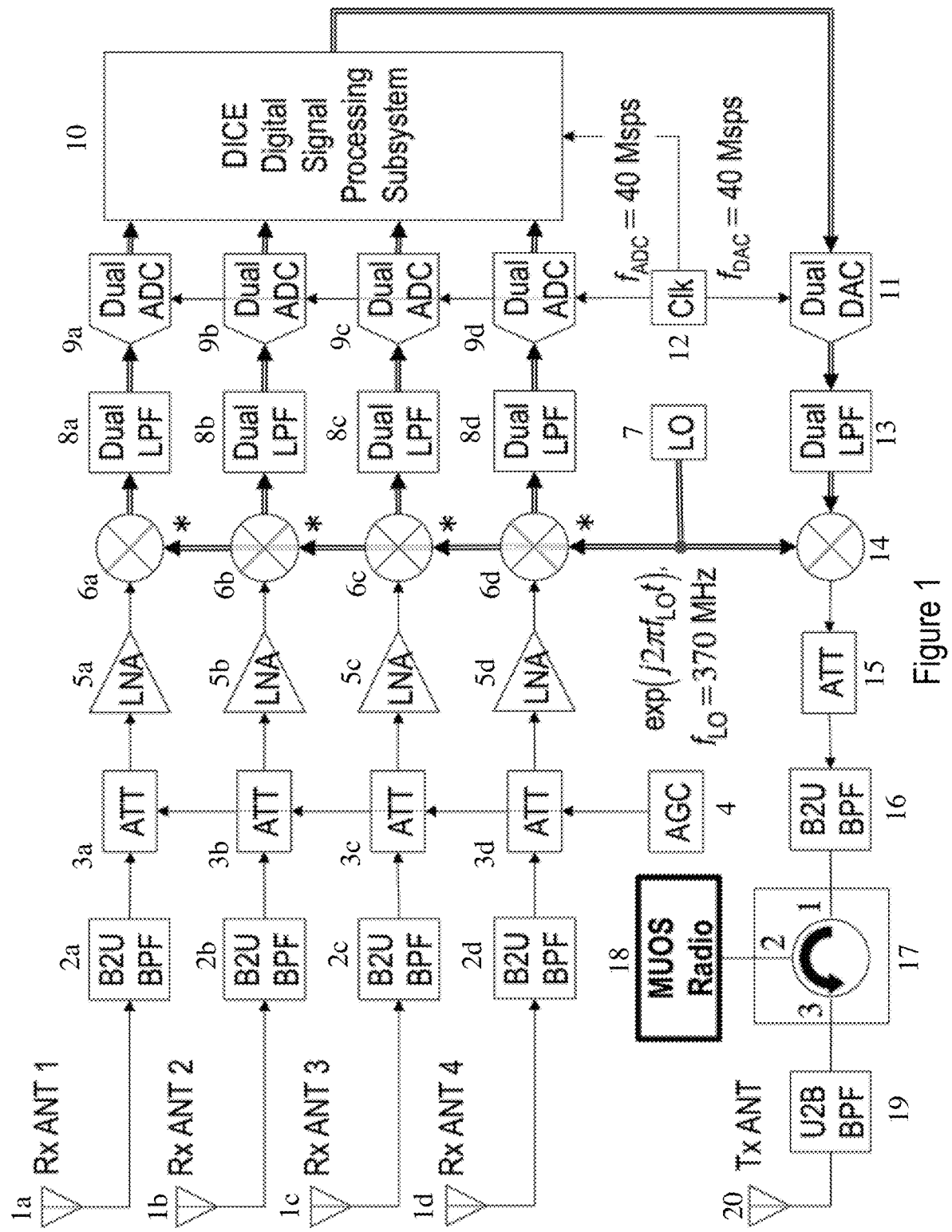
FIG. 1 is a block diagram showing a network-communication capable radio coupled to a DICE appliqué, in a configuration that uses a direct-conversion transceiver in which the signal output from an array of receive antennas is frequency-shifted from the MUOS Base-to-User (B2U) band to complex-baseband prior to being input to a DICE digital signal processing (DSP) subsystem, and the signal output from the DICE DSP subsystem is frequency-shifted from complex-baseband to the MUOS B2U band prior to input to a MUOS radio.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

DICE Appliqué System Embodiment

FIG. 1 shows an appliqué embodiment of the invention, which aids performance of a conventional MUOS radio embedded in the system. The system uses a receive array comprising a plurality of any of spatially and/or polarization diverse antenna feeds (for example, four feeds from spatially separated antennas as shown in this Figure) (1a-1d) to receive analog signals-in-space; filtering those analog signals-in-space to remove unwanted signal energy outside the 360-380 MHz MUOS Base-to-User (B2U) band, denoted by the B2U bandpass filter (BPF) (2a-2d) shown on each antenna feed; and passing those filtered signals through a low-noise amplifier (LNA) (5a-5d) to boost signal gain for subsequent processing stages, with gain adjustment, shown in FIG. 1 using variable-loss attenuators (ATT's) (3a-3d) adapted using shared automatic gain control (AGC) circuitry (4), to avoid desensitization of those processing stages as interferes appear and disappear in the environment. The B2U BPF must especially suppress any energy present in the 300-320 MHz MUOS User-to-Base (U2B) band, which is 40 MHz from the B2U band, as the received signal environment is likely to contain strong U2B emissions generated by the MUOS radio (18) embedded in the appliqué.

Example receive feeds that could be employed here include, but are not limited to: feeds derived from spatially separated antennas; feeds derived from dual-polarized antennas, including feeds from a single dual-polarized antenna; feeds derived from an RF mode-forming matrix, e.g., a Butler mode former fed by a uniform circular, linear, or rectangular array; feeds from a beam-forming network, e.g., in which the feeds are coupled to a set of beams substantively pointing at a MUOS SV; or any combination thereof. The key requirement is that at least one of these feeds receive the Base-to-User signal emitted by a MUOS SV at a signal-to-noise ratio (SNR) that allows reception of that signal in the absence of co-channel interference (CCI), and at least two of the feeds receive the CCI with a linearly independent gain and phase (complex gain, under complex-baseband representation) that allows the CCI to be substantively removed using linear combining operations.

In this embodiment, the signals received by each antenna in MUOS B2U band is then directly converted down to complex-baseband by passing each LNA (5a-5d) output signal-in-space $\{x_{LNA}(t,m)\}_{m=1}^{4}$ through a Dual Downconverting Mixer (6a-6d)) that effectively generates complex-baseband mixer output signal $x_{base}(t,m)=s_{LO}^*(t)x_{LNA}(t,m)$ on receive feed m, where "$(\bullet)^*$" denotes the complex conjugation operation, and where $s_{LO}(t)=\exp(j2\pi f_{LO}t)$ is a complex sinusoid with frequency $f_{LO}=370$ MHz, generated in a local oscillator (LO) (7) preferably shared by all the mixers in the system. The resultant complex-baseband signals $\{x_{base}(t,m)\}_{m=1}^{4}$ should each have substantive energy between −10 MHz (corresponding to the received signal component at 360 MHz) and +10 MHz (corresponding to the received signal component at 380 MHz).

The real or "in-phase" (I) and imaginary or "quadrature" (Q) components or "rails" of each complex-baseband mixer output signal is then filtered by a pair of lowpass filters (dual LPF) (8a-8d) that has substantively flat gain within a ±10 MHz "passband" covering the downconverted B2U signal band, and that substantively suppresses energy outside a "stopband" determined by the LPF design; and passed through a pair of analog-to-digital converters (ADC's) (9a-9d) that convert each rail to a sampled and digitized representation of the B2U signal. In the embodiment shown in FIG. 1, the ADC sampling rate $f_{ADC}$ is set to 40 million samples per second (Msps), which requires the LPF stopband to begin at ±30 MHz to provide a ±10 MHz passband that is "protected" against aliasing from interferes outside that band; this is sufficient bandwidth to suppress vestigial U2B received emissions present after the B2U BPF (covering −50 MHz to −30 MHz in the downconverted frequency spectrum).

The digitized ADC output signal on each receiver feed is then input to a DICE Digital Signal Processing Subsystem (10; further described below, see FIG. 4), which substantively removes co-channel interference (CCI) from the desired MUOS B2U signals transmitted from MUOS satellite vehicles (SV's) in the system's field of view (FoV). The resultant cleaned up B2U signals are then output in complex format from the Subsystem.

In the appliqué embodiment shown in FIG. 1, the DICE Digital Signal Processing Subsystem output signals are further processed to convert them from digital to analog representation, by applying a digital-to-analog converter (DAC's) (11) with a 40 Msps interpolation rate to each rail of the output signal (Dual DAC), followed by a Dual LPF (13) to remove frequency-translated images induced by the Dual DAC (11). The ADC sampling rate and interpolation rate are controlled by a clock (12) that connects to each Dual ADC (9a-9d) and Dual DAC (11), as well as the DICE Digital Signal Processing Subsystem (4). The resultant analog complex-baseband signal $y_{base}(t)$ is then directly frequency-shifted to the 360-380 MHz band using a Dual Upconverting Mixer (14) that generates output radio-frequency (RF) signal-in-space $y_{RF}(t)=\text{Re}\{y_{base}(t)s_{LO}(t)\}$, where $s_{LO}(t)$ is the complex sinusoid LO output signal preferably shared by all the Dual Downconverting Mixers (6a-6d).

Using the same LO signal in every mixer in the system has two primary advantages. First, it ensures that any time-varying phase noise present in the mixer signal is shared in every receiver feed, except for a constant phase offset induced by differences in pathlength between the LO (7) and mixers (6*a*-6*d*; 14). Time-varying phase noise induces reciprocal mixing components in the presence of strong interference, which can place an upper limit on the degree of interference excision possible using linear combining methods. However, if that phase noise is shared by each mixer, then those reciprocal mixing components will also be shared and can be removed by linear combining methods, thereby removing that upper limit. Second, using the same LO signal in every mixer ensures that any frequency offset from the desired LO frequency $f_{LO}$ is shared in the Downconverting (6*a*-6*d*) and Upconverting (14) Mixers. Therefore, any frequency offset induced in the complex-baseband signal at the output of the Downconverting Mixers (6*a*-6*d*) will be removed by the Upconverting Mixer (14). Both of these advantages allow the use of a relatively inexpensive LO (7) in this appliqué embodiment, which need not be synchronized to the other digital circuitry in the system.

The Dual Upconverting Mixer output signal is then adjusted in power by an attenuator (ATT) (15), the result is passed through a final B2U BPF (16), and into Port 1 of a circulator (17), which routes the BPF output signal to a MUOS radio (18) connected to Port 2 of the circulator. Port 2 of the circulator (17) also routes MUOS user-to-base (U2B) signals transmitted from the MUOS radio (18) to a U2B BPF (19) connected to Port 3, which passes energy received over the 300-320 MHz MUOS U2B band into a transmit antenna (20), and which suppresses energy received over the MUOS B2U band that might otherwise propagate into the MUOS radio due to nonideal performance of the circulator. In alternate embodiments of the invention, the transmit antenna (20) can also be shared with one of the receive antennas, however, this requires an additional diplexer component to maintain isolation between the B2U and U2B frequency bands.

Figure 2:
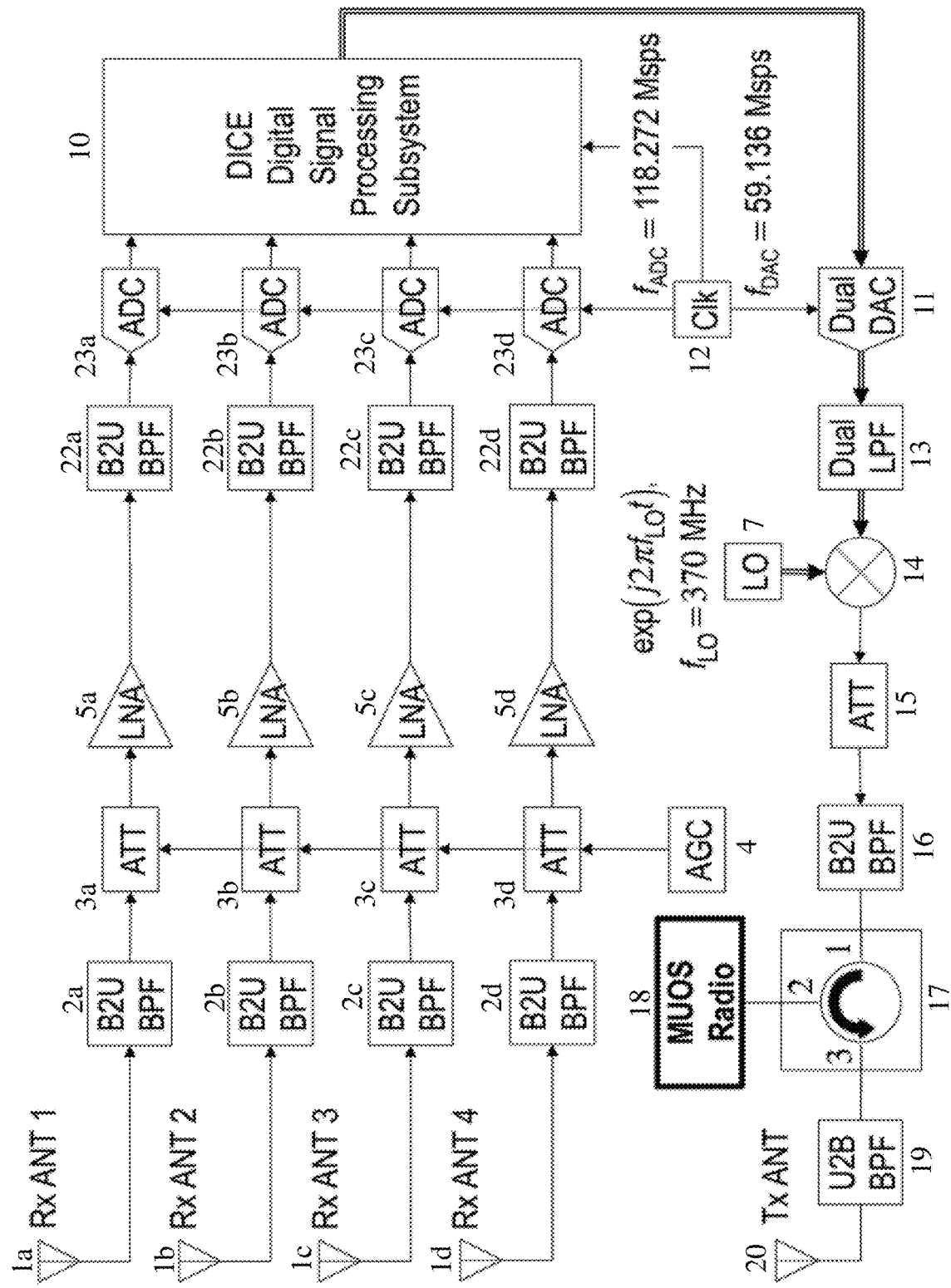
FIG. 2 is a block diagram showing a network-communication capable radio coupled to a DICE appliqué, in an alternate "alias-to-IF" configuration in which the signals output from the array of receive antennas are aliased to an intermediate frequency (IF) by under-sampled receiver analog-to-digital conversion (ADC) hardware prior to being input to the DICE DSP subsystem.
Figure 3:
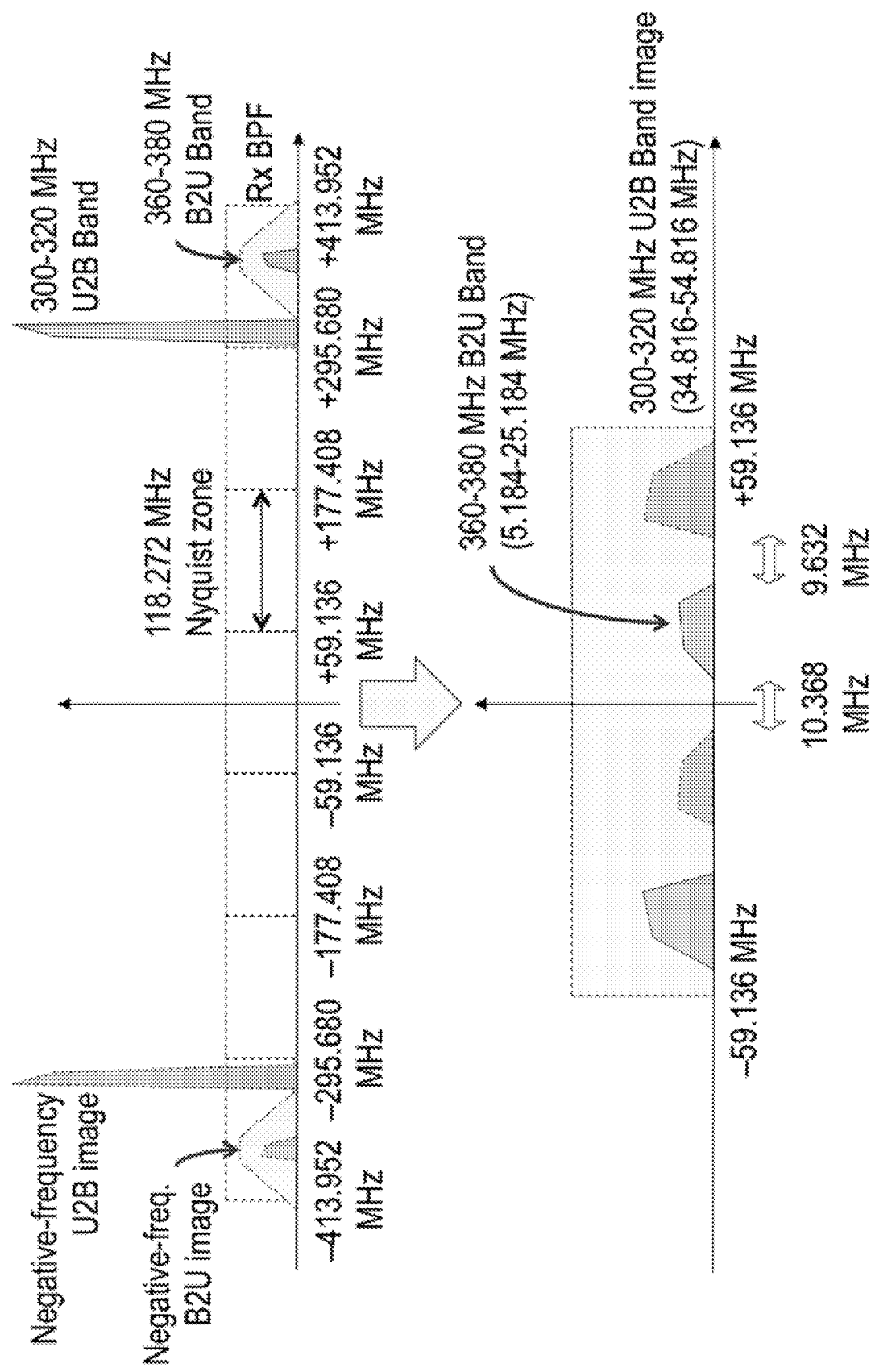
FIG. 3 shows the frequency distribution of the MUOS B2U (desired) and user-to-base (U2B) co-site interfering bands, and negative-frequency images, at the input and output of the subsampling direct conversion receiver, for a 118.272 million-sample-per-second (Msps) ADC sampling rate as could be used in the embodiment shown in FIG. 2.

FIG. 2 is a high-level block diagram of an alternate DICE appliqué system, in a configuration where the received B2U signals are directly converted to an intermediate frequency (IF), by passing each LNA output signals through not a Downconverting Mixer but a second B2U BPF (22*a*-22*d*) to remove residual energy that may be present in the MUOS U2B band, and then through an ADC (23*a*-23*d*) with a 118.272 Msps sampling rate. This sampling rate aliases the MUOS B2U and U2B bands, and their negative-frequency images, to separate, nonoverlapping IF bands within the ±59.136 MHz bandwidth of the ADC output signal, as depicted in FIG. 3. Specifically, the 118.272 Msps ADC sampling rate aliases the 360-380 MHz MUOS B2U band to 5.184-25.184 MHz, and the 300-320 MHz MUOS U2B band to 38.816-54.186 MHz, such that the aliased B2U and U2B bands are separated by 9.632 MHz. This is sufficient frequency separation to allow any residual U2B energy in that band, e.g., from MUOS radios operating inside or within the physical vicinity of the DICE appliqué, to be suppressed by subsequent digital signal processing operations.

In the alias-to-IF system embodiment shown in FIG. 2, the unprocessed and real radio signals sensed on a plurality of any of spatially and/or polarization diverse antenna feeds (1*a*-1*d*) are converted from analog to digital format and frequency shifted (in one embodiment) from the 360-680 MHz MUOS B2U band to a new Intermediate Frequency ('IF') frequency using a subsampling direct-conversion operation. The digitized ADC output signals are then passed to a DICE Digital Signal Processing Subsystem (10) that substantively removes co-channel interference present in the IF B2U band, and generates a complex-baseband signal with a 59.136 Msps sample rate. This digital signal is then converted to analog complex-baseband format using a Dual DAC (11) with a 59.136 Msps interpolation rate, and passed through the same operations shown in FIG. 1 to upconvert that signal to the MUOS B2U band and pass it into a MUOS radio (18). The DICE Digital Signal Processing Subsystem (10) thus takes as its input each digitized IF antenna feed and completes the transformation of the analog representation of the signal as received into a digital representation of the intended signal, filtering out the non-signal aspects (co-channel interference) incorporated into the analog transmission by the environmental factors experienced, including the hardware of the receiving unit.

The alias-to-IF receiver implementation provides a number of advantages in the DICE system.

These include:

Lack of a mixer, which reduces cost, SWAP, and linearity of the receiver.

Absence of mixer phase noise, which can adversely affect coherence of the receive signals if applied independently to each antenna.

Absence of in-phase/quadrature imbalance, which can introduce interference images and dispersion into the received signal. In addition, the use of Dual ADC's to process pairs of antenna feeds can reduce effects of independent aperture jitter between those ADC's servicing those feeds.

Drawbacks of this implementation include:

Reliance on in-band BPF's, which can limit capability to devices built to operate in that band, especially if operating in a band where economic forces have not minimized cost of those devices. In particular, the quality of the adaptive beamforming can be greatly compromised by cross-antenna frequency dispersion induced by those BPF's.

Requirement for a high-quality ADC with a bandwidth that greatly exceeds its sampling rate. The resultant system can also be highly sensitive to aperture jitter caused by oversampling of that ADC.

Need for additional digital processing to convert the real-IF output signal to complex-baseband format.

Potential need for precise calibration and compensation for frequency errors in the upconversion stage.

For this reason, while a digital subsampling approach can substantively reduce part-count for the receiver, other receiver designs may be superior in other applications, or for system instantiations that address other signal bands, e.g., cellular WCDMA bands.

The direct-to-IF appliqué shown in FIG. 2 presents a known weakness: the need to exactly up-convert the DAC output signal to the MUOS frequency band. In contrast, the direct-frequency conversion appliqué shown in FIG. 1 downconverts the MUOS B2U band to baseband, and upconverts the DICE subsystem output back to the MUOS B2U band, using the same LO. This eliminated the need to calibrate and compensate for any error in the DAC upconverter, because any LO frequency error during the downconversion operations will be cancelled by the corresponding upconversion operation.

In alternate embodiments of the invention, the DICE system can connect digitally to, or be integrated with, the MUOS radio to arbitrary degree; and can be integrated with purpose-built antenna arrays that maximally exploit capabilities of the system. An embodiment implemented as an appliqué can be operate at the lower PHY and be effected without need for implementation of TRANSEC, COMSEC, or higher abstraction layers. However, the ability to operate without any intercommunication with either the host radio using the system, or the antenna arrays used by the system, is a benefit of the invention that can increase both its utility to existing radio infrastructure, and cost of integrating the system into larger networks. The ability to operate at the lower PHY, and without use of TRANSEC, COMSEC, or higher-layer operations, is also expected to provide operational benefit in many use scenarios.

In further alternate embodiments of the invention, the DICE system can provide multiple outputs, each corresponding to a separate network element in the field of view of the receive array. This capability can be used to remove multiple-access interference (MAI) received by the array, and to boost both the potential link-rate of the radio (by allowing simultaneous access to multiple network nodes) and to reduce the uplink capacity of the network.

Although a MUOS reception use scenario is described here, the system can be used in numerous non-MUOS applications, including but not limited to: reception of commercial cellular waveforms, reception of signals in wireless local area networks (WLAN's) and wireless personal area networks (WPAN's), GNSS reception in the presence of jamming, and operation of wireless repeater networks.

FIG. 3 depicts the effect of the alias-to-IF process for the MUOS B2U and U2B bands, using the 118.272 Msps ADC sampling rate employed in the embodiment shown in FIG. 2. The B2U and U2B bands are depicted here as asymmetric energy distributions, in order to better illustrate the effect of the receiver on these spectra. Excluding addition of noise intermodulation products introduced by nonlinearity in the receive LNA (5a-5d) for each feed, the dominant effect of the receiver is to suppress out-of-band energy using the Rx BPF, and to alias all of the remaining signal components into the [−59.136 MHz+59.136 MHz] ADC output frequency band. As the ADC input and output signals are both real, both the positive frequency components of the input signals, and their reversed-spectrum images at negative frequencies, are aliased into this band. As a result of this operation, the B2U band aliases into the [+5.184 MHz+25.184 MHz] band, with a reversed-spectrum image at the corresponding negative frequencies, and the U2B reversed-spectrum negative frequency image aliases into the [+34.816 MHz+54.816 MHz] band, with a non-reversed image at the corresponding negative frequencies. This provides a 10.368 MHz lower transition band and 9.632 MHz upper transition band between the B2U positive frequency image and the interfering B2U and U2B negative-frequency images, respectively. These images are suppressed further in subsequent digital processing steps implemented in the FPGA (30).

DICE Digital Signal Processing Subsystem

Figure 4:
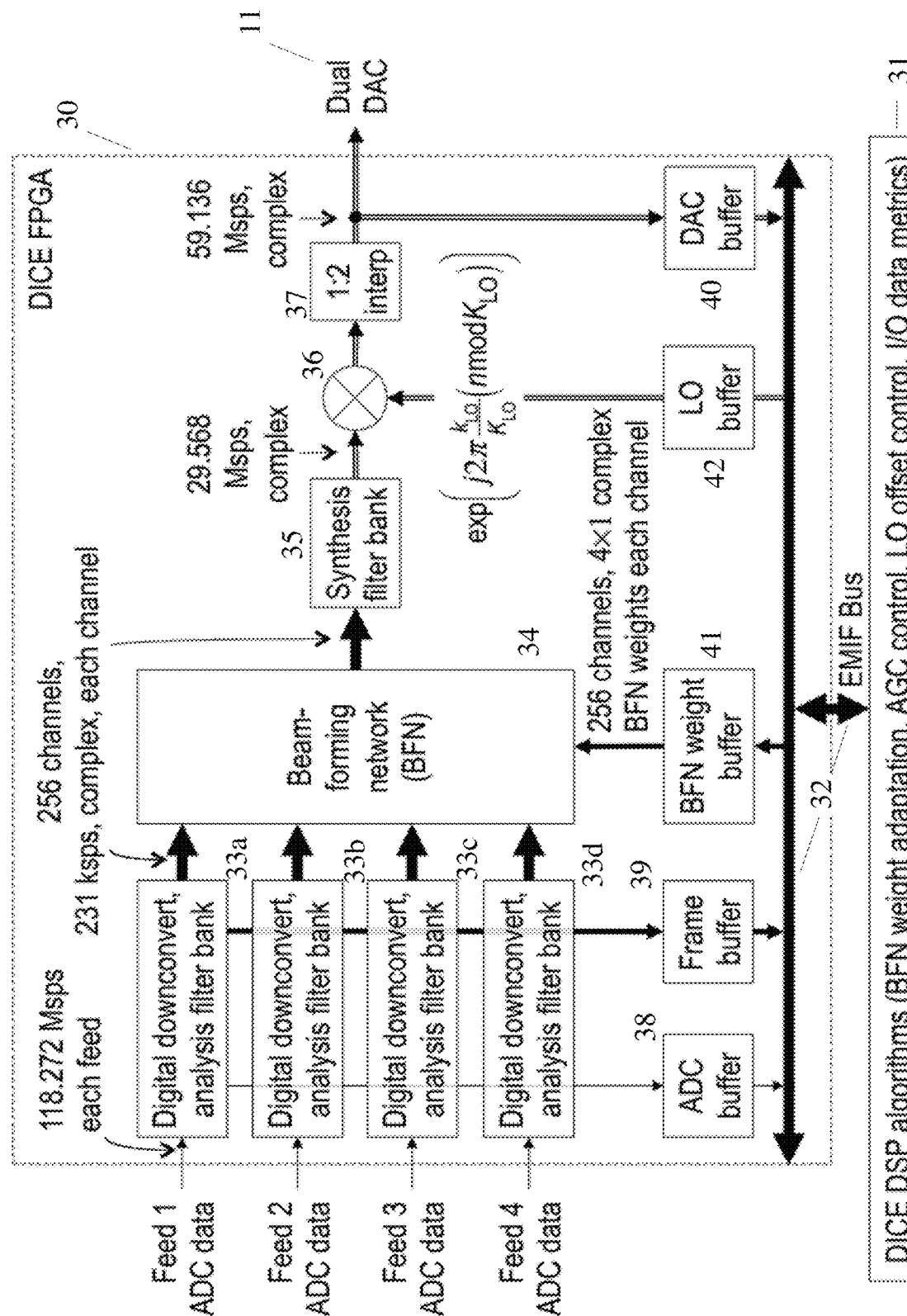
FIG. 4 is a top-level overview of the FPGA Signal Processing hardware, depicting the logical structuring of the elements handling the digital downconversion, beamforming, and transmit interpolation process, for the DICE embodiment shown in FIG. 2.

FIG. 4 shows a top-level block diagram of the digital operations of the DICE digital signal processing subsystem (10) implemented in the alias-to-IF embodiment shown in FIG. 2. The digital signal processing subsystem embodiment shown here comprises a field-programmable gate array (FPGA) (30) to perform highly-regular, high rate digital signal processing operations; a digital signal processing (DSP) element (31) to implement more complex algorithms performed by the invention, in particular, calculation of beamforming network (BFN) weights employed in the FPGA (30) to substantively excise interference present in the MUOS B2U band; and a External Memory Interface (EMIF) bus (32) to route pertinent data between the FPGA (30) and DSP element (32). The system shown in FIG. 4 also depicts a Beamforming network element (34) implemented in the FPGA (30) that uses beamforming combiner weights, obtained through an implementation of an algorithm in the DSP element (31) (that exploits underlying features that are synchronous with known 10 ms periodicities, also referred to as framing intervals, known framing intervals, frame buffers, data frames, or just frames in the MUOS signal) via the External Memory Interface (EMIF) bus (32) used to transport small amounts of data to the DSP element (31) in order to implement the beamforming weight adaptation algorithm and to transfer computed weights back to the FPGA (30). The FPGA (30) also possesses input and output data buffers (respectively 38, 39; 40, 42) that can be used to perform ancillary tasks such as calculation and reporting of ADC output quality metrics, calibration of output frequency offset for the IQ RF Upconverter, and calculation and reporting of output quality metrics, and report these metrics over the EMIF bus (32).

Within the FPGA (30), the incoming received signals output from the set of four ADC "feeds" (not shown here, see FIG. 2), operating at a 118.272 Msps sampling rate, is each passed through a dedicated digital downconverter and analysis filter bank (33a-33d; with one such further explained below and in FIG. 5) performing decimation and analysis operations that downconverts that signal into 256 frequency channels, each separated by 115.5 kHz in frequency, and each with a data rate of 231 kilosamples per second (ksps), i.e., covering a 29.568 MHz bandwidth and over-sampled by a factor of 2. Preferentially, the Analysis filter bank (53) is implemented using a method allowing substantively perfect reconstruction of the complex-baseband input signal in an accompanying Synthesis Filter Bank (35); this technique is used to reconstruct the beamformed channels in the Synthesis Filter-Bank (35) and Interpolation filter (37). Several methods for accomplishing this are well known to those skilled in the art.

The frequency channels for each feed are then transported to a beamforming network element (BFN) (34), which linearly combines each frequency channel over the "feed" dimension as described below to substantively excise interference present in that frequency channel. The resultant beamformed output frequency channels are then passed to a frequency Synthesis filter bank (35) that combines those frequency channels into a complex-baseband signal with a 29.568 Msps data rate, which signal next is modified by a combiner (36) that multiplies that signal by a frequency shift that compensates for offset error in the LO (7) shown in FIG. 2, and passes the compensated signal to an 1:2 interpolator element (37) which interpolates that signal to a 59.136 Msps data rate. This signal is then output to the Dual DAC (11) shown in FIG. 2.

In addition to these operations, portions of the ADC output data, BFN input data, and interpolator output data are passed to an ADC buffer (38), Frame buffer (39), and DAC buffer (40), respectively, and routed to the DSP element (31) over the EMIF buffer (32). This data is used to control the AGC (4) shown in FIG. 2; to compute input/output (I/O) metrics describing operation of the invention; and to adapt both the linear combining weights used in the BFN (34), and to compute LO offset values $k_{LO}$ used to correct errors between the intended and actual LO signal applied to the Dual Upconversion Mixer (14) shown in FIG. 2. The BFN weights and LO offset (or complex sinusoid that implements that offset) are also input over the EMIF bus (32) respectively from the DSP element (31) to the BFN Weight Buffer (41) and LO Buffer (42) for use within the FPGA (30).

The DICE digital signal processing subsystem embodiment shown in FIG. 4 works within the alias-to-IF embodiment, by using the FPGA (30) to convert the IF signal output from each ADC feed into a digital complex-baseband representation of the intended signal, by filtering out the undesired adjacent-channel interference (ACI) received along with the desired MUOS B2U signals received by the system, including MUOS U2B emissions generated within the hardware of the receiving unit. The FPGA (30) digitally converts the IF signal on each feed to a complex-baseband signal comprising a real in-phase (I) component or "rail" (I-rail), and an imaginary quadrature (Q) component or rail (Q-rail), such that the center of the MUOS B2U band is frequency-shifted to a 400 kHz frequency offset from baseband; separate the complex-baseband signal into frequency channels that allow at least independent processing of the component of each 5 MHz MUOS subband modulated by the MUOS B2U signal; linearly combine the antenna feeds over each frequency channel, using beamforming combiner weights that substantively excises interference and boosts the signal-to-noise ratio of the MUOS B2U signal received over that channel; and recombine the frequency channels into a complex-baseband signal covering the full MUOS B2U band. A processed digital complex-baseband output signal is converted to analog format using a pair of digital-to-analog combiner (DAC) operating against the in-phase (I) and quadrature (Q) rails of the complex-baseband signal; frequency-shifted back to the 360-380 MHz band in an IQ RF Upconverter operation; and output to the attached radio (18) as shown in FIG. 1 and FIG. 2.

Figure 5:
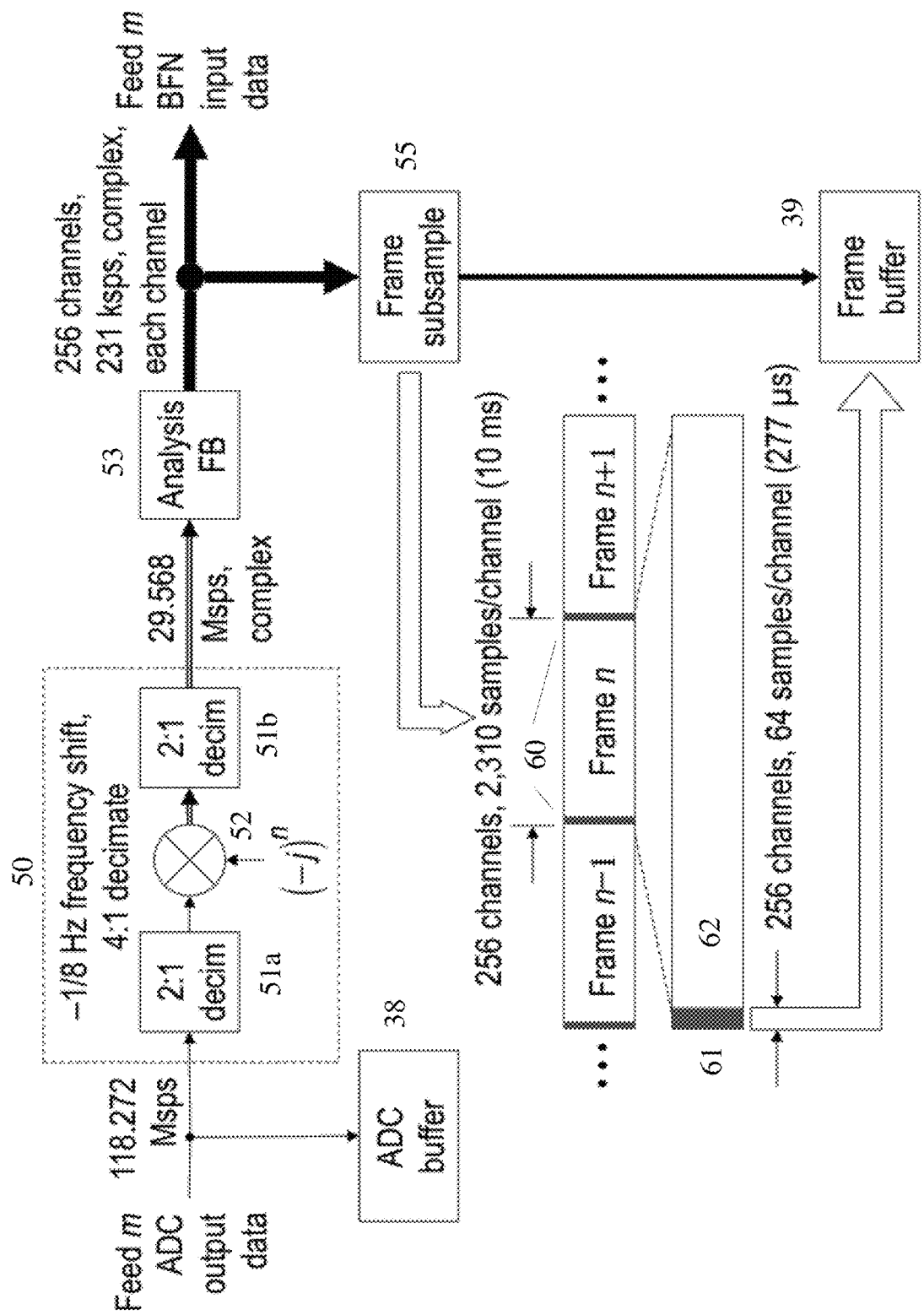
FIG. 5 is a block diagram showing the digital downconversion, decimation, and frequency channelization ("analysis frequency bank") operations performed on a single receiver feed (Feed "m") ahead of the beamforming network operations in the DICE DSP subsystem shown in FIG. 4, and providing a pictorial representation of the operations used to capture that feed's frame buffer data.

FIG. 5 describes the digital downconversion and analysis filter bank (33a-33d) implemented on each feed in FIG. 4, which provides the frequency-channelized inputs to the BFN, and which provides the data used to compute BFN weights inside the DSP element. The data output from each ADC is first downconverted by −⅛ Hz normalized frequency (−14.784 MHz at the 118.272 ADC sampling rate) (50), using a pair of 1:2 decimators (halfband LPF's and 1:2 subsamplers) (51a, 51b) separated by a −¼ Hz normalized frequency shift (52). This results in a complex-baseband signal with a 29.568 MHz data rate, in which the MUOS U2B band has been substantively eliminated and the MUOS B2U band has been downconverted to a 400 kHz center frequency.

Each complex-baseband signal feed is then channelized by an Analysis filter bank (53), which separates data on that feed into frequency channels covering the 29.568 MHz downconverter output band, thus allowing independent processing of each 5 MHz B2U subband at a minimum, with each channel providing data with a reduced sampling rate on the order of the bandwidth of the frequency channels. In the alias-to-IF embodiment shown here, the Analysis filter bank (53) produces 256 frequency channels separated by 115.5 kHz, with a 115.5 kHz half-power bandwidth and 231 kHz full-power bandwidth (50% overlap factor), and with an output rate of 231 kilosamples (thousands of samples) per second (ksps) on each channel (54), in order to facilitate implementation of simplified adaptation algorithms in the DSP element. In alternate embodiments, the output rate can be reduced to 115.5 ksps, trading higher complexity during analysis and subsequent synthesis operations against lower complexity during intervening beamforming operations. The analysis filter bank approach allows both narrowband and wideband co-channel interference (CCI) emissions to be cancelled efficiently, and can significantly increase the number of narrowband CCI emissions that can be eliminated by the beamforming network.

Segments of the analysis filter bank data are also captured over every 10 ms MUOS data frame, and placed in a Frame buffer (39), for later transport to the DSP element (31) via the EMIF bus (13). In the embodiment shown in FIG. 5, the first 64 complex samples (277 µs) of every 2,310 samples (10 ms) output on each channel and feed are captured and placed in the Frame buffer (39) over every 10 ms MUOS data frame. It should be noted that the Frame buffer (39) is not synchronized in time to any MUOS data frame, that is, the start of the 10 ms DICE frame buffer bears no relation to the start of a 10 ms MUOS data frame, either at the MUOS SV or observed at the receiver, and no synchronization between the invention and the MUOS signals need be performed prior to operation of the Frame buffer (39).

Adaptive response is provided by and through the DSP element (31) implementing any of a set of beamforming weight adaptation algorithms using beamforming weights derived from any of the ADC buffer (38) and Frame buffer (39), which weights after being computed by the DSP element (31) are sent to a BFN weight buffer (41) available to the beamforming network (34), which applies them to each frequency channel.

The beamforming element (34) combines signals on the same frequency channel of the digital downconverter and analysis filter banks (33a-33d) across antenna inputs, using beamforming weights that substantively improve the signal-to-interference-and-noise ratio (SINR) of a MUOS B2U signal present in the received data over that frequency channel, i.e., that excises co-channel interference (CCI) present on that channel, including multiple-access interference (MAI) from other MUOS transmitters in the antennas' field of view in some embodiments, and otherwise improves the signal-to-noise ratio (SNR) of the MUOS B2U signal. These beamforming weights are provided by the DSP element (31) through the BFN weight buffer (41).

Further specific implementation details of the FPGA (30) are described in the following sections.

Each digital downconverter and filter analysis bank (33a-33d) is responsible for completing the downconversion of the desired MUOS 20 MHz band incoming analog signal into a complex-baseband digital representation of the received signal while removing undesired signal components. This is somewhat complicated for the alias-to-IF sampling approach shown in FIG. 2. The ADC sampling rate used must consider the analog filter suppression of out-of band signals and placement of aliased U2B signals in the aliased output band. In addition, for ease of implementation of the adaptation algorithms, the sample rate should allow implementation of an analysis filter bank that provides an integer number of baseband samples in a 10 ms MUOS frame. A sampling rate of 118.272 MHz was selected based upon the following factors:

The lower edge of the MUOS band is 5.184 MHz above the third Nyquist sample rate (354.816 MHz) which provides a 2*5.184=10.368 MHz analog transition band. Based on the cascaded analog filters, this provides greater than 40 dB analog suppression of potential out-of-band radio frequency (RF) energy.

The U2B band aliases out of band and has sufficient transition bandwidth for filtering.

There are exactly 2,310 samples per 10 ms MUOS frame.

The FPGA (30) uses the EMIF bus (32) to transfer a small subset of beamformer input data from the ADC Buffer (38) and Frame Buffer (39) to the DSP element (31) over every 10 ms adaptation frame, e.g., 16,384 complex samples (64 samples/channel×256 channels) out of 591,360 complex samples available every 10 ms (2,310 samples/channel×256 channels), or 2.77% of each frame. The DSP element (31) computes beamforming weights that substantively improve the SINR of a MUOS B2U signal present on the frequency channel, and transfer these weights back to the FPGA (30), where they are used in the beamforming element (34) to provide this improvement to the entire data stream. The FPGA (30) also possesses input and output data buffers and secondary processing elements known to the art (not shown) that can also be used to perform ancillary tasks such as calculation and reporting of ADC output quality metrics, calibration of output frequency offset used to compensate errors in LO (7) feeding the Dual Upconverting Mixer (14), and calculation and reporting of output quality metrics, and report these metrics over the EMIF (32).

In addition to receive thermal noise and the B2U signal, the DICE system is expected to operate in the presence of a number of additional interference sources. See Franke 1996 and MacMullen 1999 for a description of exemplary downlink interference present in the UHF SatCom bands encompassing the MUOS B2U band. These include:

Narrowband co-channel interference (NBCCI) from other signals operating in the B2U band, and occupying a fraction of each MUOS subband. These can include "friendly" interference from other radios operating in this band, including tactical radios communicating over the legacy UHF follow-on (UFO) system; spurs or adjacent-channel interference (ACI) from narrowband terrestrial radios operating in or near the B2U band; and intentional jamming. Exemplary NBCCI in non-MUOS bands can include narrowband cellular signals at geographical boundaries between 2G/2.5G and 3G service areas.

Wideband co-channel interference (WBCCI) that may occupy entire B2U subbands, or that may cover the entire MUOS band (as shown in FIG. 3). These can include Land-Mobile Radio Systems (LMRS) also operating in or near this band (see pg. 16, Federal Spectrum Use Summary, 30 MHz-3000 GHz, National Telecommunications And Information Management Office of Spectrum Management, June 2010, for a list of authorized uses of the MUOS B2U band), quasi-Gaussian noise from computer equipment operating in vicinity of the DICE system, and multiple-access interference (MAI) from MUOS satellites in same field of view of the DICE system.

In alternate embodiments, the DSP element (31) can calculate weights associated with multiple desired signals present in the received data, which are then passed back to the FPGA (30) and used to generate multiple combiner output signals. Each of these signals can be interpolated, filtered, and passed to multiple DAC's (not shown). These signals can correspond to signals present on other frequency subbands within the received data passband, as well as signals received in the same band from other spatially separated transmitters, e.g., MAI due to multiple MUOS satellites in the receiver's field of view.

In alternate embodiments, the algorithms can be implemented in the FPGA (30) or in application specific integrated circuits (ASIC's), allowing the DSP to be removed from the design to minimize overall size, weight and power (SWaP) of the system.

Figure 6:
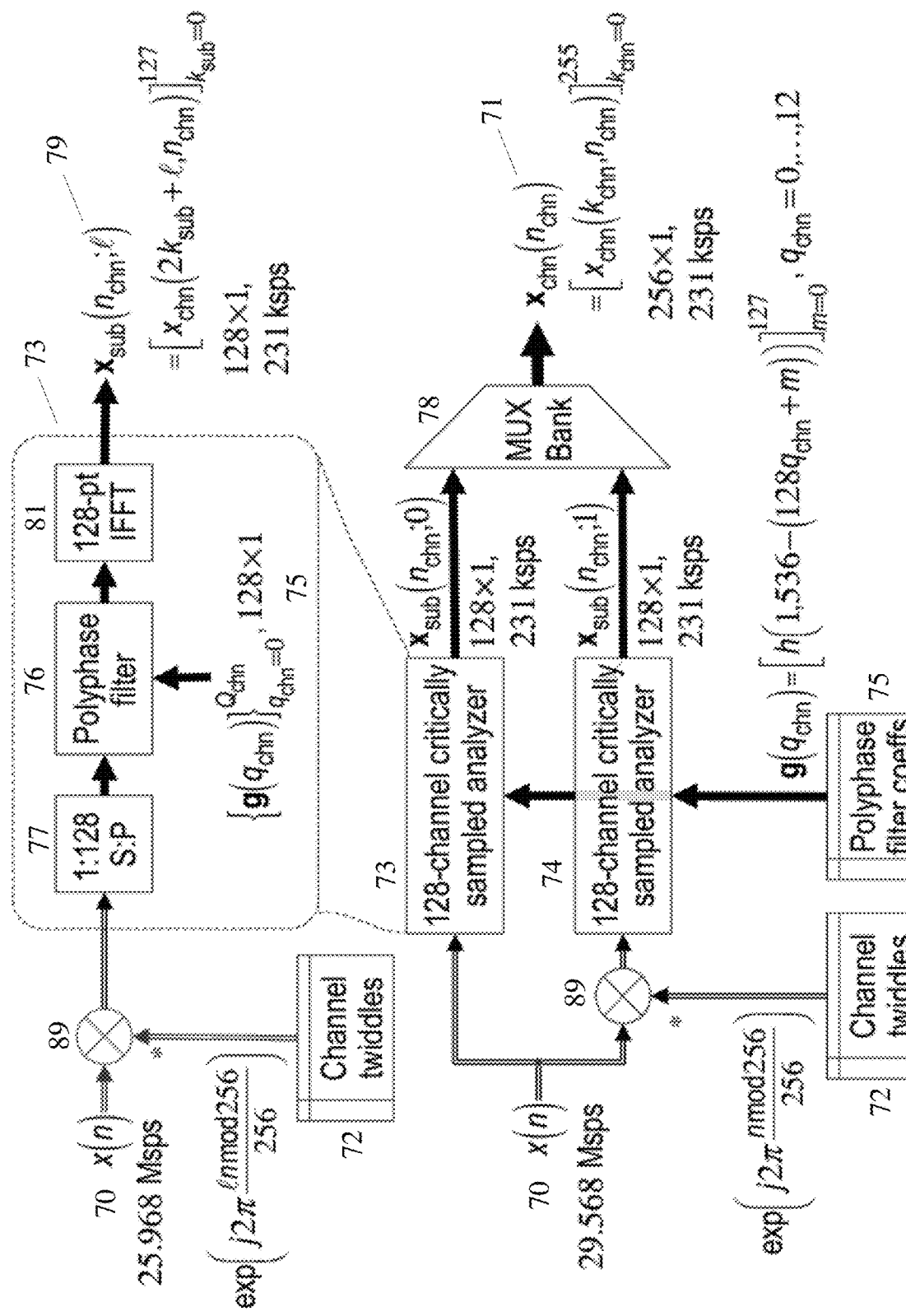
FIG. 6 shows a block diagram of a Fast Fourier Transform (FFT) Based Decimation-in-Frequency Analyzer for transformations from analog-to-digital representations of a signal.

FIG. 6 shows an inverse fast Fourier transform (IFFT) based Decimation-in-Frequency approach used to implement each Analysis filter bank (Analysis FB) (53) shown in FIG. 5. Conceptually and in certain embodiments, e.g., multi-bank FGPAs, multi-bank or multi-core GPUs, or multi-core DSPs, the computational processes implemented by each analyzer in a given Analysis filter bank (53) are performed simultaneously (i.e., in parallel). Alternatively, they could be performed by a single analyzer serially at different times, e.g., within a "do loop" taking first the upper leg ($\ell = 0$), then the lower leg ($\ell = 1$) and then recombining the stored results.

The overall computational process implemented by each Analysis filter bank (53) is given in general by:

$$x_{chn}(n_{chn}) = [x_{chn}(k_{chn}, n_{chn})]_{k_{chn}=0}^{K_{chn}-1} = \left[ \sum_{m=0}^{Q_{chn}M_{chn}} h(m) \times (n_{chn}M_{chn} + m) e^{-j2\pi(n_{chn}M_{chn}+m)k_{chn}/L_{chn}M_{chn}} \right]_{k_{chn}=0}^{L_{chn}M_{chn}-1} \quad (1)$$

for discrete-time input signal x(n), where $K_{chn} = L_{chn}M_{chn}$ is the total number of channels in the Analysis filter bank (53), $\{h(m)\}_{m=0}^{Q_{chn}M_{chn}}$ is a real, causal, finite-impulse-response (FIR) discrete time prototype analyzer filter with order $Q_{chn}M_{chn}$, such that h(m)=0 for m<0 and m>$Q_{chn}M_{chn}$, and where $L_{chn}$, $M_{chn}$, and $Q_{chn}$ are the frequency decimation factor, number of critically-sampled analyzer filter bank channels, and polychannel filter order, respectively, employed in the analyzer embodiment.

Introducing path $\ell$ incrementally frequency-shifted signal x(n; $\ell$ ), given by $$x(n; \ell) \triangleq x(n) e^{-j2\pi n \ell / L_{chn}M_{chn}}, \quad \ell = 0, \ldots, L_{chn}-1, \quad (2)$$

time-channelized representations of x(n; $\ell$ ) and $\{h(m)\}_{m=0}^{Q_{chn}M_{chn}}$, given by $$x(n_{chn}; \ell) \triangleq [x(n_{cnh}M_{chn}+m; \ell)]_{m=0}^{M_{chn}-1}, \quad (3)$$

$$h(q_{chn}) \triangleq [h(q_{chn}M_{chn}+m)]_{m=0}^{M_{chn}-1}, \quad q_{chn}=0, \ldots, Q_{chn}, \quad (4)$$

and path $\ell$ frequency-interleaved critically-sampled analyzer output signal $x_{sub}(n_{chn}; \ell)$, given by $$x_{sub}(n_{chn}; \ell) \triangleq [x_{chn}(k_{sub}L_{chn} + \ell, n_{chn})]_{k_{sub}=0}^{M_{chn}-1}, \quad (5)$$

$\ell = 0, \ldots, L_{chn} - 1,$ then $\{x_{sub}(n_{chn}; \ell)\}_{\ell=0}^{L_{chn}-1}$ is formed from $\{x(n_{chn}; \ell)\}_{\ell=0}^{L_{chn}-1}$ and $\{h(q_{chn})\}_{q=0}^{Q_{chn}}$ using succinct vector operations $$x_{sub}(n_{chn}; \ell) = DFT_{M_{chn}} \left\{ \sum_{q_{chn}=0}^{Q_{chn}} h(q_{chn}) \circ x(n_{chn} + q_{chn}; \ell) \right\}, \quad (6)$$

$\ell = 0, \ldots, L_{chn} - 1,$ where "∘" denotes the element-wise (Hadamard) product and $DFT_{M_{chn}}(\bullet)$ is the row-wise unnormalized $M_{chn}$-point discrete Fourier transform (DFT), given generally by $$(X)_k = \sum_{m=0}^{M-1} (x)_m e^{-j2\pi km/M}, \quad (7)$$

for M×1 DFT input and output vectors $x=[(x)_m]_{m=0}^{M-1}$ and $X=[(X)_k]_{k=0}^{M-1}$, respectively. The analyzer filter-bank output signal $x_{chn}(n_{chn})$ is then formed from $\{x_{sub}(n_{chn};\ell)\}_{\ell=0}^{L_{chn}-1}$ using a multiplexing operation that de-interleaves the critically-sampled analyzer filter-bank output signals.

The element-wise filtering operation shown in Equation (6) is not a conventional convolution operation, as "$n+q_{chn}$" indexing is used inside the summation, rather than the "$n-q_{chn}$" indexing used in conventional convolution. This operation is transformed to a conventional element-wide convolution, by defining $Q_{chn}M_{chn}$-order time-reversed prototype filter $$g(m) \triangleq \begin{cases} h(Q_{chn}M_{chn} - m), & m = 0, \ldots, Q_{chn}M_{chn} \\ 0, & \text{otherwise.} \end{cases} \quad (8)$$

Frequency responses $$H(e^{j2\pi f}) = \sum_m h(m)e^{-j2\pi fm} \text{ and}$$

$$G(e^{j2\pi f}) = \sum_m g(m)e^{-j2\pi fm}$$

are given by $G(e^{j2\pi f})=H^*(e^{j2\pi f})e^{j2\pi Q_{chn}M_{chn}f}$, i.e., the two prototype filters have identical frequency response magnitude ($|G(e^{j2\pi f})|=|H(e^{j2\pi f})|$), but effectively reversed frequency response phase, except for a $Q_{chn}M_{chn}$-sample time-advancement required to make both filters causal ($\angle G(e^{j2\pi f})=2\pi Q_{chn}M_{chn}f-\angle H(e^{j2\pi f})$). Defining time-channelized filter $$g(q_{chn})=[g(q_{chn}M_{chn}+m)]_{m=0}^{M_{chn}-1}, \quad q_{chn}=0, \ldots, Q_{chn}, \quad (9)$$

then Equation (6) can be expressed as $$x_{sub}(n_{chn};\ell) = IDFT_{M_{chn}}\left\{\sum_{q_{chn}=0}^{Q_{chn}} g(q_{chn}) \circ x((n_{chn}+Q_{chn})-q_{chn};\ell)\right\}, \quad (10)$$

where $IDFT_{M_{chn}}(\bullet)$ is the row-wise $M_{chn}$-point unnormalized inverse-DFT (IDFT), given by $$(x)_m = \sum_{k=0}^{M-1} (X)_k e^{+j2\pi km/M} \quad (11)$$

for general M×1 IDFT input and output vectors $X=[(X)_k]_{k=0}^{M-1}$ and $x=[(x)_m]_{m=0}^{M-1}$, respectively, implemented using computationally efficient radix-2 IFFT methods if M is a power of two, and where the element-wise convolution performed ahead of the IDFT operation in Equation (10) is now a conventional operation for a poly-phase filter (76). Note that the analyzer output signal shown in Equation (10) is "advanced" in time by $Q_{chn}$ output samples relative to the "conventional" analyzer output signal shown in Equation (6); if desired, the analyzer output time indices can be delayed by $Q_{chn}$ ($n_{chn} \leftarrow n_{chn}-Q_{chn}$) to remove this effect.

Using the general decimation-in-frequency method described above, the operations used to compute path $\ell$ output signal $x_{sub}(n_{chn};\ell)$ from analyzer input signal $x(n)$ for this Analysis filter bank embodiment are shown in the upper part of FIG. 6. These operations are described as follows: the input signal $x(n)$ (70) is first passed to a multiplier (89) where it is multiplied by the conjugate of channel twiddles $$\left\{\exp\left(j2\pi\frac{\ell n \bmod 256}{256}\right)\right\}_{n=0}^{255}$$

(said conjugation denoted by the "*" operation applied to the stored Channel Twiddles (72)) to form path $\ell$ incrementally frequency-shifted signal $x(n;\ell)$, where the channel twiddles are generated from a prestored Look-Up Table (LUT) to reduce processing complexity, and where (•)mod 256 is the modulo-256 operation. The path $\ell$ incrementally frequency-shifted signal $x(n;\ell)$ is then passed through a 128-channel critically-sampled analyzer (73), sequentially comprising a 1:128 serial-to-parallel (S:P) converter (77), a Polyphase filter (76) which integrates the prestored polyphase filter coefficients (75), and a 128-point (radix-2) IFFT (81), implemented to produce path $\ell$ output critically-sampled analyzer output signal $x_{sub}(n_{chn};\ell)$. All of the output signals $\{x_{sub}(n_{chn};\ell)\}_{\ell=0}^{L_{chn}-1}$ from every critically-sampled analyzer are then fed to the multiplexer (78) (not shown on the upper part of FIG. 6) to produce the full channelizer output signal $x_{chn}(n_{chn})$.

For the full Analysis filter-bank (53) shown in the lower part of FIG. 6, where $K_{chn}=256$ and $L_{chn}=2$, that Analysis filter-bank (53) is implemented using 2 parallel critically-sampled analyzers (73, 74) with $M_{chn}=128$ channels per critically-sampled analyzer, and $Q_{chn}M_{chn}=1{,}536$, such that each critically-sampled analyzer (73, 74) employs a polyphase filter (76) of order $Q_{chn}=12$. This path also explicitly exploits the property that exp $$\left(j2\pi\ell n/256\frac{\ell n \bmod 256}{256}\right) \equiv 1$$

on the $\ell=0$ path, which allows omission of the channel twiddle multiplication and $x(n;0) \equiv x(n)$. Consequently, for the specific embodiment shown in FIG. 6, where $L_{chn}=2$, the channel twiddles $$\left\{\exp\left(j2\pi\frac{\ell n \bmod 256}{256}\right)\right\}_{n=0}^{255}$$

are only applied on the $\ell=1$ path. The output signals $\{x_{sub}(n_{chn};\ell)\}_{\ell=0}^{L_{chn}-1}$ from the parallel critically-sampled analyzers (73, 74) are then interleaved together to form the full Analysis filter-bank signal $x_{chn}(n_{chn})$, using the multiplexer (78) shown in FIG. 6 to produce the output (71).

In the embodiment shown in FIG. 6, the IDFT operation is performed using a "radix-2" fast inverse Fourier transform (IFFT) algorithm that is well-known in the art. The prior art of using a 'butterfly' or interleaved implementation can reduce the computational density and complexity as well.

Also, computational efficiency is improved when the implementation specifically recognizes, and builds into the processing, tests to reduce butterfly multiplications; for example, later stages of an IFFT do not require a complex multiply, since multiplication by ±j can be performed by simply swapping the I and Q samples; and multiplies by '±1' need not be done.

Figure 7:
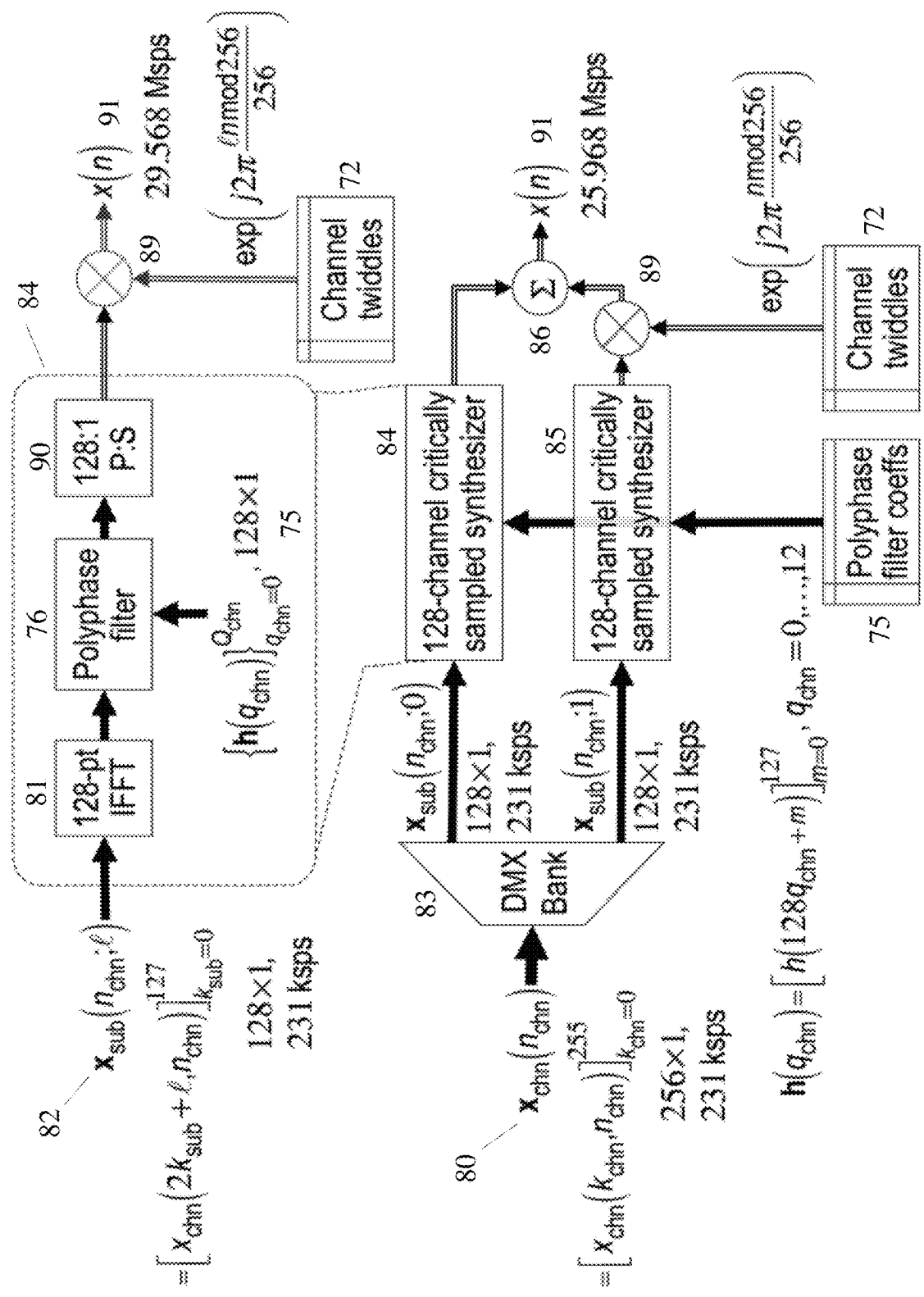
FIG. 7 shows a block diagram of an Inverse Fast Fourier Transform (IFFT) Based Decimation-in-Frequency Synthesizer for transformations from digital-to-analog representations of a signal.

FIG. 7 shows the FFT-based Decimation-in-Frequency implementation of the substantively perfect Synthesis filter-bank (35) applied to the BFN output channels in FIG. 4. The structure shown is the dual of the Analysis filter-bank structure shown in FIG. 6. The polyphase filter coefficient (75) stores the same data in both Figures. However, that data is applied in the polyphase filter (76) in reverse order (i.e. it is time-channelized) in each Figure. So in FIG. 6 a time-channelized version of g(m)=h(1,536−m) is used in the polyphase filter (76), while in FIG. 7 a time-channelized version of is used in the polyphase filter (76). The polyphase filtering operation is the same in both Figures, but the data given to it is different. Again these computational processes implemented by each synthesizer could be in parallel or serial as described above.

The general case, as shown in the upper part of FIG. 7 is: the input (80) is processed by an IFFT (81) then a polyphase filter (76), which uses the pre-stored polyphase filter coefficients (75), then by a parallel-to-serial converter (90), then a multiplier (89) applying the prestored Channel twiddles (72), to produce the output (91)

The computational process provided by each synthesizer operation is given generally by $$x(n) = \sum_{k_{chn}=1}^{K_{chn}-1} e^{j2\lambda k_{chn} n/K_{chn}} \sum_{n_{chn}} x_{chn}(k_{chn}, n_{chn}) h(n - n_{chn} M_{chn}) \quad (12)$$

$$= \sum_{\ell=0}^{L_{chn}-1} e^{j2\pi n\ell/L_{chn} M_{chn}} x(n; \ell),$$

for $K_{chn} \times 1$ synthesizer input signal $$x_{chn}(n_{chn}) = [x_{chn}(k_{chn}, n_{chn})]_{k_{chn}=0}^{K_{chn}-1} (80),$$

where $K_{chn} = L_{chn} M_{chn}$ and interpolation function h(m) is the same real, causal, FIR $Q_{chn} M_{chn}$-order discrete-time prototype filter used in the Analysis filter-bank (53), and where $x(n; \ell)$ is an incrementally frequency-shifted signal, given by $$x(n; \ell) = \sum_{k_{sub}=0}^{M_{chn}-1} e^{j2\pi kn/M_{chn}} \sum_{n_{chn}} x_{sub}(k_{sub}, n_{chn}) h(n - n_{chn} M_{chn}). \quad (13)$$

Using notation for time-channelized representations of $x(n; \ell)$ and $\{h(m)\}_{m=0}^{Q_{chn} M_{chn}}$ given in Equation (3) and Equation (4), respectively, and defining frequency-interleaved critically-sampled synthesizer input signals $$\{x_{sub}(n_{chn}; \ell)\}_{\ell=0}^{L_{chn}-1} = \{[x_{chn}(k_{sub} L_{chn} + \ell, n_{chn})]_{k_{sub}=0}^{M_{chn}-1}\}_{\ell=0}^{L_{chn}-1},$$

i.e., using notation given by Equation (5), then the time-channelized representation of $x(n; \ell)$ can be expressed succinctly as $$x(n, \ell) = \sum_{q_{chn}=0}^{Q_{chn}} h(q_{chn}) \circ IDFT_{M_{chn}} [x_{sub}(n_{chn} - q_{chn}; \ell)], \quad (14)$$

where $IDFT_{M_{chn}}(\bullet)$ is the row-wise $M_{chn}$-point unnormalized IDFT used in the Analysis filter-bank (53), implemented using IFFT operations if $M_{chn}$ is a power of two.

The Synthesis filter-bank (35) shown in FIG. 7 is then implemented using the following procedure:
  First, separate the $K_{chn} \times 1$ synthesizer input signal (80) into $L_{chn} M_{chn} \times 1$ frequency-interleaved signals using a demultiplexer (DMX) (83).
  Then, on each critically-sampled synthesizer path:
    implement Equation (14) by taking the row-wise unnormalized IDFT of $x_{sub}(n_{chn}; \ell)$ (80) using a radix-2 IFFT operation (81), and then performing an element-wise convolution of that signal and the polyphase filter (76) with time-channelized prestored polyphase filter coefficients $$\{h(q_{chn})\}_{q_{chn}=0}^{Q_{chn}}; \quad (75)$$

then multiply the P:S output signal (89) by the Channel Twiddles for that path (without conjugation).
  Then, sum together the signals on each path to form the synthesizer output signal x(n) (91).

The reconstruction response of the Synthesis filter-bank (35) can be determined by computing the Fourier transform of the finite-energy signal $x_{out}(n)$ generated by passing a finite-energy signal $x_{in}(n)$ through a hypothetical test setup comprising concatenated analyzer and synthesizer filter-banks. Assuming that $x_{in}(n)$ has Fourier transform $$X_{in}(e^{j2\pi f}) = \sum_n x_{in}(n) e^{-j2\pi fn},$$

then the Fourier transform of $x_{out}(n)$ is given by $$X_{out}(e^{j2\pi f}) = \sum_{k_{sub}=0}^{M_{chn}-1} D_{k_{sub}}(e^{j2\pi f}) X_{in}\left(e^{j2\pi(f + \frac{k_{sub}}{M_{chn}})}\right), \quad (15)$$

where reconstruction frequency responses $$\{D_{k_{sub}}(e^{j2\pi f})\}_{k_{sub}=0}^{M_{chn}-1}$$

are given by $$D_{k_{sub}}(e^{j2\pi f}) = \frac{1}{K_{chn}} \sum_{k_{chn}=0}^{K_{chn}-1} H^*\left(e^{j2\pi(f - \frac{k_{chn}}{K_{chn}})}\right) H\left(e^{j2\pi(f - \frac{k_{chn}}{K_{chn}} - \frac{k_{sub}}{M_{chn}})}\right). \quad (16)$$

Ideally, $$\{D_{k_{sub}}(e^{j2\pi f})\}_{k_{sub}=0}^{M_{chn}-1}$$

satisfies perfect reconstruction response $$D_{k_{sub}}(e^{j2\pi f}) = \begin{cases} e^{-j2\pi\delta f}, & k_{sub} = 0 \\ 0, & k_{sub} = 1, \ldots, M_{chn}-1 \end{cases} \quad (17)$$

for a given prototype filter. If the analyzer is implemented using Equation (6), then $D_0(e^{j2\pi f})$ is real and nonnegative, and hence the concatenated analyzer-synthesizer filter-bank pair has an apparent group delay of 0. If the critically-sampled analyzers are implemented using Equation (10), and the analyzer output time index is delayed by $Q_{chn}$ samples to produce a causal output, then the end-to-end delay through the analyzer-synthesizer pair is equal to $Q_{chn}M_{chn}$, i.e., the order of h(m), plus the actual processing time needed to implement operations of the analysis and synthesis filter banks.

In the analysis and synthesis filter bank embodiments shown in FIG. 6 and FIG. 7, the Analysis filter-bank output channels and Synthesis filter-bank input channels are both separated by 29,568/256=115.5 kHz, and are implemented using a 1,536-tap nonlinear-phase prototype filter with a half-power bandwidth (HPBW) of 57.75 kHz, and an 80 dB rejection stopband of 113.5 kHz, resulting in a 97% overlap factor between channels. The reconstruction response for this prototype filter is close to 0 dB over the entire 29.568 MHz bandwidth of the analyzer input data, while the non-zero frequency offsets quickly degrades to <−80 dB. In practice, this should mean that strong interferes should not induce additional artifacts that must be removed by spatial beamforming operations.

In alternate embodiments, the output rate can be further reduced to 115.5 kHz (output sample rate equal to the channel separation), as shown in T. Karp, N. Fliege, "Modified DFT Filter Banks with Perfect Reconstruction," *IEEE Trans. Circuits and Systems—II: Analog and Digital Signal Proc.*, vol. 46, no. 11, November 1999, pp. 1404-1414 (Karp 1999). These methods trade higher complexity during analysis and subsequent synthesis operations against lower complexity in intervening beamforming operations.

In this detailing of the embodiment, the active bandwidth of the MUOS signal (frequency range over which the MUOS signal has substantive energy) in each MUOS subband is covered by $K_{active}$=40 frequency channels, referred to here as the active channel set for each subband, denoted herein as $\mathcal{K}_{subband}(\ell_{subband})$ for subband $\ell_{subband}$. This can be treated as a constraint which, if altered, must be reflected by compensating changes. This subband-channel set definition has the following specific effects:

the active bandwidth of the B2U signal in MUOS Subband 0 (360-365 MHz) is covered by analysis filter bank frequency channels $$\mathcal{K}_{subband}(0) = \{(-85 + k_{active})\text{mod}\,256\}_{k_{active}=0}^{K_{active}-1},$$

the active bandwidth of the B2U signal in MUOS Subband 1 (365-370 MHz) is covered by analysis filter bank frequency channels $$\mathcal{K}_{subband}(1) = \{(-38 + k_{active})\text{mod}\,256\}_{k_{active}=0}^{K_{active}-1},$$

the active bandwidth of the B2U signal in MUOS Subband 2 (370-375 MHz) is covered by analysis filter bank frequency channels $$\mathcal{K}_{subband}(2) = \{(6 + k_{active})\text{mod}\,256\}_{k_{active}=0}^{K_{active}-1},$$

and
the active bandwidth of the B2U signal in MUOS Subband 3 (375-380 MHz) is covered by analysis filter bank frequency channels $$\mathcal{K}_{subband}(3) = \{(49 + k_{active})\text{mod}\,256\}_{k_{active}=0}^{K_{active}-1}.$$

The intervening frequency channels do not contain substantive B2U signal energy, and can be set to zero as a means for additionally filtering the received signal data.

FIG. 8 shows an exemplary list of channelizer sizes, pertinent parameters, complexity in giga-cycles (billions of cycles) per second (Gcps), and active channel ranges (taken mod $K_{channel}$ to convert to 0:($K_{channel}$−1) channel indices for an analyzer filter bank with $K_{channel}$ frequency channels) for each subband is provided in for the 29.568 Msps analyzer input sampling rate used in the embodiment shown in FIG. 4. Alternate analyzer/synthesizer filter bank parameters can be used to allow processing of additional and/or more narrowband interferes at increased system complexity, or fewer and/or more wideband interferes at decreased system complexity. FIG. 8 also provides the number of samples available within each channel over a 10 ms adaptation frame. As FIG. 8 shows, increasing the number of analyzer channels from 32 to 512 only incurs a 23.5% increase in the complexity of the analyzer (or synthesizer).

The beamforming operation is also implemented using FPGA (30) as noted above. The beam-forming element (34) multiplies the complex output of each analyzer frequency channel by a complex beamforming weight (provided in the BFN weight buffer (41)), and combines the multiplied channels over the antenna dimension. This set of linear combining weights, also known as diversity combining weights are developed (i.e., calculated) by the DSP element (31) performing the Beamforming Weight Adaptation Task which computes linear diversity combining weights over 10 ms adaptation frames to substantively improve the signal-to-interference-and-noise ratio (SINR) of any MUOS signal, by substantively excising interference received in each frequency channel along with that signal, including multiple access interference (MAI) received from other MUOS satellites in the DICE system's field of view (FoV), and by otherwise substantively improving the signal-to-noise ratio (SNR) of the MUOS signal within that frequency channel. In the presence of frequency and time dispersion (differences in spatial signatures of emissions over frequency channels or adaptation frames), including dispersion due to multipath or nonidealities in the DICE receiver, the weights can also substantively suppress or exploit effects of that dispersion, to further improve quality of the signal generated by the appliqué.

Each complex multiply requires 4 real multiplies. At four clock cycles per complex multiply and 256 frequency channels, all beamforming weights can be applied by a single DSP slice for a given antenna path, (4 cycles/antenna)×(0.231 Msps/channel)×(256 channels)=236.544 Mcps/antenna. (18)

The complex samples from each antenna are cascaded and summed to generate the beamformer output.

It should be noted that the total cycle count needed to perform the beamforming operation over all frequency channels is unchanged for the alternate analyzer sizes given in FIG. 8, because the product of (the number of channels)× (the output rate per channel) remains constant for each analyzer size. However, this cycle count can be dropped by a factor of 2 and further computational efficiency attained if additional operations such as those shown in Karp 1999 are performed to reduce the analyzer output rate by 50%, and by an additional 37.5% if the beamforming is only performed over the active channels in each subband. The cycle count is increased by a factor of 2 if the beamforming is used to provide two output ports, e.g., corresponding to each MUOS satellite in the DICE system's field of view.

The output of the beamforming element (20) are 256 frequency channels, comprising 160 modulated frequency channels and 96 zero-filled channels if beamforming is only performed over the active channels in each subband. These frequency channels are converted to a single complex-baseband signal with a 29.568 Msps sampling rate, using a reciprocal Synthesis filter-bank (53) employing efficient FFT-based implementation methods well known to those skilled in the art. The symmetry between the analyzer and synthesizer allows the synthesizer implementation to be identical to the analyzer, only with the blocks rearranged, and with the FFT replaced by an inverse-FFT (IFFT). The IFFT is the same design as the FFT with complex-conjugate twiddle factors. The polyphase filter in the critically-sampled synthesizer is identical to that in the critically-sampled analyzer, with lag-reversed filter coefficients. Therefore the same FPGA HDL design is used.

The 29.568 Msps synthesizer output signal from the Synthesis filter-bank (35) is then multiplied by an LO offset correction in a multiplier (36), and 1:2 interpolated in an interpolation filter (37), resulting in a complex-baseband signal with a 59.136 Msps sampling rate. This signal is then output to the Digital-to-Analog Converter (11) shown in FIG. 2.

The LO offset correction (not needed for the direct-frequency downconversion based system shown in FIG. 1) removes any frequency error introduced by subsequent analog frequency upconversion operations, such as the Dual Upconverting Mixer operation shown in FIG. 2. In the DICE Digital Signal Processing Subsystem embodiment shown in FIG. 4, the LO offset frequency is quantized to values $$\{k_{LO}/K_{LO}\}_{k_{LO}=-\frac{K_{LO}}{2}}^{\frac{K_{LO}}{2}-1},$$

allowing the offset values to be stored in a $K_{LO}$-point look-up table. The offset frequency index $k_{LO}$ can be set via a variety of means, including automatically during calibration intervals (e.g., by transmitting a calibrated tone from the system transmitter and measuring end-to-end frequency offset of that tone through the full system), or by monitoring lock metrics from the MUOS radio. Combined with appropriate calibration operations to measure this frequency offset, this can allow the DICE system to provide an output signal without any offset induced by the system. In this case, the DICE appliqué will not impair the frequency budget of the radio attached to it, nor will it affect internal radio functions that may use the MUOS satellite Doppler shift, e.g., as a geo-observable for radio location or synchronization purposes. Alternate embodiments can incorporate this frequency shift into the LO (7) used to perform frequency upconversion to 370 MHz, or can use higher-quality LO's that obviate the LO offset correction term.

In this embodiment, the interpolation process is effected by first zero-filling the 29.568 Msps interpolator input data with alternating zeros to generate a 59.136 Msps signal, then applying a real 16-tap linear-phase FIR filter with a lowpass-filter response to each IQ rail to suppress the image at ±29.568 MHz. Since every other data sample is zero, the FIR filter is implemented with 8 real multiplies per I and Q rail at a sample rate of 59.136 Msps. This upconversion simplifies the analog filtering and is extremely simple to implement.

A 1:2 interpolation factor is used in the embodiment shown in FIG. 2, in order to reduce frequency rolloff induced by the square DAC time pulses to less than 0.4 dB. In alternate embodiments, the interpolation filter or the frequency channels input to the synthesizer can be preemphasized to remove the ~2 dB rolloff induced by a DAC operating at 29.568 Msps interpolation rate, allowing removal of the 1:2 interpolator. However, this will also require the use of sharper antialiasing filters to remove the DAC output images repeating at multiples of 28.568 MHz The required FPGA resource utilization needed to implement the end-to-end data processing depends on two main resources, respectively DSP slices and internal block RAM. The basic processing as described above only utilizes 135 DSP slices. A Xilinx Kintex® 410T used in one embodiment has, for example, 1590 BRAMs and 1540 DSP slices, therefore less than 8% of that specific FPGA is used in the system.

Based on these numbers, a very low power, low cost FPGA can be used. The above-referenced specific FPGA from Xilinx is but one member of a family (Artix-7) of low power, low cost FPGAs and thus one choice. An additional benefit from using an FPGA from the Artix-7 family is that they are a series of pin compatible devices, which would allow upgrading the FPGA if and as needed in the future. Further processing refinements, e.g., to eliminate the 2× oversampling of analyzer channels or to restrict processing to only the active channels in each subband, should allow use of the other FPGAs, widening the definition of which have 'enough' DSP slices and 'more than enough' BRAM's to process a set of MUOS subbands.

Figure 9:
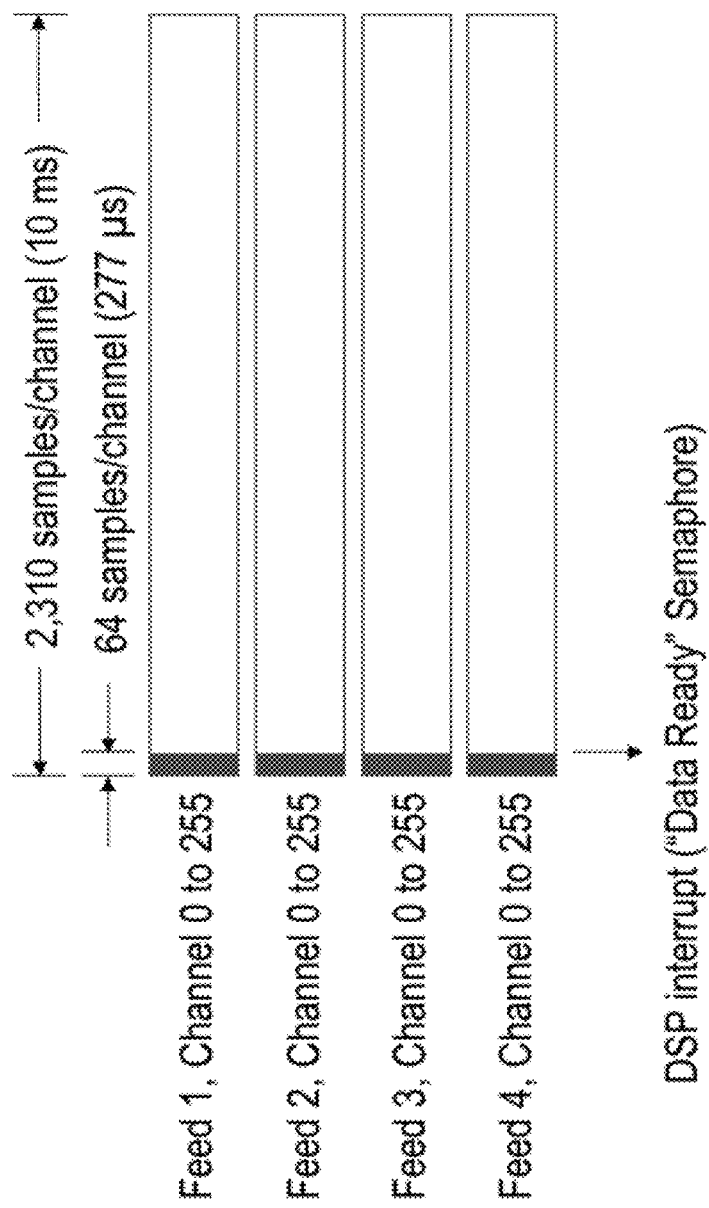
FIG. 9 shows the frame data buffer in a 10 millisecond (ms) adaptation frame.

In the embodiments shown here, the FPGA (30) has an additional master counter (not shown) that separates the received data into 10 ms adaptation frame, e.g., covering exactly 2,310 output samples at the output of each frequency channel in the Analyzer Filter Bank (33a-33d) for the embodiment shown in FIG. 2. As shown in FIG. 5, at the beginning of each 10 ms adaptation frame, the FPGA (30) collects 64 consecutive complex samples from each analyzer frequency channel, and writes those samples into a Frame Buffer (39) whose logical structure is shown in FIG. 9.

Figure 10:
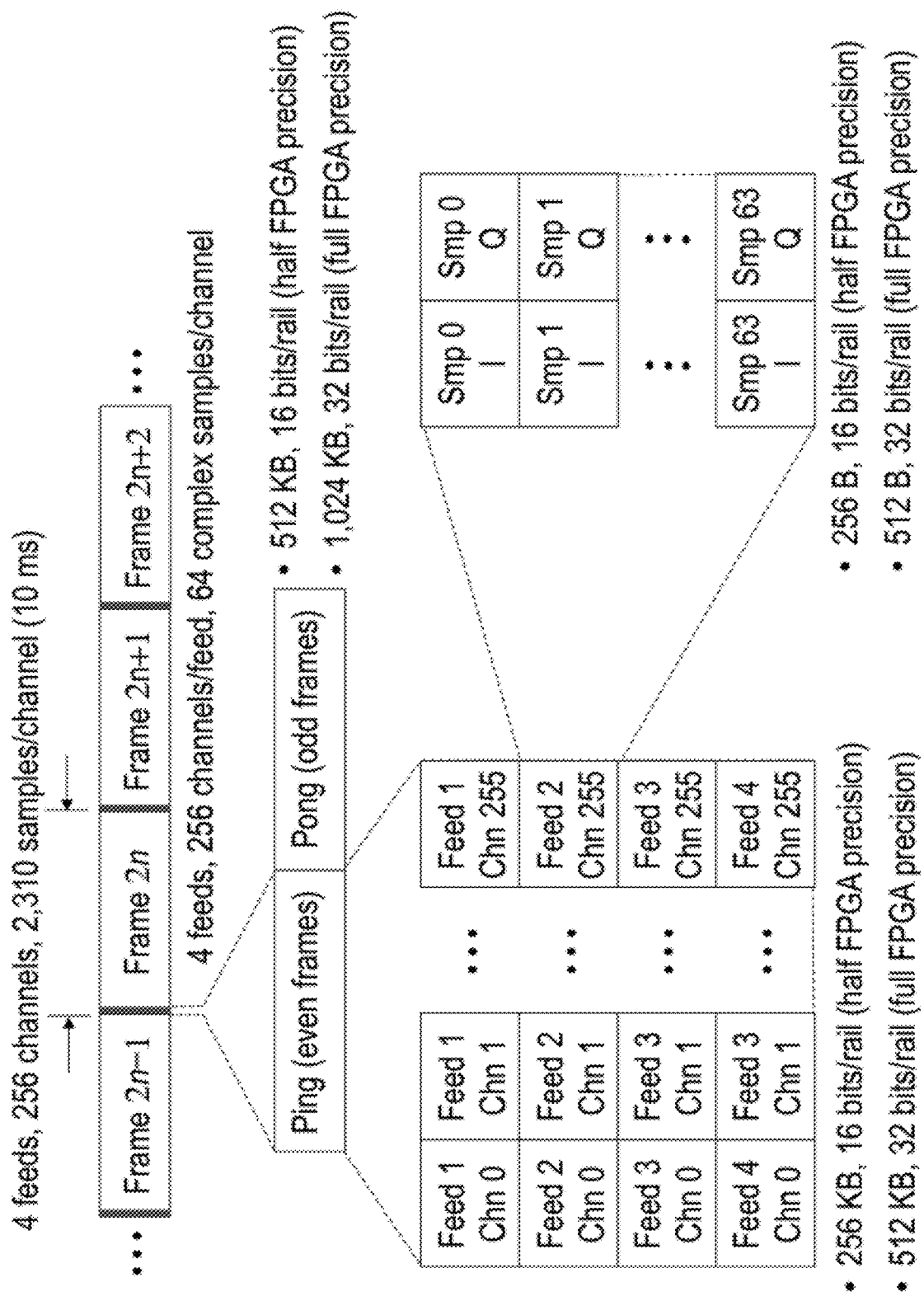
FIG. 10 shows the mapping from frame data buffer to memory used in the DICE digital signal processor (DSP) to implement the beamforming network (BFN) weight adaptation algorithms.

The contents of the Frame Buffer (39) are then transported to the DSP element (31) over the EMIF Bus (32), where they are deposited into memory in the DSP element in accordance with the logical memory structure shown in FIG. 10. Specifically, data is deposited into a "Ping Pong" buffer over even and odd frame intervals, such that the "Ping" subbuffer is overwritten with new data every even interval, and the "Pong" subbuffer is overwritten with new data over every odd interval.

In one DICE embodiment, the data in the Frame Buffer (39) is reduced in precision from the 25 bit precision used in the FPGA (30) to 16 bit precision prior to transfer to the DSP element (31), in order to minimize storage requirements of that chip. This operation has minimal effect in environments dominated by wideband CCI (WBCCI) or MAI; however, it can greatly reduce dynamic range of data in each frequency channel, particularly in environments containing narrowband CCI (NBCCI) with wide variation in dynamic range. Alternate approaches can transport the data to DSP element (31) at full 25 bit precision (or as 32-bit integers), thereby preserving the full dynamic range of the data. The entire buffer requires 512 KB of storage, comprising 256 KB per subbuffer, if data is transferred from the FPGA (30) at 16 bit precision, and requires 1,024 KB (1 MB) of storage, comprising 512 KB/subbuffer, if data is transferred into 32-bit memory, e.g., at the full 25-bit precision of the FPGA (30).

There are various 'mapping' alternatives which may be used for this buffering operation, with performance and accuracy varying by the quality of the match between the mapping choice, the signals environment, and the received/transmitted signal complexity or length. Example mappings include:

"Dense mapping" strategies, in which consecutive data samples are written to the DSP within each adaptation frame, as performed in the primary embodiment. This mapping minimizes effects of sample rate offset and jitter within each frame, and allows additional filtering of data within and between channels in the DSP processing.

"Sparse mapping" strategies, in which subsampled data is written to the DSP within each adaptation frame. This mapping provides additional sensitivity to time-varying interference effects within each frame, e.g., interference bursts with <10 ms duration that may be missed by a dense mapping strategy, but is also more sensitive to sample rate offset and jitter within each frame.

"Randomly" or "pseudorandomly" mapping strategies, in which data is written to the DSP in accordance with a random or pseudorandom sample selection process, for example, to MAI from other emitters that may be adjusting their power levels synchronously with the MUOS transmitter, or to avoid spoofing, interception, or jamming by electronic attack ('EA') measures that might be employed by adversaries attempting to exploit or disrupt the process.

In all cases, variation, however, should be synchronous across at least pairs of adaptation frames (time) and across and for all antenna feeds at each time (sourcing).

Alternate embodiments can also be chosen in which the sampling rate does not provide an integer number of samples per adaptation frame at the output of the Analyzer Filter Bank. This strategy can allow sampling rates that are simpler and/or consistent with other pertinent system parameters, for example, MUOS subband bandwidths or known interference bandwidths and frequency distributions, at cost of additional complexity in the implementation of a beamforming adaptation algorithm to resample the DSP input data to the 10 ms adaptation frame.

One DICE embodiment used for its DSP element a Texas Instruments (TI) TMS320C6455 as the DSP element (31) in the prototype DICE system. This particular embodiment is a fixed-point processor with a 1,200 MHz clock speed, capable of performing a real multiply and add in a single clock cycle, and with 32 KB (kilobytes=1,024 bytes) of "L1 cache" memory to hold data used in direct calculations and 2,048 KB of "L2 cache" memory to hold data input from the FPGA (30), beamforming weights output to the FPGA (30), weight calibration data, and intermediate data and statistics held during and between adaptation frames. The DSP element (31) can read and write registers and data buffers in the FPGA (30) via the EMIF bus (32); in the embodiments shown here, it reads complex Analyzer Filter Bank in from the FPGA (30) using the Frame Buffer (39), and writes beamforming weights resulting from the implementation of a beamforming weight adaptation algorithm to the FPGA (30) using the BFN weight buffer (41).

In this embodiment, the DSP employs the TI-RTOS real-time operation system to implement the beamforming weight adaptation algorithm, a preemptive operating system (OS) that allows multiple tasks to be run "concurrently" with different priority levels. The main task in this embodiment is the Beamforming Weight Adaptation Task shown in FIG. 11.

Once a Beamforming Weight Adaptation Task (99) is created (101), it performs its initial setup (102) and drops into a "while" state where it pends on the Data Ready semaphore (103). When the FPGA (30) has data to send to the DSP element (31) it lowers a general purpose input/output (GPIO) line that triggers an external dynamic memory access (DMA) transfer operation (104). This operation transfers the full antenna data from the Frame Buffer (39) to the appropriate L2 memory subbuffer as shown in FIG. 10. Once data has been transferred from all four feeds, the FPGA (30) then triggers an interrupt, which posts the Data Ready semaphore (105) to the DSP element (31). The latter is now able to run the implementation of the beamforming weight adaptation algorithm task. The implementation of any weight adaptation algorithm available then processes the data (106), adapting the beamforming weights, and transfers data to and from L2 to L1 as needed using an internal dynamic memory access (IDMA) driver.

When the implementation of the Beamforming Weight Adaptation Algorithm has new weights ready (107), it triggers an EDMA transfer to transfer the weights (108) to the BFN weight buffer (41) of the FPGA (30). On completion of this transfer the DSP element (31) will signal the FPGA (30) that new beamforming weights have been transferred and are ready for the latter's use (109).

This transfer can be trigged in several manners. One approach is to call a trigger function provided by an external DMA (EDMA) driver (110). Another approach is to set up the transfer to be triggered on a GPIO interrupt, and then lower this line via software in the method. The latter approach can serve dual purpose of signaling the FPGA (30) of the beamforming transfer, and triggering the transfer.

After triggering the transfer, the implementation of the Beamforming Weight Adaptation Algorithm can continue processing if necessary, or pend on the Data Ready semaphore to wait (105) until new data is ready from the FPGA (30); or that specific task can be destroyed (111). In alternate embodiments, the data transfer from FPGA (30) to DSP element (31) and weight transfer from DSP element (31) to FPGA (30) can be linked, such that the former process does not ensue until after the latter process has occurred; or such that data transfer can occur "on demand" from the DSP element (31), e.g., to respond quickly to new events, or allow random or pseudorandom data transfers to defeat electronic attack (EA) measures by adversaries attempting to corrupt the algorithm. On demand approaches could also have merit if algorithms that require more than 10 ms are implemented in the DSP element (31), e.g., if a low-cost DSP is used by the system, or more advanced methods are implemented in the DSP element (31).

At least one embodiment uses a lower-cost floating-point or hybrid fixed/floating point DSP element (31), with processing speed and capabilities matched to the algorithm implementation used in the system, and with random-access memory (external or internal to the DSP element (31)) to hold data transferred from the FPGA (30) and intermediate run parameters held over between adaptation frames. In alternate embodiments, some or all of this processing can be brought into the FPGA (30), in particular, to perform regular operations easily performed in fixed-point such as per-channel statistics accumulations.

The system embodiment shown in FIG. 1 allows implementation of a DICE Digital Signal Processing Subsystem, in which Dual ADC output data is input to the DSP Subsystem at a 40 Msps complex data rate (i.e., over 2×4=8 data rails, each operating at a 40 Msps data rate), rather than a 118.272 Msps real data rate, and with several optional simplifying differences. Example simplifying differences include:

- Simplification of the digital downconversion and Analysis filter-bank shown in FIG. 4 and described in FIG. 5, by replacing that stage with a single 2:1 decimator ahead of the Analysis Filter Bank (53).
- Operation of the Analysis filter-bank (53) shown in FIG. 5 and described in FIG. 6, using exactly the same implementation process, except at a 20 Msps input date rate rather than a 29.568 Msps input data rate, to provide 128 output frequency channels, each operating at a 312.5 ksps output data rate (3,125 samples per 10 ms frame), with 156.25 kHz separation between frequency channels, such that exactly 32 channels covers each subband in the MUOS B2U band without gaps between frequency channels, and using a prototype filter of order 768 resulting in a 36% decrease in computation complexity over the Analysis filter-bank shown in FIG. 6.
- Operation of the BFN over 128 channels at a 312.5 ksps/channel data rate, without any zero-filling of channels outside the MUOS B2U subband.
- Operation of the Synthesis filter-bank (35) shown in FIG. 4 and described in FIG. 7 at a 20 Msps output data rate in parallel with the Analysis filter-bank (53).
- Elimination of the LO Offset operation (86) shown in FIG. 4, and of the LO Buffer (42) and all algorithms needed to calibrate that operation.
- Operation of the 1:2 interpolator (37) shown in FIG. 4 at a 20 Msps input data rate.

In an alternate embodiment, the 2:1 decimator and 1:2 interpolator can be dispensed with, and the Analysis filter-bank (53) and Synthesis filter-bank (35) can be implemented with a 40 Msps input and output rate, respectively, and with 256 frequency channels, each with a 312.5 ksps data rate, and with 156.25 kHz separation between frequency channels. In this case, 128 of the channels would cover the MUOS B2U band (32 channels covering each subband), and the 128 channels outside the MUOS B2U band would be zero-filled during the BFN operation; subsamples from channels outside the B2U band would not be captured and transferred to the Frame buffer (39).

Two general classes of implementation of Beamformer Weight Adaptation Algorithms are described in detail herein:

- Low-complexity subband-channelized implementation of beamforming weight adaptation algorithms, which compute common weights over each frequency channel covering the active bandwidth of a MUOS subband ("active channels" in a subband), with adjustments to compensate for calibrated frequency dispersion induced in the system front-end. In the primary embodiment, the implementation of the subband-channelized beamforming weight adaptation algorithm uses a multiport self-coherence restoral (SCORE) to adapt the subband weights and avoid specific emitters that can be captured by the method, e.g., continuous wave (CW) tones.
- More powerful/complex fully-channelized implementation of beamforming weight adaptation algorithms, which compute independent beamforming weights on each frequency channel, with adjustments to remove gain offset induced by ambiguities in the implementation of the adaptation algorithm. These implementations of such algorithms can excise independent narrowband interference present in a frequency channel, without expending degrees of freedom to excise interferes that do not occupy that channel. In the primary embodiment, the implementation of the fully-channelized weight adaptation algorithm uses fully-channelized frame-synchronous feature extraction (FC-FSFE) to blindly adapt the 4-element complex spatial combining weights independently in each frequency channel Both implementations of the selected algorithm exploit the first-order almost-periodic aggregated common pilot channel (CPICH) component of the MUOS B2U signal The aggregated CPICH (A-CPICH) comprises sixteen (16) CPICH's transmitted from the MUOS satellite vehicle (SV) with offset scrambling code, carrier frequency (induced by Doppler shift over the ground-station to satellite link), and carrier phase/gain (induced by beam separation). The resultant A-CPICH signal-in-space observed at the radio can be modeled in general by $$p_{A\text{-}CPICH}(t) = \sqrt{2}\,\mathrm{Re}\left\{\sum_{b=1}^{16} g_{TR}(b)p_{CPICH}(t-\tau_{TR}(b);b)e^{j2\pi f_{TR}(b)t}\right\}, \quad (19)$$

where $p_{CPICH}(t;b) = p_{CPICH}(t+T_{frame};b)$ is the first-order periodic beam b CPICH transmitted in beam b, (distorted by local multipath in the field of view of the radio receiver), and where $g_{TR}(b)$, $\pi_{TR}(b)$, and $f_{TR}(b)$ are the observed bulk gain, time-of-flight delay, and receive frequency of the beam b CPICH, and where $T_{frame}=10$ ms is the known frame duration of the MUOS signal. The A-CPICH can therefore be modeled as a first-order almost-periodic component of the MUOS B2U signal. This property also induces a 10 ms cross-frame coherence (nonzero correlation coefficient between signal components separated by 10 ms in time) in the signal received at the DICE system. Moreover, all of these properties are held by that component of the A-CPICH present in each channel of the analysis filter bank, and in the Frame Buffer data passed to the DSP element, regardless of the actual content of the A-CPICH, or the time and frequency offset between the Frame Buffer data and the actual MUOS frame.

The subband-channelized and fully-channelized implementations are described below.

Subband-Channelized Beamforming Weight Adaptation Embodiment

Figure 12:
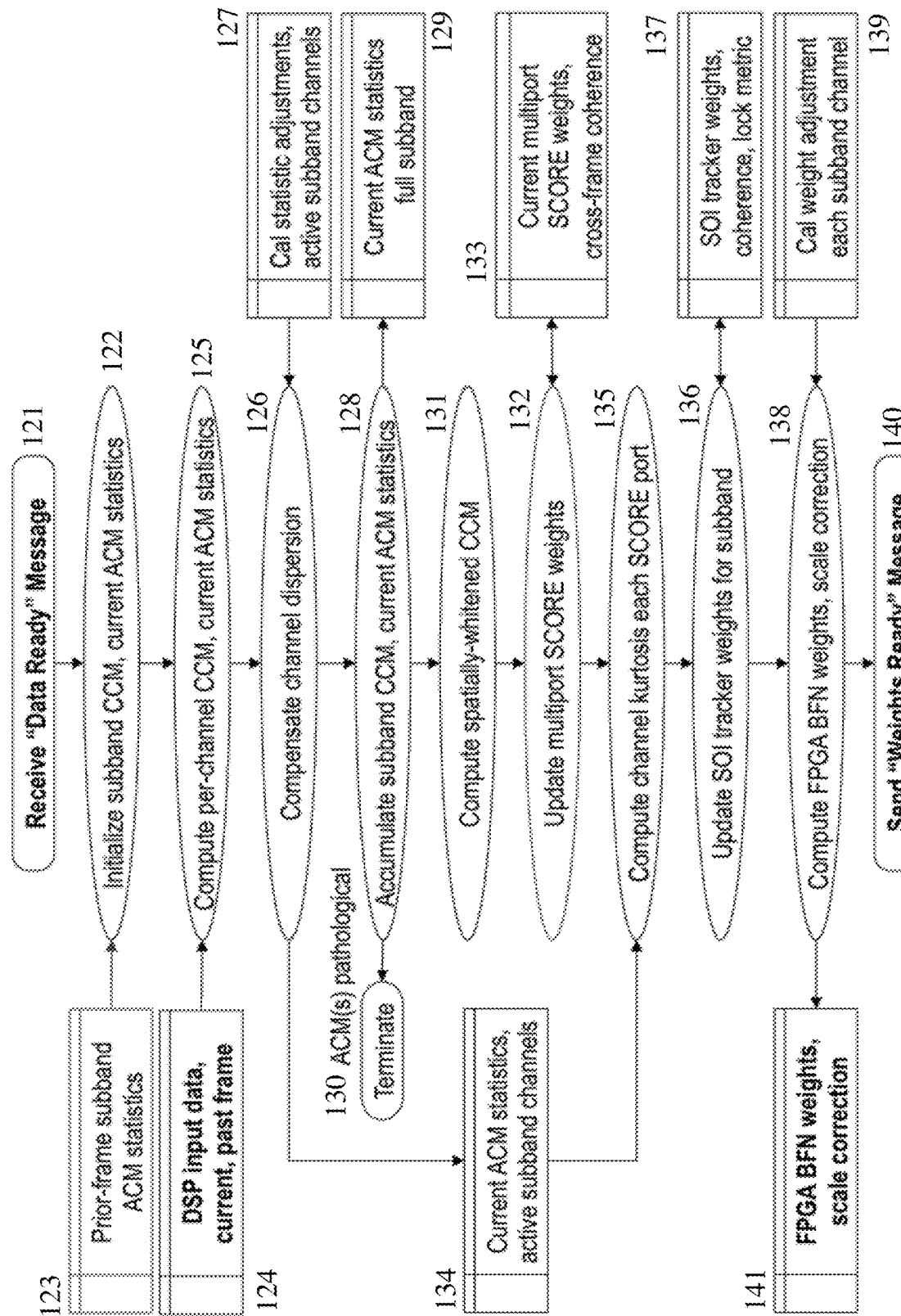
FIG. 12 shows a flow diagram for the implementation of a subband-channelized beamforming weight adaptation algorithm, part of the Beamforming Weight Adaptation Task when a "Data Ready" message is received from the DSP.

FIG. 12 shows the flow diagram of the implementation of a subband-channelized beamforming weight adaptation algorithm in one embodiment. The beamforming weight calculation process begins whenever a "Data Ready" message from the DSP element (31) is received (121). Once this message is received, and under normal operating conditions, the implementation first computes subband cross-correlation matrix (CCM) and autocorrelation matrix (ACM) statistics (122), and retrieves the past ACM statistics for the past frame (123) from the L2 cache of the DSP element (31). The implementation then steps through the 40 frequency channels covering the active bandwidth of the MUOS signal in that subband ("active channels" in that subband); retrieves 128 four-feed data samples written to L2 cache data for that channel over the current and prior data frame (64 four-feed samples per data frame within each frequency channel, out of 2,310 samples available within each 10 ms MUOS frame and frequency channel) (124); and computes unweighted ACM statistics for the current frame and CCM statistics for the current and prior frame (125), as described in further detail below ('Statistics Computation'). The implementation then adjusts those statistics to compensate for known dispersion in that channel (126), (126), using for that channel the precomputed data, i.e. the calibration statistic adjustment (127), stored in the L2 cache. (These just-adjusted current statistics are also used in the computation of channel kurtosis described further below.)

The channel CCM and current ACM statistics are then accumulated over the 40 active channels in the subband (128), to create the subband CCM and current ACM statistics; the Cholesky factor of the current ACM statistics is computed; and those statistics are checked for "pathological condition," e.g., zero-valued Cholesky factor inverse-diagonals. If a pathological condition is not detected, the current ACM statistics are written to L2 cache (129) for the next use; otherwise, processing is terminated without weight adaptation or statistics storage (130).

If prior-frame ACM statistics do not exist, e.g., if the implementation is newly initialized, a pathological data frame is detected during the previous frame, or more than one frame transpires since the "Data Ready" message is received, the implementation initializes the prior-frame ACM statistics as well, and computes ACM statistics and Cholesky factors for the prior and current frame. This is expected to be an infrequent occurrence over operation of the implementation and is not shown.

The CCM statistics and current/prior ACM Cholesky factors are then used to compute the 4×4 spatially-whitened cross-correlation matrix (SW-CCM) of the received data (131). The 4×4 right-singular vectors and 4×1 modes of the singular-value decomposition (SVD) of the SW-CCM are then estimated using an iterative QR method, described below, which provides both spatially-whitened beamforming combiner weights (updated multiport SCORE weights) (132) that can be used to extract the MUOS signal from the received environment (after spatial unwhitening operations), and an estimate of the cross-frame coherence strength (magnitude of the cross-frame correlation coefficient between the current and prior data frames) of the signal extracted by those weights, which are stored (133). The cross-frame coherence strength is also used as a sorting statistic to detect the MUOS signal-of-interest (SOI) and differentiate it from other SOI's and signals not of interest (SNOI's) in the environment. The next two steps, where the embodiment will update the multiport SCORE weights (132) and compute channel kurtosis for each SCORE port (135), are described in detail below ('Multiport Self-Coherence Restoral Weight Adaptation Procedure' and 'Channel Kurtosis Calculation Procedure').

In alternate embodiments, the QR method can be accelerated using Hessenberg decomposition and shift-and-deflation methods well known to those skilled in the art. The specific QR method used here can also be refined to provide the eigendecomposition of the SW-CCM, allowing tracking and separation of signals on the basis of cross-frame coherence phase as well as strength. This last capability can substantively improve performance in environments containing multiple-access interference (MAI) received at equal or nearly-equal power levels.

Figure 13:
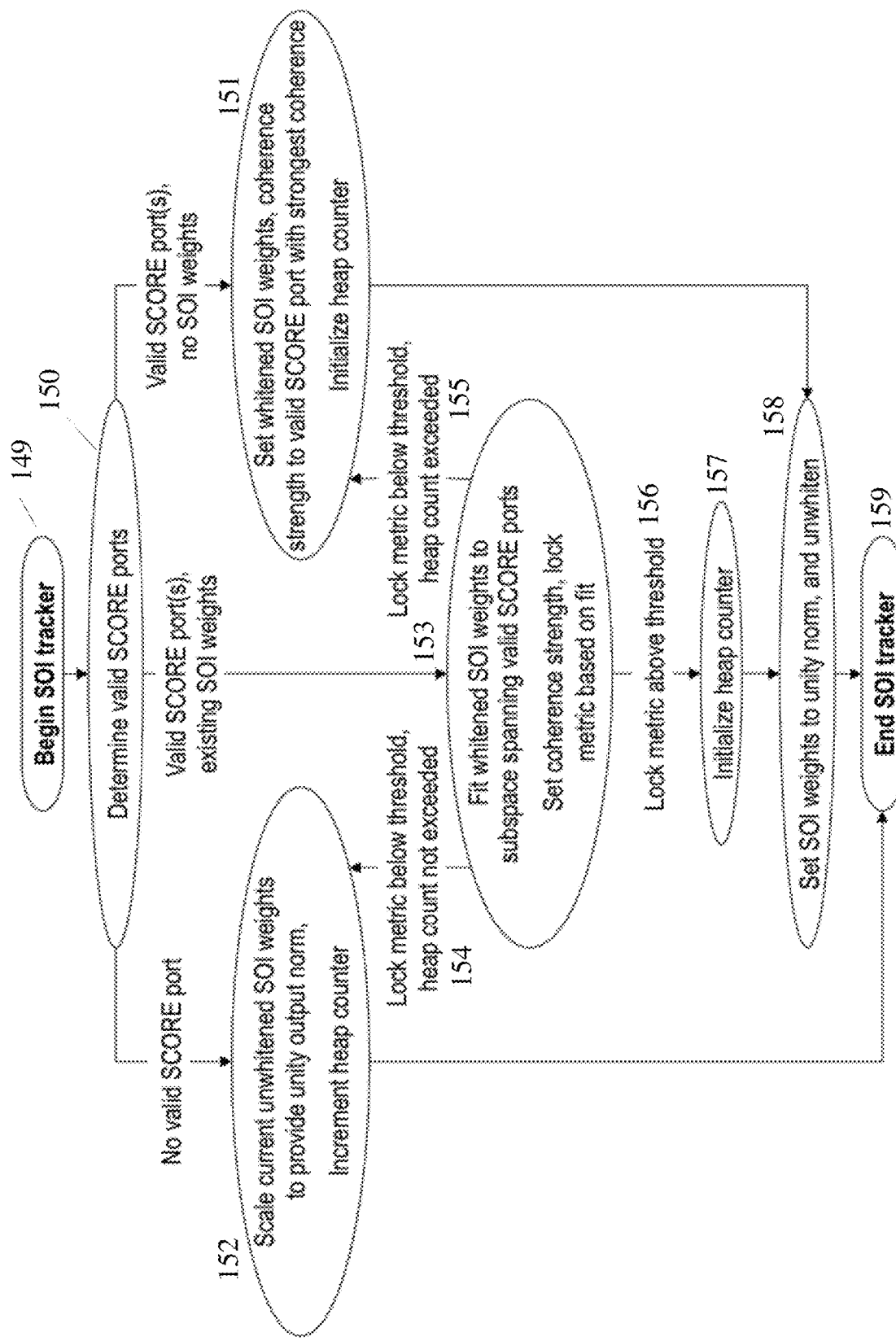
FIG. 13 shows the flow diagram for a single-SOI tracker, used in the implementation of a sub-band-channelized weight adaptation algorithm to match valid self-coherent restoral (SCORE) ports to a single MUOS signal.

The SCORE combining weights are then passed to an implementation of a SOI tracking algorithm (136), shown in FIG. 13, which matches those weights to prior SOI beamforming weights (SOI-tracking weights) (137) in a manner that minimizes effects of unknown dispersion in the receiver channel. Lastly, those weights are adjusted to compensate for known channel dispersion in the receiver front-end (138), using a prestored, calibrated weight adjustment for each frequency channel (139), and (if necessary) converted to complex 16-bit format usable by the DICE FPGA. The beamforming weights are then downloaded to the FPGA (30) which is triggered by a 'Weights Ready' message (140) to process the channelizer output signal over every sample and channel in the active subband (141).

Further details of the SOI tracking algorithm implemented in this embodiment are described below.

Statistics Computation Procedure

The statistics computation is compactly and generally described by expressing the prior-frame and current frame data signals as $N_{TBP} \times M_{feed}$ data matrices $X_{prior}(k_{chn})$ and $X_{current}(k_{chn})$, respectively, $$X_{prior}(k_{chn}) = \begin{pmatrix} x^T(k_{chn}, N_{frame}(n_{frame} - 1)) \\ \vdots \\ x^T(k_{chn}, N_{frame}(n_{frame} - 1) + N_{TBP} - 1) \end{pmatrix} \quad (20)$$

$$X_{current}(k_{chn}) = \begin{pmatrix} x^T(k_{chn}, N_{frame} n_{frame}) \\ \vdots \\ x^T(k_{chn}, N_{frame} n_{frame} + N_{TBP} - 1) \end{pmatrix} \quad (21)$$

where $M_{feed}$ is the number of antenna feeds ($M_{feed}=4$ in an embodiment), $k_{chn}$ is the index of a frequency channel covering a portion of the subband modulated by substantive MUOS signal energy (active channel of the subband), $n_{frame}$ is the index of a 10 ms DICE adaptation frame (unsynchronized with the true MUOS frame), $N_{frame}$ is the number of channelizer output samples per 10 ms DICE data frame (2,310 samples for the 231 ksps channelizer output sampling rate used in the DICE prototype system), and $N_{TBP}$ is the number of samples or DICE time-bandwidth product (TBP) used for DICE statistics accumulation over each frame ($N_{TBP}=64$ in the embodiments shown here), and where $$x(k_{chn}, n_{chn}) = [x_{chn}(k_{chn}, n_{chn}; m_{feed})]_{m_{feed}=1}^{M_{feed}}$$

is the $M_{feed} \times 1$ output signal over frequency channel $k_{chn}$ and channelizer output time sample $n_{chn}$, and $(\bullet)^T$ denotes the matrix transpose operation.

In the simplest DSP instantiation, $N_{frame}$ should be an integer; however, more complex instantiations, e.g., using sample interpolation methods, can relax this condition if doing so results in significant cost/complexity reduction in the overall system. The important requirement is that $X_{prior}(k_{chn})$ and $X_{current}(k_{chn})$ be separated in time by 10 ms (or an integer multiple of 10 ms), e.g., a single period of the MUOS CPICH (or an integer multiple of that period).

Using this notation, the per-channel CCM and current ACM statistics are given by $$R_{x_{prior}x_{current}}(k_{chn}) = X_{prior}^H(k_{chn})X_{current}(k_{chn}) \quad (22)$$

$$R_{x_{current}x_{current}}(k_{chn}) = X_{current}^H(k_{chn})X_{current}(k_{chn}) \quad (23)$$

for frequency channel $k_{chn}$, where $(\bullet)^H$ denotes the conjugate (Hermitian) transpose. If dispersion compensation is performed by the system (discussed in more detail below), the per-channel CCM and current-ACM statistics are then adjusted to remove dispersion by setting $$R_{x_{prior}x_{current}}(k_{chn}) \leftarrow R_{x_{prior}x_{current}}(k_{chn}) \circ (w_{cal}^*(k_{chn})w_{cal}^T(k_{chn})), \quad (24)$$

$$R_{x_{current}x_{current}}(k_{chn}) \leftarrow R_{x_{current}x_{current}}(k_{chn}) \circ (w_{cal}^*(k_{chn})w_{cal}^T(k_{chn})), \quad (25)$$

where "○" denotes the element-wise (Hadamard) product and $(\bullet)^*$ denotes the complex conjugation operation, and where $\{w_{cal}(k_{chn})\}$ is a set of calibration weight adjustments (the Current Mulitport Score weights (133), computed during prior calibration operations and stored in L2 cache). In the embodiments shown here, calibration statistic adjustments ('Cal statistic adjustments') (127)

$$R_{cal}(k_{chn}) \triangleq w_{cal}^*(k_{chn})w_{cal}^T(k_{chn}) \quad (26)$$

are also precomputed and stored in L2 cache, in order to minimize computation required to perform the processes implementing computation of Equations (24)-(25). The per-channel current-ACM statistics also are written to L2 cache (129), where they are used in the implementation of the channel kurtosis calculation (135) (described in more detail below).

The per-channel CCM and current-ACM statistics are then accumulated (128) using formula $$R_{x_{prior}x_{current}} = \sum_{k_{chn} \in \mathcal{K}_{subband}} R_{x_{prior}x_{current}}(k_{chn}) \quad (27)$$

$$R_{x_{current}x_{current}} = \sum_{k_{chn} \in \mathcal{K}_{subband}} R_{x_{current}x_{current}}(k_{chn}) \quad (28)$$

for DICE adaptation frame $n_{frame}$, where $\mathcal{K}_{subband}$ is the set of active frequency channels covering the bandwidth of the MUOS signal with substantive energy. (To simplify notation used here, the reference to a specific subband $\ell_{subband}$ shall be dropped except when needed to explain operation of the system, and it shall be understood that $\mathcal{K}_{subband}$ is referring to one of the specific active subbands $$\{\mathcal{K}_{subband}(\ell_{subband})\}_{\ell_{subband}=0}^3$$

processed by the DICE system.)

The Cholesky factors of the current ACM statistics are then computed, yielding $$R_{x_{current}} = \text{chol}\{R_{x_{current}x_{current}}\}, \quad (29)$$

where $R_x = \text{chol}\{R_{xx}\}$ is the upper-triangular matrix with real-nonnegative diagonal elements yielding $R_x^H R_x = R_{xx}$ for general nonnegative-definite matrix $R_{xx}$. The spatially-whitened CCM (131) is then given by $$T_{x_{prior}x_{current}} = C_{x_{prior}}^H R_{x_{prior}x_{current}} C_{x_{current}}, \quad (30)$$

where $C_x = R_x^{-1}$ is the inverse Cholesky factor of $R_{xx}$. The multiplications shown in (30) are performed using back-substitution algorithms, requiring storage of only the diagonal elements of $C_x$, which are themselves generated as an intermediate product of the Cholesky factorization operation and are equal to the inverse of the diagonal elements of $R_x$. This reduces the computational density and storage requirements for these operations.

Note that the CCM and ACM statistics given by the processes implementing computation of Equations (22)-(28) are unweighted, that is, the summation does not include a tapering window and is not multiplied by the time-bandwidth product of the input data matrices (the ACM statistics are more precisely referred to as Grammian's in this case). This normalization can be added with no loss of generality (albeit at some potential cost in complexity if $N_{TBP}$ is not a power of two) if computed using a floating point DSP element (31); the unnormalized statistics shown here are the best solution if a fixed or hybrid DSP element (31) is used to compute the statistics, or if the ACM and CCM statistics computation is performed in the FPGA (30) in alternate embodiments. Unweighted statistics are employed here to both reduce operating time of the statistics accumulation, and to avoid roundoff errors for a fixed-point DSP element (31) used in this DICE embodiment. Because the input data has 16-bit precision (and even in systems in which data is transferred at its full 25 bit precision), the entire accumulation can be performed at 64-bit (TI double-double) precision accuracy without incurring roundoff or overflow errors. Moreover, any weighting is automatically removed by the spatial whitening operation shown in the processes implementing computation of Equation (30). However, care must be taken to prevent the calibration statistic adjustment from causing overflow of the 64-bit statistics.

In this embodiment of the DICE system, an additional step is taken immediately before the statistics accumulation, to remove a half-bit bias induced by the FPGA (30). In a 16-bit reducing embodiment, the FPGA (30) truncates the 25-bit precision channelizer data to 16-bit accuracy before transferring it to the DSP element (31), which adds a negative half-bit bias to each data sample passed to the DSP element (31). Because the bias is itself self-coherent across frames, it introduces an additional feature that is detected by the algorithm (in fact, it is routed to the first SCORE port and rejected by the SOI tracker). In order to reduce loading caused by this impairment, the DSP data is adjusted using the, the processes implementing computation of:

$$X_{current}(k_{chn}) \leftarrow 2X_{current}(k_{chn}) + \text{complex}(1,1), \quad (31)$$

i.e., each rail of $X_{current}(k_{chn}, n_{frame})$ is upshifted by one bit and incremented by 1, after conversion to 64-bit precision but before the ACM and CCM operation (128). This impairment can be removed in the FPGA (30) by replacing the truncation operation with a true rounding operation; however, the data is preferentially transferred to the DSP element (31) at full 25-bit precision to eliminate this effect and improve dynamic range of the algorithm's implementation in the presence of narrowband interference.

Also, embodiment preferentially uses a hybrid or floating point DSP element (31), rather than a fixed-point DSP. This enables access to BLAS, LINPACK, and other toolboxes that will be key to alternate system embodiments (e.g., coherence phase tracking algorithms requiring EIG rather than SVD operations).

Assuming the SW-CCM is computed (131) every frame, complexity of the statistic accumulation operation can be substantively reduced by storing the prior-frame ACM statistics and Cholesky factors at the end of each frame, and then reusing those statistics in subsequent frames (134). If the prior-frame ACM statistics do not exist, then the prior-frame ACM statistics are computed using processes implementing computation of:

$$X_{prior}(k_{chn}) \leftarrow 2X_{prior}(k_{chn}) + \text{complex}(1,1) \tag{32}$$

$$R_{x_{prior}x_{prior}}(k_{chn}) = X_{prior}^H(k_{chn})X_{prior}(k_{chn}) \tag{33}$$

$$R_{x_{prior}x_{prior}}(k_{chn}) \leftarrow R_{x_{prior}x_{prior}}(k_{chn}) \circ (w_{cal}^*(k_{chn})w_{cal}^T(k_{chn})) \tag{34}$$

$$R_{x_{prior}x_{prior}} = \sum_{k_{chn} \in k_{subband}} R_{x_{prior}x_{prior}}(k_{chn}) \tag{35}$$

$$R_{x_{prior}} = \text{chol}\{R_{x_{prior}x_{prior}}\}. \tag{36}$$

This condition will occur during the first call of the algorithm; if a pathological data set is encountered; or if for any reason a frame is skipped between algorithm calls.

In an alternate embodiment, the CCM and ACM statistics are additionally exponentially averaged to improve accuracy of the statistics, by using processes implementing computation of $$R_{x_{prior}x_{current}}(k_{chn}) \leftarrow \mu R_{x_{prior}x_{current}}(k_{chn}) + X_{prior}^H(k_{chn}) X_{current}(k_{chn}) \tag{37}$$

$$R_{x_{current}x_{current}}(k_{chn}) \leftarrow \mu R_{x_{prior}x_{prior}}(k_{chn}) + X_{current}^H(k_{chn}) X_{current}(k_{chn}), \tag{38}$$

rather than the processes implementing computation of Equations (22)-(23) to compute the CCM and ACM statistics in FIG. 12, where $0 \leq \mu < 1$ is an exponential forget factor that reduces to the primary embodiment for $\mu=0$. A slightly less computationally complex operation can be implemented by exponentially averaging the CCM and ACM statistics after the channel combining operation, e.g., by using $$R_{x_{prior}x_{current}} \leftarrow \mu R_{x_{prior}x_{current}} + \sum_{k_{chn} \in k_{subband}} R_{x_{prior}x_{current}}(k_{chn}) \tag{39}$$

$$R_{x_{current}x_{current}} \leftarrow \mu R_{x_{current}x_{current}} + \sum_{k_{chn} \in k_{subband}} R_{x_{current}x_{current}}(k_{chn}), \tag{40}$$

to update the subband ACM and CCM statistics in FIG. 12, where $R_{x_{prior}x_{current}}(k_{chn})$ and $R_{x_{current}x_{current}}(k_{chn})$ are given by processes implementing Equations (24) and (25), respectively. Exponential averaging can increase the effective time-bandwidth product of the CCM and by a factor of $1/(1-\mu)$, e.g., by a factor of four for $\mu=\frac{3}{4}$, resulting in a 6 dB improvement in feature strength for signals received with a maximum attainable SINR that is greater than 1.

In both cases, the exponential averaging can be performed without overloading fixed averaging operations, if the effective TBP improvement does not overload the dynamic range of the DSP element (31). For the example given above, exponential averaging only loads 2 bits of dynamic range onto the averaging operation.

The forget factor $\mu$ can also be dynamically adjusted to react quickly to dynamic changes in the environment, e.g., as interferes enter or leave the channel, or if the cross-frame correlation of the MUOS signal changes abruptly. The ACM statistics can be used to detect these changes with high sensitivity and under strong co-channel interference, e.g., using methods described in [B. Agee, "Fast Acquisition of Burst and Transient Signals Using a Predictive Adaptive Beamformer," in *Proc. 1989 IEEE Military Communications Conference*, October 1989].

Multiport Self-Coherence Restoral Weight Adaptation Procedure

The baseline multiport self-coherence restoral (SCORE) algorithm used in this DICE embodiment is implemented using the iterative QR method, $$\{U_{current}, D_{SCORE}\} \leftarrow QRD\{T_{x_{prior}x_{current}}^H U_{prior}\} \tag{41}$$

$$\{U_{prior}, D_{SCORE}\} \leftarrow QRD\{T_{x_{prior}x_{current}} U_{current}\}, \tag{42}$$

where $U_{prior}$ is the spatially-whitened combiner weights from the prior frame, and where $\{U,D\}=QRD\{V\}$ is the QR decomposition (QRD) of general complex $M_{feed} \times L_{port}$ matrix V, such that D and U satisfy $$D = \text{chol}\{V^H V\} \tag{43}$$

$$DU = V \tag{44}$$

if V has full rank such that D is invertible. The QRD can be computed using a variety of methods; in the DICE embodiment it is performed using a modified Graham-Schmidt orthogonalization (MGSO) procedure. If $U_{prior}$ does not exist (initialization event), then $\{U_{current}, D_{SCORE}\}$ is initialized to $$\{U_{current}, D_{SCORE}\} = QRD\{T_{x_{prior}x_{current}}^H((M_{feed}-L_{port}): M_{feed}, :)\} \tag{45}$$

where $T_{x_{prior}x_{current}}((L_{port}-M_{feed}):M_{feed},:)$ is the lower $L_{port}$ columns of $T_{x_{prior}x_{current}}$.

Over multiple iterations of the processes implementing computation of Equations (41)-(42), $\{U_{prior}, D_{SCORE}, U_{current}\}$ converges exponentially to the SVD of $T_{x_{prior}x_{current}}$, $$\{U_{prior}, D_{SCORE}, U_{current}\} \rightarrow SVD\{T_{x_{prior}x_{current}}\} \tag{46}$$

$$\Leftrightarrow T_{x_{prior}x_{current}} = U_{prior} D_{SCORE} U_{current}^H, \begin{cases} U_{prior}^H U_{prior} = I_{M_{feed}} \\ U_{current}^H U_{current} = I_{M_{feed}} \\ D_{SCORE} = \text{diag}\{d_{score}\} \end{cases} \tag{47}$$

where $I_{M_{feed}}$ is the $M_{feed} \times M_{feed}$ identity matrix and diag$\{d\}$ is the Matlab diag operation for vector input d, with exponential convergence based on the ratio between the elements of $d_{SCORE}$ (also referred to as the mode spread of the SVD). It should also be noted that the recursion can be employed for $L_{port} < M_{feed}$ ports, in which case the implementation of the algorithm converges to the first $L_{port}$ strongest modes of the SVD with exponential convergence (greatly reducing the computational processing load). For the simplest case where $L_{port}=1$, the implementation of the algorithm reduces to a power method recursion.

After multiple iterations of the processes implementing computation of Equations (41)-(42), the final SCORE weights and modes are computed from:

$$\{U_{current}, D_{SCORE}\} \leftarrow QRD\{T_{x_{prior}x_{current}}^H U_{prior}\} \text{ (final QR iteration)} \quad (48)$$

$$d_{SCORE} = \text{diag}\{D_{SCORE}\} \text{ (diagonal element selection)} \quad (49)$$

$$R_{x_{current}} W_{SCORE} = U_{current} \text{ (spatial unwhitening operation),} \quad (50)$$

where $\text{diag}\{D\} = [D_{\ell,\ell}]_{\ell=1}^{L_{port}}$ is the Matlab diag operation for $L_{port} \times L_{port}$ matrix input D, and where the process implementing Equation (50) is performed using a back-substitution operation. The unwhitened SCORE combiner weights also orthonormalize the output signal, $$W_{SCORE}^H R_{x_{current}x_{current}} W_{SCORE} = U_{current}^H U_{current} = I_{L_{port}} \quad (51)$$

regardless of how well $U_{current}$ converges to the right-singular vectors of $T_{x_{prior}x_{current}}(n_{frame})$.

In practice, only the processes implementing Equations (48)-(50) need be computed over each frame, i.e., the processes implementing QR recursion described in Equations (41)-(42) may be skipped, thereby greatly reducing complexity of the processing and computation of this implementation. This results in a stochastic QR method over multiple frames, in which the modes converge to the modes of the underlying asymptotic SVD of the spatially-whitened CCM, with continuous, low-level misadjustment due to random differences between the measured and asymptotic signal statistics. Under normal operating conditions where the MUOS signal is received at a low signal-to-white-noise ratio (SWNR), this misadjustment will be small; however, at higher power levels and especially in dispersive environments, this misadjustment can be significant. In this DICE embodiment, four recursions of the processes implementing Equations (41)-(42) are performed in each frame to minimize this effect.

After they are computed, both $U_{current}$ and $W_{SCORE}$ are written to L2 cache, where they are used as prior weights in subsequent adaptation frames (123). Under normal operating conditions, $U_{current}$ from the current frame is used as $U_{prior}$ to initialize in the next frame to initialize the processes implementing either Equation (41) or (48) without change; however, if a skipped frame is detected, $U_{prior}$ is set from $W_{SCORE}$ using spatial whitening through the process implementing:

$$U_{prior} = R_{x_{prior}} W_{SCORE} \quad (52)$$

prior to activating the processes implementing Equation (41) or (48), where $R_{x_{prior}}$ is also newly computed over that frame.

Alternate embodiments of the processes implementing the methods described by these equations can accelerate convergence of the SVD, for example, using Hessenberg decomposition and shift-and-deflation methods well known to those skilled in the art. However, the benefits of that acceleration are uncertain for the stochastic QR method, especially if only the processes implementing Equations (48)-(50) are computed over each frame. Such SVD-convergence acceleration comes with an initial cost to compute the Hessenberg decomposition at the beginning of the recursion, and to convert the updated weights from the Hessenberg decomposition at the end of the recursion, that may outweigh the performance advantages of the approach.

Similar acceleration methods can be Old to compute the true eigendecomposition of $T_{x_{prior}x_{current}}$, which provides a complex eigenvalue related to the cross-frame coherence strength and phase of the MUOS A-CPICH. The cross-coherence phase will differ between different satellites in the field of view of antennas attached to the receiver. Hence, this refinement can greatly enhance ability to detect and separate multiple access interference (MAI) in operational MUOS systems, especially in reception scenarios in which the MUOS emissions have nearly equal observed power levels at antennas attached to the receiver. This approach provides additional protection against EA measures designed to spoof or destabilize the algorithm, by providing an additional feature dimension (coherence phase) that must be duplicated by the spoofer.

The SCORE modes $d_{SCORE}$ are used by the SOI tracker to provide a first level of discrimination between SOI's and signals-not-of-interest (SNOI's). Based on information provided in the public literature, and on statistics gathered during operation of the invention in real representative test environments, the MUOS signal should have a cross-frame coherence strength (correlation coefficient magnitude between adjacent 10 ms MUOS frames) between 0.1 and 0.5. In contrast, a CW tone should have a cross-frame coherence strength of unity, and a non-MUOS interferer should have a cross-frame coherence strength of zero. Accordingly, a minimum coherence of 0.1 ($d_{SCORE} \geq d_{min} = 0.1$) and maximum coherence threshold of 0.5 ($d_{SCORE} \leq d_{max} = 0.5$) are used to provide a first level of screening against non-MUOS signals.

Channel Kurtosis Calculation Procedure

The set of processes implementing the channel kurtosis algorithm (135) provides a second level of screening against CW signals as well as any narrowband interferes that may be inadvertently detected by the SCORE algorithm, by computing the kurtosis of the linear combiner output power over the active channels in the MUOS subband (134). The channel kurtosis is given by $$K_{subband}(\ell_{port}) \triangleq K_{subband} \frac{\sum_{k_{chn} \in K_{active}} R_{y_{current}y_{current}}^2 (k_{chn}; \ell_{port})}{(\sum_{k_{chn} \in K_{active}} R_{y_{current}y_{current}} (k_{chn}; \ell_{port}))^2}, \quad (53)$$

where $K_{subband}$ is the number of frequency channels covering the active bandwidth of the MUOS signal ($K_{subband} = 40$ for this DICE system embodiment), and where $R_{y_{current}y_{current}}(k_{chn}; \ell_{port})$ is the unnormalized power (L2 Euclidean norm) of the port $\ell_{port}$ SCORE output signal on frequency channel $k_{chn}$, $$R_{y_{current}y_{current}}(k_{chn}; \ell_{port}) \triangleq w_{SCORE}^H(\ell_{port}) R_{x_{current}x_{current}}(k_{chn}) \quad (54)$$

$$w_{SCORE}(\ell_{port})$$

$$= \|y_{current}(k_{chn}, \ell_{port})\|_2^2$$

$$y_{current}(k_{chn}, \ell_{port}) \triangleq X_{current}(k_{chn})(w_{cal}(k_{chn}) \circ w_{SCORE}(\ell_{port})),$$

and where $w_{SCORE}(\ell_{port}) = W_{SCORE}(:, \ell_{port})$ is column $\ell_{port}$ of $W_{SCORE}$. From (51), it can be shown that $$\sum_{k_{chn} \in K_{active}} R_{y_{current}y_{current}}(k_{chn}; \ell_{port}) = \quad (55)$$

$$w_{SCORE}^H(\ell_{port}) R_{x_{current}x_{current}} w_{SCORE}(\ell_{port}) \equiv 1, \ell_{port} = 1, \ldots, L_{port}$$

allowing simplification $$\kappa_{subband}(\ell_{port}) = K_{subband}\iota_{cy_{subset}^2}R^2_{y_{current}y_{current}}(k_{chn};\ell_{port}). \quad (56)$$

The channel kurtosis is greater than unity, is approximated by unity for a MUOS SOI, and is approximated $K_{SNOI}/K_{subband}$ for a SNOI occupying $K_{SNOI}$ frequency channels. In this DICE embodiment, SCORE ports with kurtosis greater than 8 ($K_{subband} > K_{max} = 8$), corresponding to 924 kHz SOI bandwidth, are identified as SNOI ports, even if their cross-frame coherence strength is within the minimum and maximum threshold set by the SCORE algorithm.

Channel kurtosis is one of many potential metrics of spectral occupancy of the subband. It is chosen here because an implementation of it can be computed at low complexity and with low memory requirement. As a useful byproduct (further enhancing computational efficiency of the invention), this instantiation of the algorithm also computes the spectral content of each SCORE output signal, which can be used in ancillary display applications.

SOI Tracker Procedure

FIG. 13 shows the flow diagram for a process (or sub-method) implementing the algorithm used to update SOI beamforming weights in the subband-channelized DICE embodiment. This procedure (SOI Tracker) is activated (149) and tests whether any valid SCORE ports are available (150) when either (a) SOI beamforming weights are available for the subband (136), or (b) valid SCORE ports (e.g., SCORE ports that meet the cross-frame coherence and channel kurtosis criteria possessed by valid MUOS signals) are identified by the SCORE processes shown in FIG. 12 (135). If no SOI beamforming weights (also referred to in this embodiment as "SOI weights" for brevity) are available for the subband, but at least one valid SCORE port has been identified, then the process initializes $w_{SOI}$ to the valid SCORE port with the highest coherence strength, and initializes a heap counter (sets heap count $c_{heap}$ for the subband to zero) (151). If no valid SCORE ports are found during the current frame, and SOI beamforming weights $w_{SOI}$ are available for the subband (137), the process adjusts the SOI beamforming weights $w_{SOI}$ for the subband to yield a beamformer output signal with unity norm, by setting $$w_{SOI} \leftarrow \frac{w_{SOI}}{\|u_{SOI}\|_2}, \quad (57)$$

where $u_{SOI} = R_{x_{current}} w_{SOI}$ is the $M_{feed} \times 1$ SOI beamformer combiner weights, whitened over the current data frame, and the heap count is incremented by one ($c_{heap} \leftarrow c_{heap}+1$) (152).

If valid SCORE ports have been found, and SOI beamforming weights are available, then a lock metric is computed based on the least-squares (LS) fit between the spatially whitened SOI beamforming weights $u_{SOI}$ and the valid SCORE ports, given by $$\varepsilon_{SOI}(\mathcal{L}_{valid}) = \min_{g \in \mathbb{C}^{L_{valid}}} \frac{\|u_{SOI} - U_{current}(:,\mathcal{L}_{valid})g\|_2^2}{\|u_{SOI}\|_2^2}, \quad (58)$$

where $\mathcal{L}_{valid} = \{\ell_{port}(1), \ldots, \ell_{port}(L_{valid})\}$ is the set of $L_{valid}$ SCORE ports that meet the cross-frame coherence and channel kurtosis thresholds set in the process implementing the multiport SCORE algorithm (see FIG. 14), and $U_{current}(:,\mathcal{L}_{valid})$ is the $M_{feed} \times L_{valid}$ matrix spatially whitened SCORE weights computed over the valid SCORE ports, $$U_{current}(:,\mathcal{L}_{valid}) = [U_{current}(:,\ell_{port}(1)) \ldots U_{current}(:,\ell_{port}(L_{valid}))], \quad (59)$$

and where $U(:,\ell)$, is the $\ell^{th}$ rightmost column of matrix U. Because the whitened multiport SCORE weights are orthonormal, the LS fit is simply computed using the cross-product $$g_{LS} = U_{current}^H(:,\mathcal{L}_{valid})u_{SOI} \quad (60)$$

$$\Rightarrow \varepsilon_{SOI}(\mathcal{L}_{valid})|_{LS} = 1 - \frac{\|g_{LS}\|_2^2}{\|u_{SOI}\|_2^2} \quad (61)$$

$$= 1 - \rho_{lock}^2,$$

where $\rho_{lock}$ is the lock metric, also referred to here as the lock-break statistic, $$\rho_{lock} \triangleq \|g_{LS}\|_2/\|u_{SOI}\|_2. \quad (62)$$

The lock-break statistic is guaranteed to be between 0 and 1, and is equal to unity if the prior weights lie entirely within the space spanned by the valid SCORE weights (153).

If the lock metric is below a preset lock-fit threshold ($\rho_{lock} < \rho_{min}$), then the tracker is presumed to be out of lock. In this case, if the heap count has not exceeded a specified maximum heap count threshold ($c_{heap} \leq c_{max}$) (154), then the process assumes that an anomalous event has caused lock to break, adjusts the SOI beamforming weights for the subband to unity output norm using the processes implementing Equation (57), i.e., without changing the SOI beamforming weights except for a power adjustment, and increments the heap count by one ($c_{heap} \leftarrow c_{heap}+1$) (152). If the lock metric is below the threshold and the heap count has been exceeded ($c_{heap} > c_{max}$) (155), then the process assumes that lock has been lost completely, sets $w_{SOI}$ to the valid SCORE port with the highest coherence strength, and resets $c_{heap}$ for the sub-band to zero (151). In an embodiment, the maximum heap count threshold is set to 200 ($c_{max}=200$).

If the lock metric is above the lock-fit threshold ($\rho_{lock} \geq \rho_{min}$) (156), then the process resets (initializes) $c_{heap}$ for the subband to zero (157), and sets the spatially-whitened SOI beamforming weights to the unit-norm LS fit between the prior weights and the valid multiport SCORE beamforming weights, $$u_{SOI} \leftarrow U_{current}(:,\mathcal{L}_{valid})\frac{g_{LS}}{\|g_{LS}\|_2}, \quad (63)$$

where $g_{LS}$ is given by the processes implementing Equation (60). The new unit-norm, spatially-unwhitened SOI tracker weights are then computed using back-substitution (158)

$$R_{x_{current}} w_{SOI} = u_{SOI}. \quad (64)$$

These three paths all end with terminating (159) this SOI Tracker procedure.

For one DICE embodiment, the lock-fit threshold is set to ($\rho_{min}=0.25$). This tracker algorithm implementation is chosen to minimize effects of hypersensitivity in highly dispersive environments where the MUOS SOI can induce multiple substantive SCORE solutions, and to maintain phase and gain continuity between adaptation frames. In addition, the LS fitting process is easily refined over multiple data frames using statistics and weights computed in prior steps.

Figure 14:
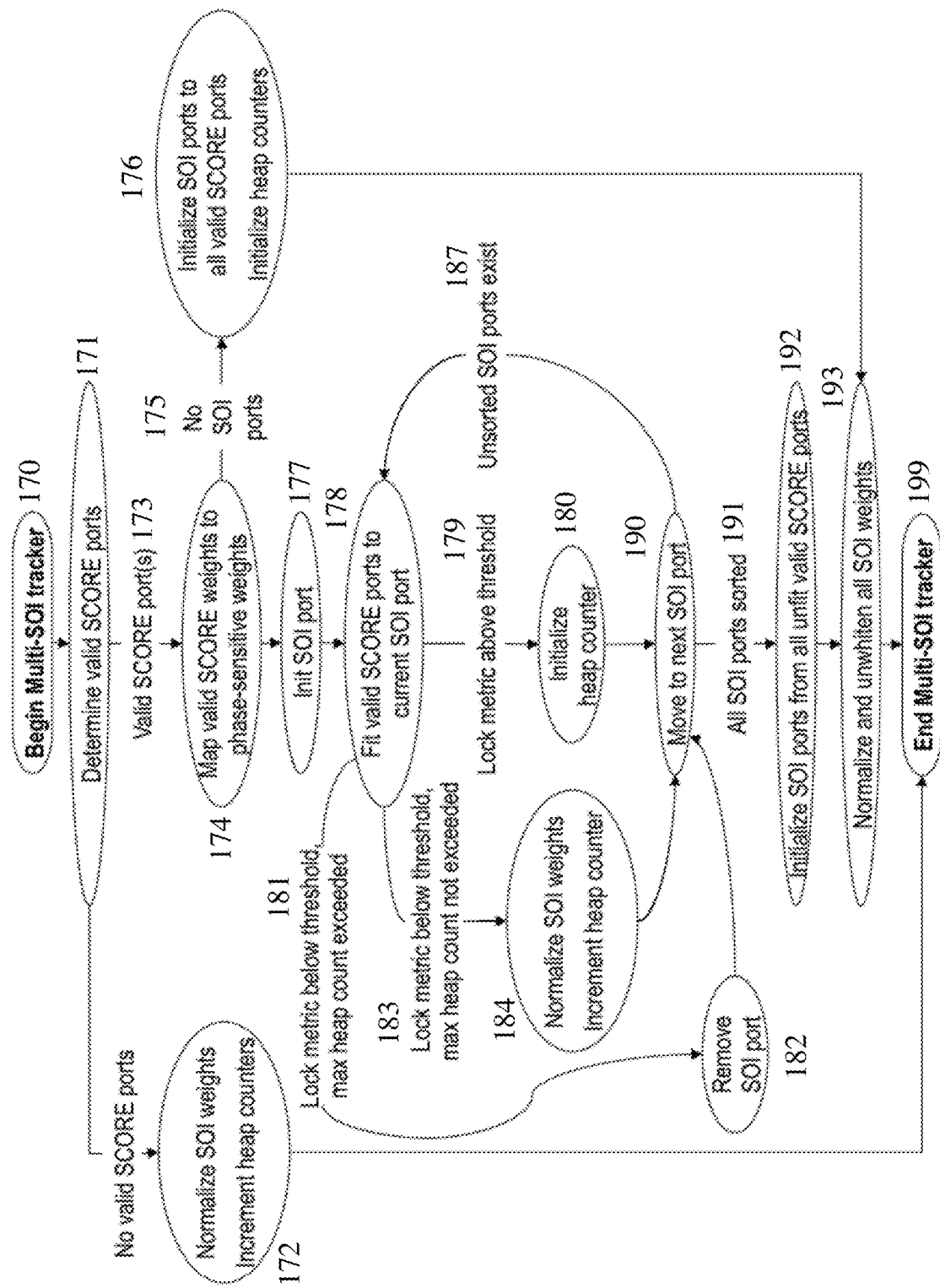
FIG. 14 shows the flow diagram for a multi-SOI tracker, used in the implementation of a subband channelized weight adaptation algorithm to match valid SCORE ports to multiple MUOS signals.

FIG. 14 shows the flow diagram for a SOI tracker algorithm used in an alternate embodiment that can track multiple valid SOI's. This embodiment is particularly useful for applications in which valid signals-of-interest are received from multiple transmitters in the field of view of receive antennas attached to the DICE system, e.g., multiple MUOS SV's in the receiver's field of view. The tracker differs from the single-SOI tracker shown in FIG. 13 in the following respects:

- It can create multiple SOI ports, and attempts to match those SOI ports to subsets of valid SCORE ports based on a single-port lock metric.
- It possesses mechanisms for increasing SOI's tracked (number of SOI ports) over the processing interval, based on failure of a valid SCORE port to match to any SOI port.
- It possesses mechanisms for decreasing the number of SOI's tracked (number of SOI ports) over the processing interval, based on a heap counter comprising the number of consecutive frames in which a SOI has not been successfully tracked.
- It provides additional mechanisms for measuring phase as well as strength of cross-frame coherence, in order to exploit differing phase of the cross-frame coherence between SOI's received from different transmitters in the environment, and to refine multiport SCORE weights based on those metrics.

In the embodiment shown in FIG. 14, when this procedure (Multi-SOI Tracker) is activated (170) the first step performed by the tracker is to determine if any valid SCORE ports are present (171). This is accomplished by using the $M_{feed} \times L_{valid}$ matrix of current whitened valid multiport SCORE weights $U_{current}(:,\ell_{valid})$ (133), determined as part of the coherence strength and kurtosis metrics computation procedure described above, to determine a set of $M_{feed} \times L_{valid}$ phase-mapped SCORE weights $V_{current}$ (174) using the linear transformation $$V_{current} = U_{current}(:,\ell_{valid}) G_{valid},\qquad(65)$$

where each column of the $L_{valid} \times L_{valid}$ phase-mapping matrix $G_{valid}$ approximates a solution to the phase-SCORE eigenequation $$\lambda_{valid}(\ell) g_{valid}(\ell) = T_{valid} g_{valid}(\ell),\ \ell=1,\ldots,L_{valid},\qquad(66)$$

$$T_{valid} \triangleq U_{current}^H(:,\ell_{valid}) T_{xprior \times current}^H U_{prior}(:,\ell_{valid}),\qquad(67)$$

and where $U_{prior}(:,\ell_{valid})$ is the matrix of $M_{feed} \times L_{valid}$ whitened prior multiport SCORE weights computed over the valid SCORE port (133). The process implementing Equation (66) yields a closed form solution if two or less valid SCORE ports are identified, as is typical in MUOS reception environments, namely, $$\lambda_{valid} = U_{current}^H(:,\ell_{port}(1)) T_{xprior \times current}^H U_{prior}(:,\ell_{port}(1))\qquad(68)$$

$$g_{valid} = 1\qquad(69)$$

if $L_{valid} = 1$, and $$\lambda_{valid} = [s+\sqrt{d^2+c}\ \ s-\sqrt{d^2+c}],\qquad(70)$$

$$\begin{cases} s = \frac{1}{2}(t_{11}+t_{22}) \\ d = \frac{1}{2}(t_{11}-t_{22}) \\ c = t_{12}t_{21} \end{cases}$$

$$G_{valid} = \begin{pmatrix} -(d-\sqrt{d^2+c}) & t_{12} \\ t_{21} & d-\sqrt{d^2+c} \end{pmatrix}\qquad(71)$$

if $L_{valid}=2$, where $$T_{valid}\begin{pmatrix} t_{11} & t_{12} \\ t_{21} & t_{22} \end{pmatrix}.$$

The columns of $G_{valid}$ are then adjusted to unit norm, such that $\|G_{valid}(:,\ell)\|_2 \equiv 1$ and therefore $\|V_{current}(:,\ell)\|_2 = 1$. However, it should be noted that $G_{valid}$ is not in general orthonormal, and therefore $V_{current}$ is not orthonormal.

If no valid SCORE ports exist, then the SOI weights are normalized and the heap counters are incremented (172). If at least one valid SCORE port exists (173), then the process maps valid SCORE weights to phase-sensitive weights and compares these to the SOI port(s) (174).

If no SOI ports exist (175), the $M_{feed} \times L_{SOI}$ whitened SOI beamforming weights $U_{SOI}$ are initialized to $V_{current}$, the number of SOI ports $L_{SOI}$ is initialized to $L_{valid}$, and the $L_{SOI} \times 1$ heap counter $c_{heap}$ is set to zero on each element. The $M_{feed} \times L_{SOI}$ unwhitened SOI beamformer weights $W_{SOI}$ are then normalized (193) computed by solving back-substitution $$R_{x_{current}} W_{SOI} = U_{SOI},\qquad(72)$$

and this terminates this instantiation of this process (199).

If valid SOI ports do exist (173), then the valid SCORE ports are fit to existing SCORE ports over the SOI ports (178), by first forming spatially-whitened SOI beamforming weights $U_{SOI} = R_{x_{current}} W_{SOI}$ from the existing SCORE weights $W_{SOI}$, and then computing the fit-gains $\{g_{LS}(\ell_{valid},\ell_{SOI})\}$ that minimizes the least-squares (LS) fit between each column of $U_{SOI}$ and $V_{current}$, yielding optimized fit gain $$g_{LS}(\ell_{valid},\ell_{SOI}) = V_{current}^H(:,\ell_{valid}) U_{SOI}(:,\ell_{SOI})\qquad(73)$$

and least-squares fit-metric $$\rho_{LS}(\ell_{valid},\ell_{SOI}) = |g_{LS}(\ell_{valid},\ell_{SOI})|,\qquad(74)$$

which is maximized when the LS fit is close. The fit metric (74) is then used to associated the phase-mapped multiport SCORE ports with the SOI ports, by setting $$\ell_{valid}(\ell_{SOI}) = \arg\max_{\ell=1,\ldots,L_{valid}} \rho_{LS}(\ell,\ell_{SOI}).\qquad(75)$$

$$\rho_{lock}(\ell_{SOI}) = \rho_{LS}(\ell_{valid}(\ell_{SOI}),\ell_{SOI}).\qquad(76)$$

For each SOI port this process initiates (177), if the lock metric is above the lock-fit threshold for SOI port $\ell_{SOI}$ ($\rho_{lock}(\ell_{SOI}) \geq \rho_{min}$) (179), then the spatially-whitened SOI beamforming weights for SOI port $\ell_{SOI}$ are set equal to $$U_{SOI}(:,\ell_{SOI}) \leftarrow V_{current}(:,\ell_{valid}(\ell_{SOI})) \text{sgn}\{g_{LS}(\ell_{valid}(\ell_{SOI}))\},\qquad(77)$$

and heap counter $c_{heap}(\ell_{SOI})$ is reset (initialized) to zero (180). If the lock metric is below the lock-fit threshold for SOI port $\ell_{SOI}$ ($\rho_{lock}(\ell_{SOI}) < \rho_{min}$), and the heap count has not exceeded the maximum value ($c_{heap}(\ell_{SOI}) \leq c_{max}$) (183), then the unwhitened SOI port $\ell_{SOI}$ beamforming weights are adjusted to provide unity output norm, $$w_{SOI}(:,\ell_{SOI}) \leftarrow \frac{w_{SOI}(:,\ell_{SOI})}{\|U_{SOI}(:,\ell_{SOI})\|_2}, \quad (78)$$

and the heap count for SOI port $\ell_{SOI}$ is incremented by one ($c_{heap}(\ell_{SOI}) \leftarrow c_{heap}(\ell_{SOI})+1$) (184). If the lock metric is below the lock-fit threshold and the heap count has exceeded the maximum value (181), then the SOI port and all of its associated parameters are removed from the list of valid SOI ports (182). The implementation then moves onto the next SOI port (190) and to the fitting of valid SCORE ports to the current selection of the SOI port (178) if any remain unfitted.

Once all of the SOI ports have been sorted (191), any valid phase-mapped multiport SCORE ports that have not yet been associated with SOI are assigned to new SOI ports with heap counters initialized to zero (192). This allows new SOI's to detected and captured when they become visible to the DICE system, e.g., as MUOS satellites come into the field of view of the DICE antennas. All as-yet unwhitened SOI beamforming weights are then computed from the whitened SOI beamforming weights (193), and the SOI tracking process is completed, terminating this Multi-SOI Tracking procedure (199).

Figure 11:
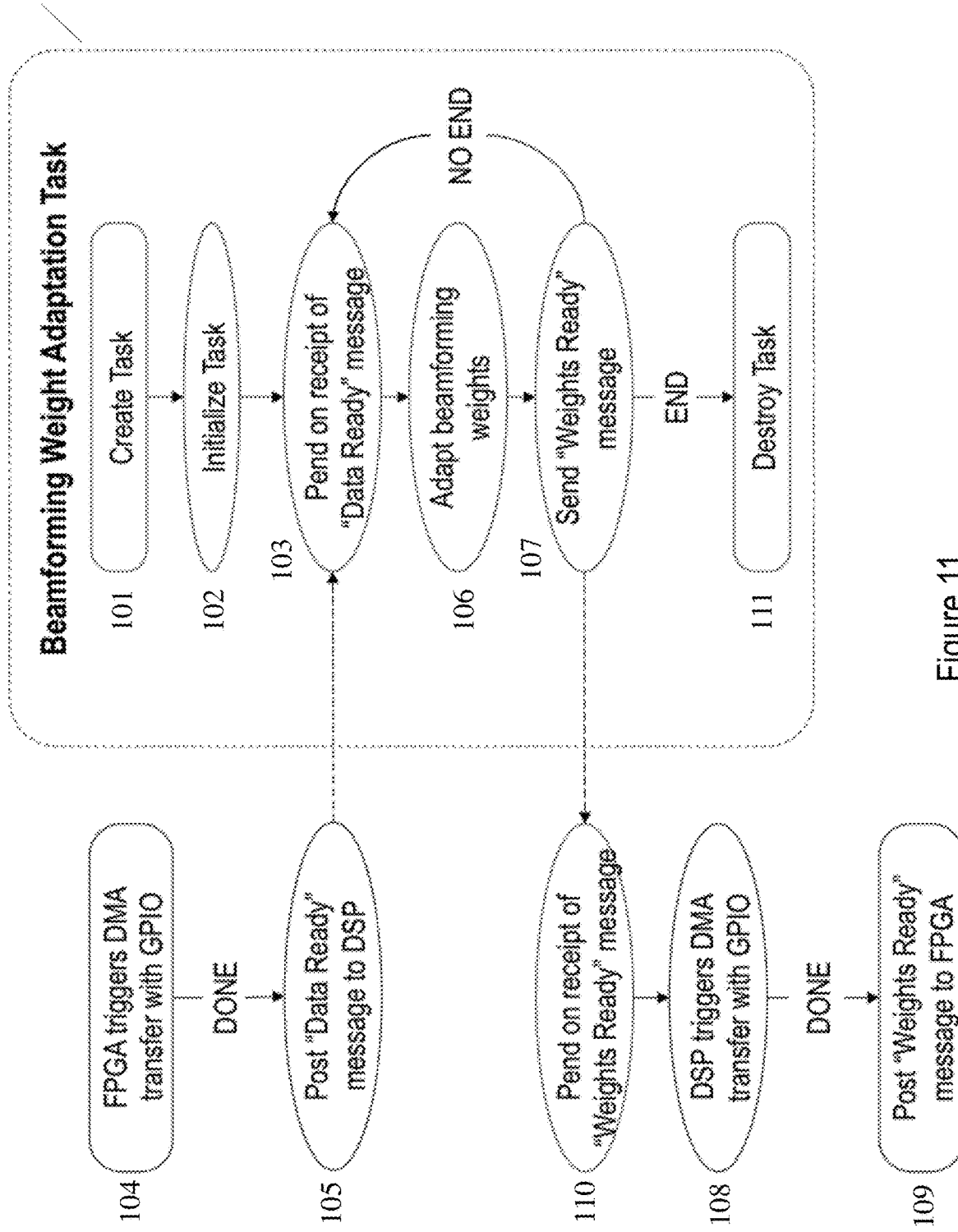
FIG. 11 shows a flow diagram for the Beamforming Weight Adaptation Task.

In another embodiment, the $M_{feed} \times L_{valid}$ valid multiport SCORE beamforming weights $U_{current}(:,\mathcal{L}_{valid})$ given by the processes implementing Equation (59) can be directly sorted using the procedure shown in FIG. 11, without the intermediate phase mapping operation. In this case, the ability to separate SOI's based on phase of the cross-frame coherence is lost; however, in many reception scenarios this can still be sufficient to effectively separate the signals.

In another embodiment, the valid multiport SCORE ports can be partitioned into subsets of valid ports associated with each SOI, e.g., based on common phase of the phase-mapped SCORE eigenvalues, or based on fit metrics given in (74). In this case, the lock metric is given by $$\rho_{lock}(\ell_{SOI}) = \|g_{LS}(\ell_{SOI})\|_2 / \|U_{SOI}(:,\ell_{SOI})\|_2 \quad (79)$$

$$g_{LS}(\ell_{SOI}) = Q_{current}^H(\ell_{SOI}) U_{SOI}(:,\ell_{SOI}) \quad (80)$$

$$Q_{current}(\ell_{SOI}) = QRD(V_{current}(:,\mathcal{L}_{valid}(\ell_{SOI}))) \quad (81)$$

where $\mathcal{L}_{valid}(\ell_{SOI})$ is the set of $L_{valid}(\ell_{SOI})$ valid multiport SCORE ports associated with SOI port $\ell_{SOI}$ and $V_{current}(:,\mathcal{L}_{valid}(\ell_{SOI}))$ is the $M_{feed} \times L_{valid}(\ell_{SOI})$ matrix of (phase-mapped) SCORE beamforming weights covering those ports, and where $Q_{current}(\ell_{SOI})$ is the whitened phase-mapped SCORE weight matrix, given in the processes implementing Equations (43)-(44). If the lock metric is above the lock-fit threshold, then the beamforming weights for SOI port $\ell_{SOI}$ is given by $$U_{SOI}(:,\ell_{SOI}) \leftarrow Q_{current}(:,\ell_{SOI}) \frac{g_{LS}(\ell_{SOI})}{\|g_{LS}(\ell_{SOI})\|_2}. \quad (82)$$

If the phase-mapping is not performed, then the multiport SCORE weights are already orthonormal, and $Q_{current}(\ell_{SOI}) = V_{current}(:,\mathcal{L}_{valid}(\ell_{SOI}))$. This embodiment reduces effects of hypersensitivity in highly dispersive environments where the MUOS SOI can induce multiple substantive SCORE solutions.

In another embodiment, the SCORE weights are directly computed from $T_{x_{prior}x_{current}}^H$, by solving for the eigenvalues and eigenvectors of the phase-SCORE eigenequation, $$\lambda_{valid}(\ell)v_{valid}(\ell) = T_{x_{prior}x_{current}}^H v_{valid}(\ell), \quad \ell = 1, \ldots, L_{port}. \quad (83)$$

using eigenequation computation methods well known to those skilled in the art. These weights can then be directly sorted by strength to determine both the number of valid SCORE ports, and by phase to further separate the valid ports into SOI subsets.

FPGA BFN Weight Computation Procedure

The SOI tracker weights are converted to FPGA weights using a three-step operation:

First, the weights are multiplied by calibration weights on each active subband channel, yielding $$w_{FPGA}(k_{chn}) = w_{cal}(k_{chn}) \circ w_{SOI}. \quad (84)$$

Then, the weights are then scaled to meet an output norm target. Conceptually, this is given by $$w_{FPGA}(k_{chn}) \leftarrow g_{FPGA} w_{FPGA}(k_{chn}). \quad (85)$$

where $g_{FPGA}$ is a scaling constant, which can be precomputed as $\{w_{SOI}\}$ is scaled to yield unity output norm under all conditions, since $$\|y_{SOI}(k_{chn})\|_2 = \|X_{current}(k_{chn}) w_{FPGA}(k_{chn})\|_2 \quad (86)$$

$$= g_{FPGA}^2 \|X_{current}(k_{chn})(w_{cal}(k_{chn}) \circ w_{SOI})\|_2 \quad (87)$$

$$= g_{FPGA}^2 \quad (88)$$

at the output of the SOI tracker. In the embodiment shown here, $g_{FPGA} = 2^{30}$. Lastly, the MSB of the FPGA weights are computed, and used to scale and convert those weights to 16-bit precision, and to derive a shift to be applied to the data after beamforming.

Once the beamforming weights and scaling factor have been computed, a DMA transfer is triggered, to effect transfer of the weights and scaling factor to the FPGA (30) over the EMIF bus (32). A "Weights Ready" semaphore is then set inside the FPGA (30), alerting it to the presence of new weights. The FPGA (30) then applies these weights to its Beamforming Network (34) shown in FIG. 4, along with the scaling factor used to maintain continuity of output power between adaptation frames.

In one embodiment, a number of ancillary metrics are also computed by the implementation of the algorithm, which are also transferred over the EMIF to a host computer allowing display for control, monitoring, and diagnostic purposes.

This weight computation procedure extends to multi-SOI tracking embodiments in a straightforward manner, by applying the processes implementing Equations (84)-(85) to each individual SOI beamforming weight vector.

Dispersion Compensation Procedure

The dispersion compensation processing is designed to correct for cross-feed dispersion induced in the DICE front-end due to frequency mismatch between the DICE bandpass filters. Modeling the ideal channelizer output signal by $$x(k_{chn}, n_{chn})|_{ideal} = x_{sky}(k_{chn}, n_{chn})|_{ideal} + \varepsilon_{Rx}(k_{chn}, n_{chn}) \qquad (89)$$

$$x_{sky}(k_{chn}, n_{chn})|_{ideal} = \varepsilon_{sky}(k_{chn}, n_{chn}) + \sum_{\ell_{emit}} a_{ideal}(\ell_{emit})s_{emit}(k_{chn}, n_{chn}) \qquad (90)$$

where $\varepsilon_{sky}(k_{chn}, n_{chn})$ is the $M_{feed} \times 1$ sky noise added to the DICE signal ahead of the BPF's, $\{a_{ideal}(\ell_{emit})\}$ are the frequency-independent (nondispersive) spatial signatures for each of the emitters received by the DICE system, and $\varepsilon_{Rx}(k_{chn}, n_{chn})$ is the receiver noise added after the BPF's, then the true channelizer output response can be modeled by $$x(k_{chn}, n_{chn}) = (g_{BPF}(k_{chn}) \circ x_{sky}(k_{chn}, n_{chn})|_{ideal}) + \varepsilon_{Rx}(k_{chn}, n_{chn}) \qquad (91)$$

$$= \varepsilon(k_{chn}, n_{chn}) + \sum_{\ell_{emit}} a(k_{chn}, \ell_{emit})s_{emit}(k_{chn}, n_{chn})$$

where $\{g_{BPF}(k_{chn})\}$ are the $M_{feed} \times 1$ BPF responses on each frequency channel and $\varepsilon(k_{chn}, n_{chn})$ is the combined nonideal receiver noise, $$\varepsilon(k_{chn}, n_{chn}) = (g_{BPF}(k_{chn}) \circ \varepsilon_{sky}(k_{chn}, n_{chn})) + \varepsilon_{Rx}(k_{chn}, n_{chn}) \qquad (92)$$

and where $\{a(k_{chn}, \ell_{emit})\}$ are dispersive spatial signatures given by $$a(k_{chn}, n_{chn}) = g_{BPF}(k_{chn}) \circ a_{ideal}(k_{chn}, n_{chn}) \qquad (93)$$

Assuming the BPF differences are small and/or the receiver noise is small relative to the sky noise, then the receive signal can be approximated by $$x_{FPGA}(k_{chn}, n_{chn}) \approx g_{BPF}(k_{chn}) \circ x(k_{chn}, n_{chn})|_{ideal} \qquad (94)$$

within the FPGA, where $$x(k_{chn}, n_{chn})|_{ideal} = \varepsilon(k_{chn}, n_{chn})|_{ideal} + \sum_{\ell_{emit}} a_{ideal}(\ell_{emit})s_{emit}(k_{chn}, n_{chn}) \qquad (95)$$

is an ideal nondispersive response. Further assuming that the BPF differences can be computed to within at least a scalar ambiguity $g_{cal}$, then the dispersive receive signal can be transformed to a nondispersive signal by setting $$x_{cal}(k_{chn}, n_{chn}) = \qquad (96)$$
$$w_{cal}(k_{chn}) \circ x_{FPGA}(k_{chn}, n_{chn}) \approx g_{cal}x(k_{chn}, n_{chn})|_{ideal}$$

where $$w_{cal}(k_{chn}) \approx g_{cal}./g_{BPF}(k_{chn}) \qquad (97)$$

and where "./" denotes the Matlab element-by-element divide operation. Given two M×N arrays "X=[X(m,n)]" and "Y=[Y(m,n)]", Z=X./Y creates an M×N matrix with elements Z(m,n)=X(m,n)/Y(m,n), where "/" is a scalar divide operation. This is the mathematical basis for the gain compensation processing implementation.

Assuming conceptually that the cross-feed dispersion has been removed and beamforming weights $w_{DSP}$ have been computed in the DSP for compensated data set $x_{cal}(k_{chn}, n_{chn})$, then the beamformer output data can be expressed as $$y(k_{chn}, n_{chn}) = w_{DSP}^T x_{cal}(k_{chn}, n_{chn}) \qquad (98)$$
$$= w_{DSP}^T(w_{cal}(k_{chn}) \circ x_{FPGA}(k_{chn}, n_{chn}))$$
$$= (w_{cal}(k_{chn}) \circ w_{DSP})^T x_{FPGA}(k_{chn}, n_{chn})$$
$$= w_{FPGA}^T(k_{chn})x_{FPGA}(k_{chn}, n_{chn})$$

where FPGA beamforming weights $w_{FPGA}(k_{chn}) = w_{cal}(k_{chn}) \circ w_{DSP}$ are applied directly to the uncompensated FPGA data. Thus there is no need to compensate each FPGA channel directly, as the compensation can be applied to the DSP weights instead, simplifying and speeding this task.

Defining (again conceptually) calibrated current data frame:

$$X_{current}(k_{chn})|_{cal} = \begin{pmatrix} x_{cal}^T(k_{chn}, N_{frame}n_{frame}) \\ \vdots \\ x_{cal}^T(k_{chn}, N_{frame}n_{frame} + N_{TBP} - 1) \end{pmatrix} \qquad (99)$$

$$= \begin{pmatrix} x_{FPGA}^T(k_{chn}, N_{frame}n_{frame}) \circ w_{cal}^T(k_{chn}) \\ \vdots \\ x_{FPGA}^T\begin{pmatrix} k_{chn}, N_{frame}n_{frame} + \\ N_{TBP} - 1 \end{pmatrix} \circ w_{cal}^T(k_{chn}) \end{pmatrix}$$

$$= \begin{pmatrix} x_{FPGA}^T(k_{chn}, N_{frame}n_{frame}) \\ \vdots \\ x_{FPGA}^T\begin{pmatrix} k_{chn}, N_{frame}n_{frame} + \\ N_{TBP} - 1 \end{pmatrix} \end{pmatrix} \text{diag}\{w_{cal}(k_{chn})\}$$

$$= X_{current}(k_{chn})\text{diag}\{w_{cal}(k_{chn})\},$$

then its compensated current-frame ACM statistics are given by $$R_{x_{current}x_{current}}(k_{chn})|_{cal} = X_{current}(k_{chn})|_{cal}^H X_{current}(k_{chn})|_{cal} \qquad (100)$$
$$= (X_{current}(k_{chn})\text{diag}\{w_{cal}(k_{chn})\})^H$$
$$(X_{current}(k_{chn})\text{diag}\{w_{cal}(k_{chn})\})$$
$$= \text{diag}\{w_{cal}^*(k_{chn})\}(X_{current}^H(k_{chn})X_{current}(k_{chn}))$$
$$\text{diag}\{w_{cal}(k_{chn})\}$$
$$= R_{x_{current}x_{current}}(k_{chn}) \circ (w_{cal}^*(k_{chn})w_{cal}^T(k_{chn})).$$

Similar arguments can be used to show $$R_{x_{prior}x_{prior}}(k_{chn})|_{cal} = R_{x_{prior}x_{prior}}(k_{chn}) \circ (w_{cal}^*(k_{chn})w_{cal}^T(k_{chn})) \qquad (101)$$

$$R_{x_{prior}x_{current}}(k_{chn})|_{cal} = R_{x_{prior}x_{current}}(k_{chn}) \circ (w_{cal}^*(k_{chn})w_{cal}^T(k_{chn})). \qquad (102)$$

This can be used to effect dispersion compensation, adjusting the per-channel CCM and current-ACM statistics as above (128, 129) to remove dispersion.

In one alternate embodiment, the compensation weights are further adjusted to deliberately notch frequencies containing known or detected narrowband interference, by multiplying the compensation weights $w_{cal}(k_{chn})$ by a scalar spectral excision function $\delta_{notch}(k_{chn})$, $$w_{cal}(k_{chn}) \leftarrow \delta_{notch}(k_{chn})w_{cal}(k_{chn}) \tag{103}$$

where $$\delta_{notch}(k_{chn}) = \begin{cases} 0, & \text{Notch applied} \\ 1, & \text{Otherwise.} \end{cases} \tag{104}$$

The spectral excision function can be determined deterministically, e.g., based on frequency channels known to contain interference or communicated externally to the DICE system, or adaptively based on per-channel CCM and/or ACM statistics computed as part of the Beamforming Weight Adaptation Task (125), e.g., using spectral power computed as part of the channel kurtosis procedure (135) or via analysis of per-channel ACM statistics.

Fully-Channelized Beamforming Weight Adaptation Procedure

In alternate embodiments, implementations of more powerful algorithms can be used to derive independent beamforming weights on each frequency channel in the Analyzer filter-bank (53). These algorithms, referred to here as fully-channelized beamforming weight adaptation algorithms, can remove independent narrowband interference received on individual frequency channels, as well as wideband interferes that span multiple frequency channels, thereby greatly increasing the number of interferes that can be excised by the system—by as much as a factor of 40 in the DICE embodiment implemented here.

Figure 15:
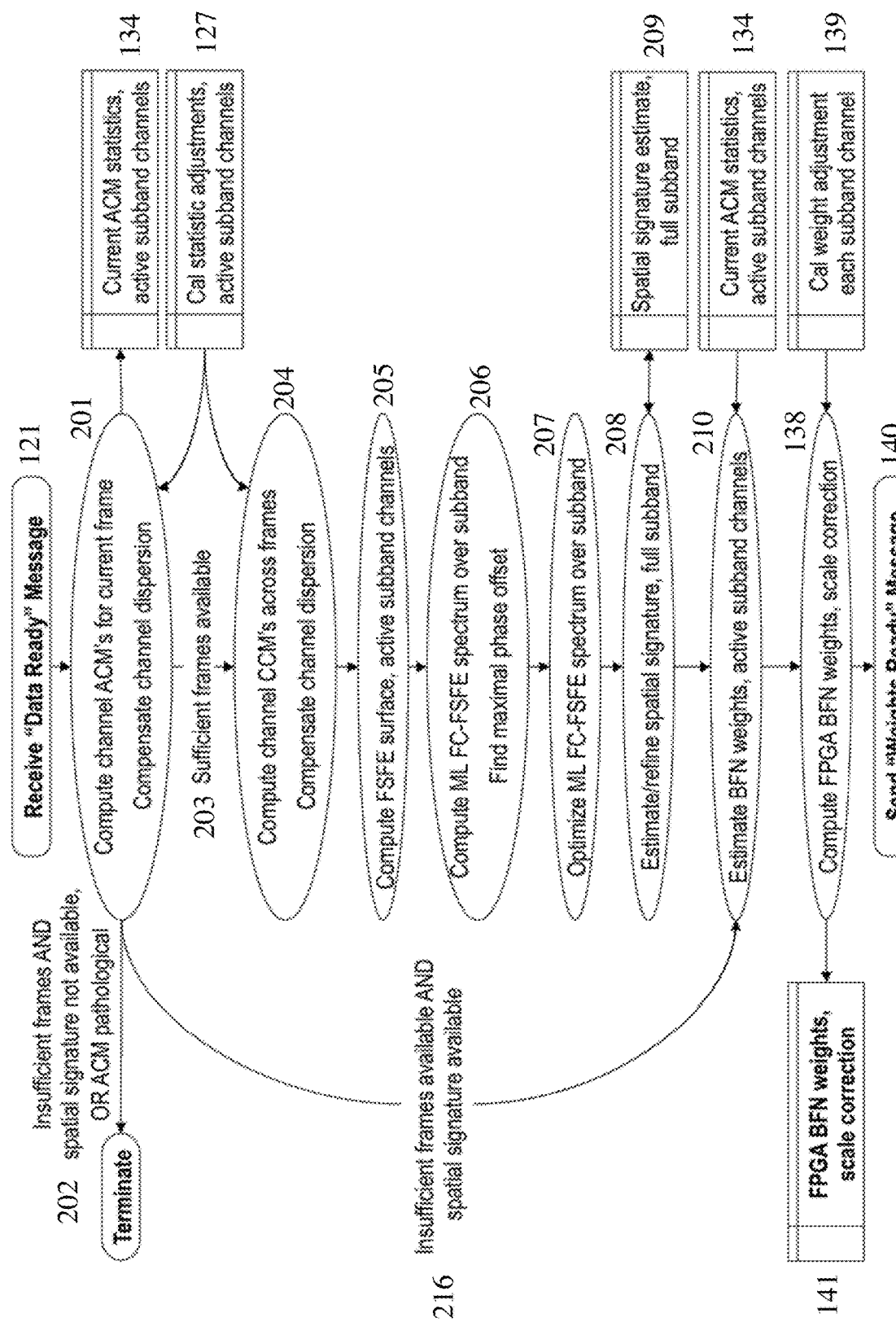
FIG. 15 shows the flow diagram for the implementation of a fully-channelized (FC) frame-synchronous feature exploiting (FSFE) beamforming weight adaptation algorithm, part of the Beamforming Weight Adaptation Task, when a "Data Ready" message is received from the DSP.

FIG. 15 shows the flow diagram for a specific fully-channelized algorithm implemented here, also referred to as the fully channelized frame-synchronous feature exploitation (FC-FSFE) algorithm. Upon receipt of a Data Ready message (121) from the FPGA (30) the process implementing this algorithm computes pertinent FSFE autocorrelation matrix (ACM) statistics (as described below) for each channel of the received frame, stores those for the active subband channels (134), and checks to see if sufficient frames have been received to allow implementation of the full acquisition algorithm (201). If insufficient frames have been received, and no spatial signature estimate is available, the DSP element (31) terminates this process without updating the beamforming weights from their current (e.g., default) value (202); but, if there are insufficient frames available and a spatial signature estimate is available (216), the DSP element (31) immediately calls on the calibration statistics adjustments for the active subband channels (127), and proceeds to estimate the beamforming network weights for the active subband channels (210) using the estimated spatial signature and ACM statistics computed over the current frame (134).

If sufficient frames are available (i.e. have been received) to allow implementation of the full acquisition algorithm (203), the DSP element (31) using the calibration statistic adjustments (127) computes (as described below) FSFE cross-data statistics (also known as 'channel CCMs') across the frames, for each channel, and a set of target frequency offsets that will be used to compensate for channel dispersion (204); computes (as described below) FSFE surface values (detection statistics) for each active subband channel (205); and computes maximum-likelihood (ML) FC-FSFE statistics at each target frequency offset, finding the maximal phase offset (206). The maximal ML FC-FSFE carrier offset and BFN weights are then optimized (207) using an alternating projections implementation.

The optimized fully-channelized beamforming weights closely approach the maximum attainable SINR of the array on each frequency channel; however, they have a gain and phase ambiguity that must be removed before those weights are applied to the data output from each Analysis filterbank (53). This is accomplished by first using the ACM statistics and (ambiguous) beamforming weights to estimate a common spatial signature both for each MUOS B2U subband and the full subband (208) as described below, which is stored (209), and then using that spatial signature estimate for the full subband to develop ambiguity-free beamforming weights as described below using a linearly-constrained power minimization (LCPM) procedure.

These operations, and the computation of optimized, fully-channelized, beamforming weights with scale correction (212) also are described in more detail in the next subsections.

FSFE Statistics Computation Procedure

Statistics computation comprises computation of the autocorrelation matrix (ACM) and cross-correlation matrix (CCM) statistics used in the FSFE, signature estimation, and BFN computation processing in the invention. In the DICE embodiment, these operations are computed using direct "power domain" operations such as unwhitened data Gramians and cross-correlation matrices, rather then the "voltage domain" operations such as QR decomposition, in order to minimize complexity requirements of the processing and memory required, and because the FPGA data is already input at precision that obviates most of the advantages of voltage domain operations if data is computed at 64-bit accuracy (e.g., using long-long integers).

Defining $X(k_{chn};n_{frame})$ as the $N_{TBP} \times M_{feed}$ data matrix transferred to the DSP over frequency channel $k_{chn}$ and frame adaptation frame $n_{frame}$, $$X(k_{chn}; n_{frame}) \triangleq \begin{pmatrix} x^T(k_{chn}, N_{frame}n_{frame}) \\ \vdots \\ x^T(k_{chn}, N_{frame}n_{frame} + N_{TBP} - 1) \end{pmatrix}, \tag{105}$$

Then the correlation statistics are given by $$R_{xx}(k_{chn}; m, n) = X^H(k_{chn}, n_{frame} - m)X(k_{chn}, n_{frame} - n), \tag{106}$$
$$\begin{cases} m = 0, \dots, M_{frame} - 1 \\ n = 0, \dots, m - 1 \end{cases}$$

$$\overline{R}_{xx}(k_{chn}; m) = \sum_{n=m}^{M_{frame}-1} R_{xx}(k_{chn}; n, n-m), \quad m = 0, \dots, M_{frame} - 1, \tag{107}$$

over adaptation frame $n_{frame}$, for FSFE instantiations exploiting data collected over $M_{frame}$ consecutive adaptation frames, where $$\{R_{xx}(k_{chn}; m, n)\}_{m=1,\dots,M_{frame}-1}$$
$$n=0,\dots,m-1$$

are CCM statistics, computed and stored in general complex form, and where $$R_{xx}(k_{chn};m,m) \triangleq R_{xx}(k_{chn};m), \ m=0,\ldots,M_{frame}-1 \quad (108)$$

$$\overline{R}_{xx}(k_{chn}) \triangleq \overline{R}_{xx}(k_{chn};0), \quad (109)$$

are ACM statistics, computed and stored in a manner that exploits Hermitian symmetry of the matrices.

The data matrix given in Equation (105), and the CCM and ACM statistics defined in and used by the processes implementing Equations (106)-(109), differ from the data matrices given in and used by the processes implementing Equations (20)-(21) and the CCM and ACM statistics given in and used by the processes implementing Equations (22)-(23) and Equation (33) in the following respects:

They are defined with an additional adaptation frame index $n_{frame}$, imposed here to facilitate the description of the general FSFE implementation.

They possess additional adaptation frame lag indices m and n, imposed as a requirement of the general FSFE implementation.

The fully-channelized and subband-channelized statistics are related by $$X_{prior}(k_{chn})=X(k_{chn};n_{frame}-1), \quad (110)$$

$$X_{current}(k_{chn})=X(k_{chn};n_{frame}), \quad (111)$$

$$R_{x_{prior}x_{current}}(k_{chn})=R_{xx}(k_{chn};1,0) \quad (112)$$

$$R_{x_{current}x_{current}}(k_{chn})=R_{xx}(k_{chn};0) \quad (113)$$

$$R_{x_{prior}x_{prior}}(k_{chn})=R_{xx}(k_{chn};1) \quad (114)$$

over adaptation frame index $n_{frame}$. Also, in practice using this implementation it is expected that the data time-bandwidth product $N_{TBP}$ inside each adaptation frame is reduced commensurately with the number of adaptation frames $M_{frame}$, e.g., the total data time-bandwidth product $N_{TBP}M_{frame}$ is held constant, in order to meet the memory constraints of the DSP element (31).

Also note that the CCM and ACM statistics given Equations (106)-(109) are unweighted, that is, the summation does not include a tapering window and is not divided by the time-bandwidth product of the input data matrices. This normalization can be added with no loss of generality (albeit at some potential cost in complexity if $N_{TBP}$ and $N_{frame}$ are not powers of two) if computed using a floating point DSP element (31); the unnormalized statistics shown here are the best solution if a fixed or hybrid DSP element (31) is used to compute the statistics, or if the ACM and CCM statistics computation is performed in the FPGA (30) in alternate embodiments. Unweighted statistics are employed here to both reduce operating time of the statistics accumulation, and to avoid roundoff errors in any fixed-point DSP used in a DICE embodiment. Even if the input data has 16-bit precision (and even in systems in which data is transferred at its full 25 bit precision), the entire accumulation can be performed at 64-bit (TI double-double) precision accuracy without incurring roundoff or overflow errors.

If $M_{frame}>2$, then the process implementing each of Equations (106)-(109) is efficiently computed using recursion $$\overline{R}_{xx}(k_{chn};m) \leftarrow \overline{R}_{xx}(k_{chn};m) - R_{xx}(k_{chn};M_{frame}-1, M_{frame}-1-m), \quad (115)$$
$$m=0,\ldots,M_{frame}-1$$

$$R_{xx}(k_{chn};m+1,n+1) \leftarrow R_{xx}(k_{chn};m,n), \begin{cases} m=0,\ldots,M_{frame}-2 \\ n=0,\ldots,m \end{cases} \quad (116)$$

$$R_{xx}(k_{chn};m,0) \leftarrow X^H(k_{chn},n_{frame}-m)X(k_{chn},n_{frame}), \quad (117)$$
$$m=0,\ldots,M_{frame}-1,$$

$$\overline{R}_{xx}(k_{chn};m) \leftarrow \overline{R}_{xx}(k_{chn};m) + R_{xx}(k_{chn};m,0), \quad (118)$$
$$m=0,\ldots,M_{frame}-1,$$

which can be computed without roundoff error and even, if performed in fixed-precision arithmetic, using long-long (64-bit) integers.

If $M_{frame}=2$, then Equations (106)-(109) reduces to $$\overline{R}_{xx}(k_{chn})=R_{xx}(k_{chn};0)+R_{xx}(k_{chn};1), \quad (119)$$

$$\overline{R}_{xx}(k_{chn};1)=R_{xx}(k_{chn};1,0), \quad (120)$$

i.e., any calculation for a process implementing $R_{xx}(k_{chn};1,0)$ does not need to be separately computed, and $R_{xx}(k_{chn};0)$ does not need to be stored between frames, resulting in a significant savings in processing and memory requirements.

The Cholesky factor and inverse Cholesky factor of the averaged ACM's are then computed, and the inverse Cholesky factor is used to compute the spatially-whitened averaged CCM matrices (131), using a process implementing $$\overline{R}_x(k_{chn})=\text{chol}\{\overline{R}_{xx}(k_{chn})\}. \quad (121)$$

$$\overline{C}_x(k_{chn})=\overline{R}_x^{-1}(k_{chn}). \quad (122)$$

$$\overline{R}_{qq}(k_{chn};m)=\overline{C}_x^H(k_{chn})\overline{R}_{xx}(k_{chn};m)\overline{C}_x(k_{chn}),$$
$$m=1,\ldots,M_{frame}-1. \quad (123)$$

These matrices are also stored in memory for every frequency channel; however, if $M_{frame}=2$, then $\overline{R}_{xx}(1;k_{chn})$ need not be stored over all channels, resulting in an additional memory savings.

Given the statistics computed above, and assuming that $X(k_{chn},n_{frame})$ is modeled by $$X(k_{chn},n_{frame}) = \mathcal{I}(k_{chn},n_{frame}) + e^{j2\pi\alpha n_{frame}}p(k_{chn})a^T(k_{chn}) \quad (124)$$

$$\alpha \in \left[-\frac{1}{2},\frac{1}{2}\right) \quad (125)$$

$$a(k_{chn}) \in \mathbb{C}^{M_{feed}} \quad (126)$$

$$\mathcal{I}(k_{chn},n_{frame}) \sim i.i.d. \ CG(0, R_{ii}(k_{chn})) \text{ over rows}, n_{frame} \quad (127)$$

$$R_{ii}(k_{chn}) \in \mathbb{C}^{M_{feed} \times M_{feed}} > 0, \quad (128)$$

over the frequency channels $$\{k_{chn}\}_{k_{chn} \in \mathcal{K}_{subband}}$$

covering the active bandwidth of the MUOS signal in subband $\mathcal{K}_{subband}$ (active channels in subband $\mathcal{K}_{subband}$), then the maximum-likelihood estimate of carrier-offset α is given by $$\hat{\alpha}_{ML} = \arg\max_{\alpha} S_{ML}(\alpha) \tag{129}$$

$$S_{ML}(\alpha) = \sum_{k_{chn} \in \mathcal{K}_{subband}} -\ln(1 - \eta_{ML}(k_{chn}; \alpha)) \tag{130}$$

$$\eta_{ML}(k_{chn}; \alpha) = \max_{\|u\|=1} 2\text{Re}\{u^H \overline{S}_{qq}(k_{chn}; \alpha) u\} \tag{131}$$

$$= \max_{\|u\|=1} u^H \tilde{S}_{qq}(k_{chn}; \alpha) u, \tag{132}$$

where $\overline{S}_{qq}(k_{chn};\alpha)$ and $\tilde{S}_{qq}(k_{chn};\alpha)$ are given by $$\overline{S}_{qq}(k_{chn}; \alpha) = \sum_{m=1}^{M_{frame}-1} \overline{R}_{qq}(k_{chn}; m) e^{-j2\pi \alpha m}. \tag{133}$$

$$\tilde{S}_{qq}(k_{chn}; \alpha) = \overline{S}_{qq}(k_{chn}; \alpha) + \overline{S}_{qq}^H(k_{chn}; \alpha). \tag{134}$$

The processes implementing Equations (129)-(134) are optimized in subsequent processing modules. Estimates of channelized A-CPICH $\{p(k_{chn})\}$ and fully-channelized beamformer weights can also be provided by this procedure; however, in the finalized implementation, the A-CPICH need not be computed at any point, resulting in a substantive savings in processing and memory requirement over FC-FSFE implementations previously considered.

If calibration data is available, then processes implementing Equation (106) can be further adjusted to compensate for cross-feed channel dispersion, using adjustment $$R_{xx}(k_{chn};m,n) \leftarrow R_{xx}(k_{chn};m,n) \circ (w_{cal}^T(k_{chn}) w_{cal}^*(k_{chn})). \tag{135}$$

This operation allows the SOI spatial signature given in Equation (126) to be modeled as $$a(k_{chn}) = \sqrt{S_{SOI}(k_{chn})} a \tag{136}$$

$$a \in \mathbb{C}^{M_{feed}}, \tag{137}$$

where $S_{SOI}(k_{chn})$ is a known SOI spectral distribution (e.g., given by the raised-cosine shaping of the MUOS B2U chip sequence) and is the frequency-invariant SOI spatial signature over the subband. This model motivates both the spatial signature estimation processing (208) used in the FC-FSFE, and the beamformer adaptation processing (210) used in the embodiment.

FSFE Surface Computation Procedure (205)

The FSFE surface is computed for each subband (205), by calculating FSFE surfaces $\overline{S}_{qq}(k_{chn};\alpha)$ and $\tilde{S}_{qq}(k_{chn};\alpha)$ given in and used by the processes implementing Equations (133)-(134) over a set of target carrier frequencies $$\{\alpha_{k_{bin}}\}_{k_{bin}=0}^{K_{bin}-1} = \{k_{bin}/K_{bin}\}_{k_{bin}=0}^{K_{bin}-1}$$

and over the active channels in the subband, $$\{k_{chn}\}_{k_{chn} \in \mathcal{K}_{subband}}.$$

The computation can be mechanized using FFT operations to compute Equation (133); however, for small numbers of frames a DFT can suffice for this step. The process is implemented as follows for each frequency channel in the subband:

Compute Hermitian FSFE matrix $S(k_{bin}) = \tilde{S}_{qq}(k_{chn}; k_{bin}/K_{bin})$ using operation $$S(k_{bin}) \leftarrow DFT_{K_{bin}}\{\overline{R}_{qq}(k_{chn};m)\}. \tag{138}$$

$$S(k_{bin}) \leftarrow S(k_{bin}) + S^H(k_{bin}). \tag{139}$$

Initialize whitened beamforming vectors $\{u(k_{chn},k_{bin})\}$ using operation $$u(k_{chn},k_{bin}) = S(:,M_{feed};k_{bin})/\|S(:,M_{feed};k_{bin})\|_2, \tag{140}$$

where $S(:,M_{feed};k_{bin})$ is the rightmost column in $M_{feed} \times M_{feed}$ matrix $S(k_{bin})$.

Compute the maximum mode of $S(k_{bin})$ using power-method recursion $$v = S(k_{bin}) u(k_{chn},k_{bin}) \tag{141}$$

$$\eta(k_{chn},k_{bin}/K_{bin}) = \text{Re}\{v^H u(k_{chn},k_{bin})\} \tag{142}$$

$$g = \text{sgn}(\eta(k_{chn},k_{bin}))/\|v\|_2 \tag{143}$$

$$u(k_{chn},k_{bin}/K_{bin}) \leftarrow g v. \tag{144}$$

The dominant mode estimates $\{\eta(k_{chn},k_{bin}/K_{bin}), u(k_{chn},k_{bin}/K_{bin})\}$ are then used to compute the Maximum-Likelihood Fully-Channelized FSFE (ML FC-FSFE) spectrum over the subband (206).

The FSFE matrix $S(k_{bin})$ and intermediate BFN weight v and normalization gain g are stored locally and need not be replicated over the DFT bins and frequency channels, resulting in a significant savings in memory requirement. This recursion also eliminates the additional operation to estimate the A-CPICH using SVD power method, resulting in a significant savings in processing and memory requirements. In addition, the mode-spread of $S(k_{bin})$ is much wider at DFT bin values close to the true carrier offset, reducing the processing implementing this algorithm by requiring significantly fewer recursions.

Maximum-Likelihood Fully-Channelized FSFE Spectrum Calculation Procedure (206)

The maximum-likelihood (ML) fully-channelized (FC) FSFE (ML FC-FSFE) spectrum is given by $$S_{ML}(k_{bin}/K_{bin}) = \sum_{k_{chn} \in \mathcal{K}_{subband}} -\ln(1 - \eta(k_{chn},k_{bin}/K_{bin})) \tag{145}$$

at each target carrier $$\{\alpha_{k_{bin}}\}_{k_{bin}=0}^{K_{DFT}-1} = \{k_{bin}/K_{bin}\}_{k_{bin}=0}^{K_{bin}-1},$$

over the active channels in subband $\mathcal{K}_{subband}$. In the fully-channelized embodiment, the ML FC-FSFE is approximated and computed by processes implementing the Maclaurin-series expansion $$-\ln(1-x) = \sum_{n=1}^{N_{ord}} \frac{x^n}{n} \tag{146}$$

with low order $N_{ord}=4$. The maximal carrier and whitened beamforming weights $\{k_{max}/K_{bin},u(k_{chn},k_{max}/K_{bin})\}$ are passed next to the module implementing an optimization procedure described below (207).

In embodiment where a DFT rather than an FFT is used to compute the FSFE surface, the whitened BFN vectors $\{u(k_{chn},k_{bin}/K_{bin})\}$ are be computed locally, e.g., by computing the surface over frequency channels first, DFT bins second, computing $S_{ML}(k_{bin}/K_{bin})$ on a bin-by-bin basis, and saving $\{u(k_{chn},k_{max}/K_{bin})\}$ whenever a maxima is found. This results in an additional savings in memory requirement. In any event, $\{u(k_{chn},k_{bin}/K_{bin})\}$ can be released from memory once the ML FC-FSFE surface has been computed (207). However, if the FSFE surface values $\{\eta(k_{chn},k_{bin}/K_{bin})\}$ have value as display parameters in the prototype system, they should be retained.

ML FC-FSFE Carrier/Weight Optimization Procedure (207)

The carrier and whitened beamformer weights are then jointly optimized (207), using an alternating projections (AP) algorithm that optimizes ML objective function $$S_{ML}\left(\alpha; \{u(k_{chn})\}_{k_{chn} \in \mathcal{K}_{subband}}\right) = \sum_{k_{chn} \in \mathcal{K}_{subband}} -\ln \quad (147)$$

$$\left(1 - \sum_{m=1}^{N_{frame}-1} \mathrm{Re}\{u^H(k_{chn})\overline{R}_{qq}(k_{chn};m)u(k_{chn})e^{-j2\pi\alpha m}\}\right) =$$

$$\sum_{k_{chn} \in \mathcal{K}_{subband}} -\ln\left(1 - \mathrm{Re}\left\{u^H(k_{chn}) \left(\sum_{m=1}^{N_{frame}-1} \overline{R}_{qq}(m;k_{chn})e^{-j2\pi\alpha m}\right) u(k_{chn})\right\}\right)$$

over the active channels in subband $\mathcal{K}_{subband}$. The AP recursion comprises two stages:
  A first carrier optimization recursion stage that adjusts $\alpha$ to optimize the processes implementing Equation (147) for fixed beamforming weights $$\{u(k_{chn})\}_{k_{chn} \in \mathcal{K}_{subband}}$$

using Gauss-Newton recursion $$w(m) = \exp(-j2\pi\alpha m), \; m=1, \ldots, M_{frame}-1 \quad (149)$$

$$r(k_{chn};m) = u^H(k_{chn})\overline{R}_{qq}(k_{chn};m)u(k_{chn}), \quad (150)$$
$$m=1, \ldots, M_{frame}-1$$

$$\rho_0(k_{chn}) = \sum_{m=1}^{M_{frame}-1} \mathrm{Re}\{r(k_{chn};m)w(m)\} \quad (151)$$

$$\rho_1(k_{chn}) = \sum_{m=1}^{M_{frame}-1} m\,\mathrm{Im}\{r(k_{chn};m)w(m)\} \quad (152)$$

$$\rho_2(k_{chn}) = \sum_{m=1}^{N_{frame}-1} m^2\mathrm{Re}\{r(k_{chn};m)w(m)\} \quad (153)$$

-continued $$q_0(k_{chn}) = 1/(1 - \rho_0(k_{chn})) \quad (154)$$

$$g_1(k_{chn}) = q_0(k_{chn})\rho_1(k_{chn}) \quad (155)$$

$$\alpha = \alpha - \frac{1}{2\pi} \frac{\sum_{k_{chn} \in \mathcal{K}_{subband}} g_1(k_{chn})}{\sum_{k_{chn} \in \mathcal{K}_{subband}} g_1^2(k_{chn}) - q_0(k_{chn})\rho_2(k_{chn})}. \quad (156)$$

A second beamformer optimization recursion stage that adjusts $$\{u(k_{chn})\}_{k_{chn} \in \mathcal{K}_{subband}}$$

to optimize the processes implementing Equation (148) for fixed carrier estimate $\alpha$ using the power-method recursion $$v = \tilde{S}_{qq}(k_{chn}; \alpha)u(k_{chn}), \quad (157)$$
$$k_{chn} \in \mathcal{K}_{subband}$$

$$\eta(k_{chn}) = \mathrm{Re}\{v^H u(k_{chn})\}, \quad (158)$$
$$k_{chn} \in \mathcal{K}_{subband}$$

$$g = \mathrm{sgn}(\eta(k_{chn}))/\|v\|_2, \quad (159)$$
$$k_{chn} \in \mathcal{K}_{subband},$$

$$u(k_{chn}) \leftarrow gv, \quad (160)$$
$$k_{chn} \in \mathcal{K}_{subband},$$

where $\tilde{S}_{qq}(k_{chn}; \alpha)$ is given by $$\hat{S}_{qq}(k_{chn}; \alpha) = \sum_{m=1}^{M_{frame}-1} \overline{R}_{qq}(k_{chn};m)e^{-j2\pi\alpha m} \quad (161)$$

$$\tilde{S}_{qq}(k_{chn}; \alpha) = \hat{S}_{qq}(k_{chn}; \alpha) + \hat{S}_{qq}^H(k_{chn}; \alpha). \quad (162)$$

The complex exponential operation shown in Equations (149) and (161) is calculated using a 32-element look-up table (LUT) product in this embodiment to reduce processing complexity.

Spatial Signature Estimation Procedure (208)

The optimized, A-CPICH SINR and whitened weights $\{\gamma(k_{chn}),u(k_{chn})\}$ are used to estimate the spatial signature of the MUOS B2U signal over the active subband channels (208). The implementation of this algorithm is described as follows, for active frequency channels $k_{chn}$ in subband channel set $$\mathcal{K}_{subband} = \{k_{chn}(\ell_{active})\}_{\ell_{active}=0}^{K_{active}-1}.$$

Initialization Step: Starting with either no data (if no prior spatial signature estimate exists), or from the current spatial signature estimate for the full subband (209), the process uses the whitened weights as it implements:

$$w(k_{chn}) = \overline{C}_x(k_{chn})u(k_{chn}). \tag{163}$$

$$C_i = chol\left\{\sum_{k_{chn}} S_{SOI}(k_{chn}) \begin{pmatrix} (\overline{C}_x(k_{chn})\overline{C}_x^H(k_{chn})) + \\ \gamma(k_{chn})w(k_{chn})w^H(k_{chn}) \end{pmatrix}\right\} \tag{164}$$

$$R_i = C_i^{-1} \tag{165}$$

and uses the A-CPICH SINR as it implements:

$$g_{SOI}(k_{chn}) = \sqrt{S_{SOI}(k_{chn})\gamma(k_{chn})(1+\gamma(k_{chn}))} \tag{166}$$

$$\{Q_W, R_W\} = QRD\left\{\begin{pmatrix} g_{SOI}(k_{chn}(0))w^H(k_{chn}(0)) \\ \vdots \\ g_{SOI}(k_{chn}(K_{active}-1))w^H(k_{chn}(K_{active}-1)) \end{pmatrix}\right\} \tag{167}$$

$$T_{Wi} = R_W R_i \tag{168}$$

$$u_W = T_{Wi}(:,M_{feed}) \tag{169}$$

where $S_{SOI}(k_{chn})$ is a prestored estimate of the MUOS transmit signal relative signal power in each channel.

Power Method Recursion:

$$u_i = T_{wi}^H u_w \tag{170}$$

$$u_w = T_{wi}(:,M_{feed}) \tag{171}$$

$$u_w \leftarrow Q_w^H \, sgn(Q_w u_w) \tag{172}$$

Finalization Step:

$$\hat{a} = R_w^{-1} u_w \tag{173}$$

where sgn(•) denotes the complex sign operation. This result is used to update the estimate (209) and in the next step (210); thus, this implementation can re-use the prior estimate of the spatial signature to eliminate the initialization step. After the estimate is updated, it is stored for future estimate updates, and used to compute the fully-channelized beamforming weights. Note that all of the matrices used in the full algorithm are upper-triangular, allowing simplified matrix multiplication operations, and allowing inverse (and inverse-Hermitian) operations to be performed using back-substitution operations, thereby reducing processing and memory requirements. Also note for that same reason that transition matrix $T_{wi}$ typically has a large spread between its dominant and lesser modes, hence the power method recursion need only be performed a small number of times, cutting processing need.

Fully-Channelized Beamforming Weight Calculation Procedure (210)

The spatial signature is then used to compute the actual beamforming weights employed in the FPGA (30). The uncalibrated BFN weights are estimated (210) using both the current ACM statistics for the active subband channels (134), using the algorithm:

$$w(k_{chn}) = \sqrt{S_{SOI}(k_{chn})} \overline{C}_x^H(k_{chn})\hat{a}, \; k_{chn} \in \mathcal{K}_{subband}. \tag{174}$$

$$w(k_{chn}) \leftarrow \overline{C}_x(k_{chn})w(k_{chn})/\|w(k_{chn})\|_2^2, \; k_{chn} \in \mathcal{K}_{subband}. \tag{175}$$

where spatial signature estimate $\hat{a}$ is given by the processes implementing Equation (173) and frequency channel $k_{chn}$ inverse Cholesky factor estimate $\overline{C}_x(k_{chn})$ is given by the processes implementing the Equation (122). In the absence of exponential averaging, i.e., such that $\overline{C}_x(k_{chn}) = C_x(k_{chn})$, BFN weights $w(k_{chn})$ minimize $\|X_{current}(k_{chn})w(k_{chn})\|_2^2$ subject to constraint $\sqrt{S_{SOI}(k_{chn})}\hat{a}^H w_{chn}(k_{chn}) \equiv 1$. Similar constrained power minimization arguments hold using exponentially-weighted power metrics in the presence of exponential averaging.

Using the calibrated weight adjustment for each subband channel (139), the FPGA weights are then computed (138) from the estimated fully-channelized weights by setting $$w_{FPGA}(k_{chn}) = w_{cal}(k_{chn}) \circ w(k_{chn}). \tag{176}$$

Then, the weights are then given a scale correction; in the embodiment they are scaled by factor-of-two factor $g_{FPGA}$ to meet an output norm target, as given in Equations (85)-(88) (138), and (if necessary) converted to the precision used in the FPGA (30); and the weights and scaling factor are passed (141) to the BFN weight buffer (41) in the FPGA (30) over the EMIF bus (32) and a "weights ready" interrupt is sent to the FPGA alerting it to the existence of new beamforming weights to trigger the BFN DMA transfer (140). In this regard, the "BFN weights" are the linear diversity combining weights that are generated by the adaptation algorithm, and are internal to the DSP (31), whereas the "FPGA weights" are the linear diversity combining weights that are sent up to the BFN (34) in the FPGA (30) over the EMIF bus (32).

Importantly, the BFN and FPGA weights are calculated on a frame-by-frame basis, at much lower complexity than the full FSFE and signature estimation algorithm. This will allow the invention to respond very quickly to dynamic changes in the received environment, e.g., impulsive or bursty emitters impinging on the array, including burst or cognitive jammers. This capability should greatly improve its utility to the MUOS radio community.

In the fully-channelized beamforming embodiment, the FC-FSFE processor is implemented with the following common parameters:

- Combined in-frame and cross-frame time-bandwidth product of 128 ($N_{TBP}M_{frame}=128$).
- DFT overage factor of two ($K_{bin}=2M_{frame}$).
- Two power-method recursions per DFT bin and frequency channel to calculate the FSFE surface.
- ML FC-FSFE surface estimation using a fourth-order Maclaurin series approximation.
- Alternating projections using two AP recursions, each recursion comprising two Gauss-Newton carrier estimation operations and two power method BFN estimation operations, and employing quadratic peak fitting to initialize the carrier estimate at the start of processing.
- Spatial signature estimation employing 10 power method recursions.

In interference scenarios, the FC-FSFE detects the MUOS signal, and develops BFN weights that excise all of the interference. Moreover, the algorithm provides a high quality estimate of the B2U spatial signature in narrowband co-channel interference (NBCCI) environments, is predicted by Cramer-Rao bound analyses, which demonstrate that the cross-channel signature estimator is interference piercing in the presence of NBCCI. Although the spatial signature quality is much lower in wideband co-channel interference (WBCCI) environments, the estimation quality should still be sufficient to allow extraction of the MUOS signal at high quality.

The processing and memory requirements of the end-to-end FC-FSFE algorithm are summarized in FIG. 17 and FIG. 18 for a single subband with 40 active channels. Processing rate is computed under "best case" assumptions in which each real add and each real multiply each take a half-cycle to complete, and ignores set-aside for memory transfer and implementation of FOR loops and pointer manipulation. Memory requirement is also computed under "best case" assumptions that internal parameters are stored at 32 bits/rail (4 B per real parameter, 8 B per complex parameter); Hermitian matrix symmetry and Cholesky factor sparseness is fully exploited to minimize storage requirements; and all input data is stored at 16 bit accuracy, i.e., the accuracy of data provided from the FPGA, and the processing is performed using 32-bit floating point numbers.

As FIG. 17 and FIG. 18 show, the processes used for the algorithm has very comfortable processing headroom for all of the FC-FSFE implementations analyzed, and has reasonable storage headroom for the 64×2 and 32×4 FSFE implementations. The 64×2 implementation requirements are particularly good, with the algorithm rolling up at a factor-of-7.7 lower processing rate than the 1,200 GHz processing limit of the DSP chip, and with a factor-of-4.4 lower memory requirement than the 2,048 KB L2 data cache available on the chip. In fact, the only operation that exceeds the 32 KB L1 data cache limit is the FSFE statistics generation operation, which can be implemented on a highly parallel per-channel basis to maximize efficiency of data transfer between the L2 and L1 cache.

It should be noted as well that the 64×2 algorithm only calculates the surface over 4 DFT bins, which is of sufficient size to allow the surface to be generated without an FFT operation. As a consequence, FSFE surface generation and ML FC-FSFE carrier spectrum generation operations can be combined to further reduce memory requirements of this algorithm instantiation.

These Figures also show the processing and memory requirements of the FC-FSFE algorithm if it is operated in "tracking mode" in which BFN weights and carrier estimates from previous frames are used to optimize the ML FC-FSFE spectrum. The tracking mode provides minimal improvement in both criteria, and is therefore not recommended for implementation.

The performance of the 64×2 processor is not substantively worse than any of the other instantiations, and in fact can outperform them in the presence of intra-beam Doppler. Moreover, the 2-frame algorithm is inherently most robust to clock error between the DICE appliqué and MUOS network. For all of these reasons, the 64×2 FC-FSFE is the more preferable embodiment of the fully-channelized beamforming algorithm.

As a performance risk-mitigation step, alternate versions of the finalized algorithm have been developed that employ spatially whitened data statistics to reduce vulnerability of fixed-point algorithms to wide variation in data amplitude; subsets of the major processing modules that track major parameters, e.g., A-CPICH carrier frequency, between update blocks; and exponentially averaged statistics to reduce memory requirements of the overall algorithm.

As an additional performance risk-mitigation step, extensions of the algorithm that detect and exploit multiple peaks in the ML spectrum, e.g., to separate signals from co-channel emitters (including MUOS pseudolites and DRFM jamming), or to combine CPICH's from the same MUOS satellite subject to intra-beam Doppler have also been developed. Extensions of the spatial signature estimation algorithm that model frequency variability of the spatial signature, e.g., due to dispersive effects in the transmission channel, are also described herein.

Subband-Channelized FSFE Procedure

Figure 16:
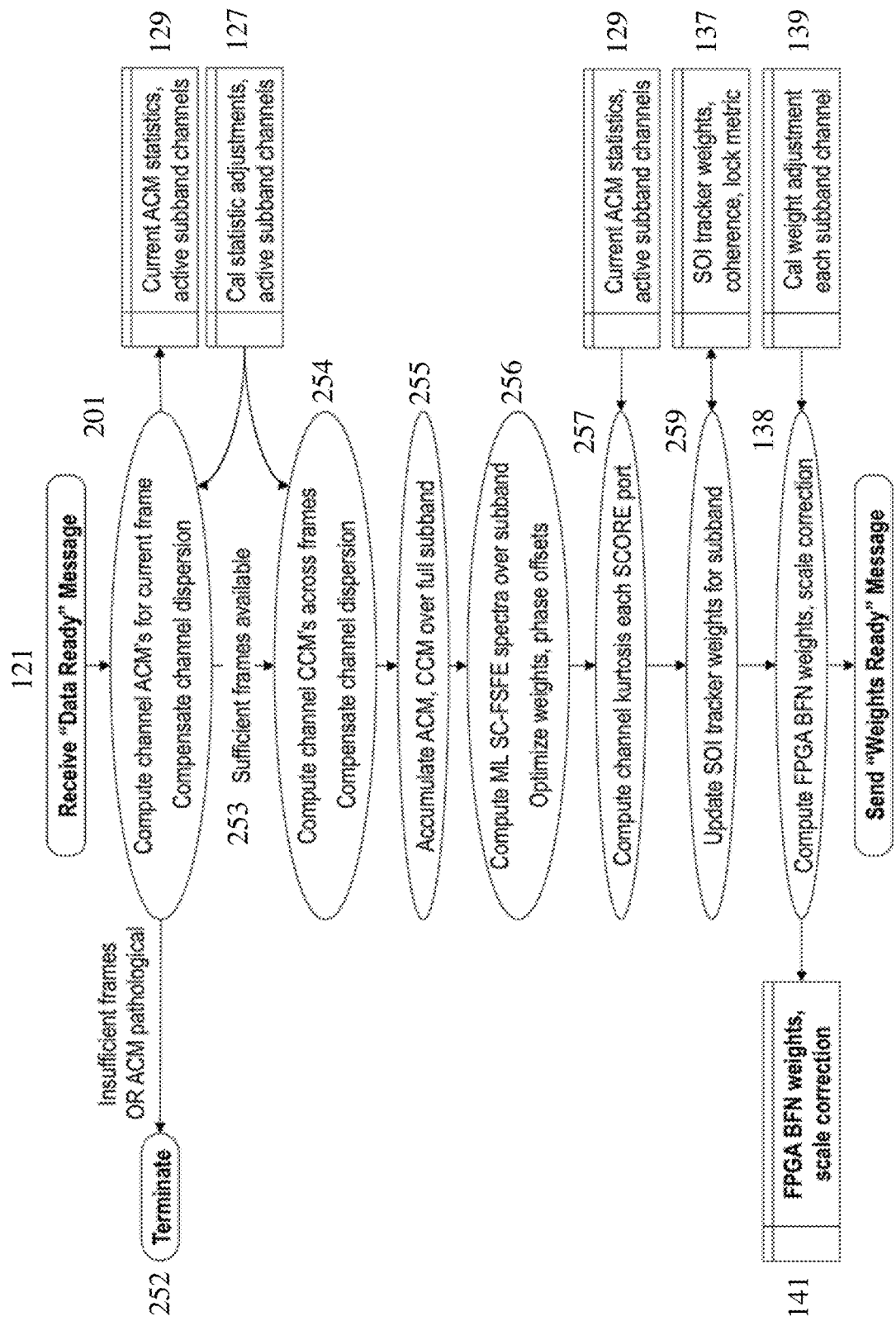
FIG. 16 shows the flow diagram for an implementation of an alternate subband-channelized (SC) FSFE beamformer adaptation algorithm, part of the Beamforming Weight Adaptation Task, when a "Data Ready" message is received from the DSP.

In one alternate embodiment of the subband-channelized beamformer weight adaptation algorithm, the weights are computed using a simplification of the fully-channelized FSFE algorithm that adjusts a single set of weights (with adjustment to compensate for frequency dispersive effects in the system front-end), referred to here as the subband-channelized frame-synchronous feature extraction (SC-FSFE) procedure. The flow diagram for the SC-FSFE is shown in FIG. 16. The algorithm assumes that a buffer comprising two consecutive frames of data is deposited into a "ping-pong" L2 buffer as shown in FIG. 10 over each frequency channel of each subband processed by the system (a single subband in the Phase II system), such that even and odd frames are deposited into the same data buffer locations within each frame. The SC-FSFE is described here for a single subband, and for an FSFE implementation with $M_{frame}=2$, $N_{TBP}=64$, and $M_{feed}=4$.

Upon reception of a "Data Ready" semaphore (121), the algorithm steps through each subband processed by the system. Within subband $K_{subband}$, the DSP steps through active channels $$\{k_{chn}\}_{k \in \mathcal{K}_{subband}}$$

covering the active MUOS B2U signal, retrieves the 64×4 data matrices $\{X(k_{chn}, n_{frame}-1), X(k_{chn}, n_{frame})\}$ for the adaptation frames $n_{frame}-1$ (prior frame) and $n_{frame}$ (current frame) collected over frequency channel $k_{chn}$, and computes autocorrelation matrix (ACM) and cross-correlation matrix (CCM) statistics $$\bar{R}_{xx}(k_{chn}) = X^H(k_{chn}, n_{frame}-1)X(k_{chn}, n_{frame}-1) + X^H(k_{chn}, n_{frame})X(k_{chn}, n_{frame}) \qquad (177)$$

$$\bar{S}_{xx}(k_{chn}) = X^H(k_{chn}, n_{frame}-1)X(k_{chn}, n_{frame}) \qquad (178)$$

for that channel (201).

If calibration data is available (127), these statistics are further adjusted to compensate for cross-antenna frequency differences, yielding $$\bar{R}_{xx}(k_{chn}) \leftarrow \bar{R}_{xx}(k_{chn}) \circ (w_{cal}^*(k_{chn})w_{cal}^T(k_{chn})) \qquad (179)$$

$$\bar{S}_{xx}(k_{chn}) \leftarrow \bar{S}_{xx}(k_{chn}) \circ (w_{cal}^*(k_{chn})w_{cal}^T(k_{chn})) \qquad (180)$$

These statistics are then accumulated over the active channels in the subband, yielding subband statistics $$\bar{R}_{xx} = \sum_{k_{chn} \in \mathcal{K}_{subband}} \bar{R}_{xx}(k_{chn}) \qquad (181)$$

$$\bar{S}_{xx} = \sum_{k_{chn} \in \mathcal{K}_{subband}} \bar{S}_{xx}(k_{chn}). \qquad (182)$$

and both current ACM statistics and active subband channel identifications are stored for use (129). The whitened subband CCM $\bar{S}_{qq}$ is then computed using the formula $$\bar{R}_x = \text{chol}\{\bar{R}_{xx}\} \qquad (183)$$

$$\bar{R}_x^H \bar{S}_{qq} \bar{R}_x = \bar{S}_{xx}, \qquad (184)$$

where chol{•} is the Cholesky factorization operation and the process implementing Equation (184) is accomplished using multiple back-substitution operations.

If there are insufficient frames and no spatial signature estimate is available, or if the ACM statistics are overly flawed ("pathological"), then the procedure terminates (252). If there are insufficient frames available and there also is a spatial signature estimate available (216), then the procedure will estimate the beamforming network weights and active subband channels (210).

If there are sufficient frames available for this subband (253), the procedure next will compute CCMs across the available frames and the correction(s) that will compensate for channel dispersion (204), using the implementations respectively described for these above for the subband-channelized beamforming weight adaptation procedure (125, 126).

The procedure steps through the active subbands until the ACM and CCM statistics are accumulated over the full subband (255). Then the procedure computes the ML-FSFE spectra over that subband, optimizing weights and phase offsets as it goes (256). As described above it will compute the channel kurtosis for each SCORE port (257) using the current ACM statistics and active subband channel information (129). As above, the procedure next updates the SOI tracker weights for the subband (259) and stores the new values (137). These SOI tracker weights are next used to compute the BFN weights that will be provided to the FPGA (30), with the scale correction (138), as described above, and the weights and scaling factor are passed (141) to the BFN weight buffer (41) in the FPGA (30) over the EMIF bus (32) and a "weights ready" interrupt message (140) is sent to the FPGA (30) alerting it to the existence of new beamforming weights, to trigger the BFN DMA transfer.

Once computed, $\overline{S}_{qq}$ can then be processed using a variety of methods to both detect the A-CPICH and determine BFN weights that can extract the wideband signal with near-maximum SINR. This maximum-likelihood estimate of the A-CPICH phase is calculated with an implementation of the auto-self-coherence restoral (auto-SCORE) procedure, given by $$\{u, \varphi\} = \underset{\|u\|_2=1, |z|=1}{\operatorname{argmax}} \operatorname{Re}\{u^H \overline{S}_{qq} u z^*\}, \quad (185)$$

$$= \underset{\|u\|_2=1, |z|=1}{\operatorname{argmax}} u^H \overline{S}_{qq}(z) u, \; \overline{S}_{qq}(z) = \frac{1}{2}(\overline{S}_{qq} z^* + \overline{S}_{qq}^H z),$$

which is initialized by $$u = \begin{cases} \overline{S}_{qq}(:, M_{feed}), & \text{Prior beamforming weights not available,} \\ \overline{R}_x w, & \text{Prior beamforming weights } w \text{ available,} \end{cases} \quad (187)$$

and optimized using recursion $$z \leftarrow \operatorname{sgn}(u^H \overline{S}_{qq} u), \quad (188)$$

$$u \leftarrow \overline{S}_{qq}(z) u, \quad (189)$$

$$\lambda \leftarrow \|u\|_2, \quad (190)$$

$$u \leftarrow u/\lambda, \quad (191)$$

If desired, the carrier phase z is also computed as part of this process.

The unwhitened beamforming weights w for the subband are then computed from the spatially-whitened beamforming weights u via the back-substitution implementation $$\overline{R}_x w = g u, \quad (192)$$

where scalar gain factor g is designed to enforce phase-continuity between consecutive frames, and to yield a constant-power output signal that does not change appreciably between frames.

If calibration data is available (127), the unwhitened subband weights w are further adjusted by the calibration data to form compensated weights $$\{w(k_{chn})\}_{k_{chn} \in \mathcal{K}_{subband}}$$

given by $$w_{FPGA}(k_{chn}) \leftarrow w \circ w_{cal}(k_{chn}). \quad (193)$$

The compensated weights are then adjusted to meet an output data power constraint, converted to the desired precision (along with a scaling factor) for the FPGA (30), and written to the FPGA (30) over the EMIF bus (32).

In other embodiments, the SC-FSFE algorithm can be adjusted to provide the processes and calculations to be used for an embodiment wherein multiple sets of beamforming weights corresponding to extraction of multiple signals from the environment in presence of multiple-access interference (MAI), and corresponding to detection and extraction of tonal interferes in the environment, are effected. This is accomplished by omitting (i.e. not computing) the processes implementing Equation (188) in the auto-SCORE recursion, and recursively repeating the processes implementing Equations (189)-(191) for each initial trial constant values of z, e.g., $$\{z(k_{bin})\} = \{\exp(j 2\pi k_{bin} / K_{bin})\}_{k_{bin}=0}^{K_{bin}-1}.$$

Successive applications of the processes implementing Equations (189)-(191) is equivalent to a "power method recursion" that substantively computes the dominant eigenmode of the auto-SCORE eigenequation $$\lambda u = \overline{S}_{qq}(z) u,$$

$$\overline{S}_{qq}(z) = \frac{1}{2}(\overline{S}_{qq} z^* + \overline{S}_{qq}^H z),$$

for each initial trial constant z. The $M_{feed}$ eigenmodes of $\overline{S}_{qq}(z)$, i.e., $\{\lambda_m, u_m\}_{m=1}^{M_{feed}}$, that solve Equation (194), can be determined directly from the SVD of $\overline{S}_{qq}(z)$, i.e., $\{d_m, v_m, u_m\}_{m=1}^{M_{feed}}$ that solves $\overline{S}_{qq}(z) = VDU^H$, by noting that the eigenvectors and right-hand SVD modes are identical, and that $\lambda_m = d_m \operatorname{sgn}(\operatorname{Re}(v_m^H u_m))$. This observation allows the power-method recursion to be generalized to a multimode recursion using the QR method, and accelerated using shift-and-deflation methods well known to those skilled in the art. The valid auto-SCORE weights can then be determined using detection thresholds and an implementation of any of the channel kurtosis algorithms used in the primary embodiment, and can be used to track multiple SOI's using the implementation of a multi-SOI tracking algorithm shown in FIG. 14.

Additional Alternate Embodiments

An alternative description of the embodiment of this invention would be of a method for digital, dynamic interference cancellation and excising (DICE), signal processing for multi-user, multi-antenna radio units incorporating for each antenna an ADC downconverter and a DAC upconverter to transform radio signals into digital data patterns, each radio unit being part of a beamforming network, and a transmit interpolator, said method comprising using interference-excising linear combining of signals received over multiple coherent spatial channels each covering a single frequency channel (e.g., in spatial channel each covering a single MUOS subband), and using for each channel and the combination thereof, an implementation that exploits known periodicity of the target signal of interest to enable better computational elegance of the required digital signal processing to digitally process received analog radio signals into and from meaningful digital data.

A further embodiment for interference-excising combining of signals received over multiple coherent [spatial] channels and multiple frequency channels (e.g., frequency channels collectively covering a MUOS subband), would comprise expanding on the step of using an implementation that exploits known periodicity of the target signal of interest to enable better computational elegance of the required digital signal processing, by further using an implementation that exploits known periodicity of the target signal of interest within each frequency channel.

A further embodiment of the invention additionally processes the linearly combined channel to create an input to a conventional radio.

A further embodiment of the invention additionally processes and recombines any set of the linearly combined frequency channels to create an input to a conventional radio.

Interpreting Specific Aspects of this Specification

The above description of the invention is illustrative and not restrictive. Many variations of the invention may become apparent to those of skill in the art upon review of this disclosure. The scope of the invention should, therefore, be determined not with reference to the above description, but instead with reference to the appended claims along with their full scope of equivalents.

Those skilled in the art know there are different ways—each comprising a sequence of steps and selection of processes—to implement any mathematical operation. They further know there are a greater number of ways any set of mathematical operations which form and are expressed by an equation (or set of equations) can be implemented correctly, i.e. so as to produce the correct computational result. They accept those ways which result in the correct computational result—and 'correct' by the nature of the inputs and processes specified for the specified equation, whether they are implemented by any of hardware, firmware, and software—are equivalent and may be substituted for one another.

Additionally, those skilled in the art know and accept that a description of a set of mathematical operations, that is, of the computational processes that implement a set of mathematical processes, is acceptably presented as an equation (or a set of equations). They accept that a description stating that operations done on any such equation, or set of equations, is in reality describing operations being done on the processes whose sequence and selection produce the correct computational results. Thus a phrase stating that one will be "recursively repeating Equations (189)-(191)" should be read as actually stating "recursively repeating the processes implementing Equations (189)-(191)", and a phrase stating that "omitting (i.e. not computing) Equation (188)" should be read as actually stating "omitting (i.e. not computing) the processes implementing Equation (188)". If, however, a specific constraint on either the sequence, selection, or assumptions is stated, it restricts the potential equivalents, so the statement "Equation (184) is accomplished using multiple back-substitution operations", restricts alternative implementations of those sequences and operations that are described in that Equation, to those which can be and are performed using a "multiple back-substitution" implementation.

Neither implementation of the method described in this application, nor the specific computations detailed above, are restricted to the particular hardware identified herein; as adaptation to the specifics of clock cycle times, memory block sizes, bus transfer volumes (size and speed constraints), processor operating specifics, and other details of alternative, or later-developed, hardware can be effected using equivalencies both well-known to the art and standard to the alternative hardware and firmware. (It can be assumed that when there is a doubling of a specific chip capability, e.g., through increase in data rate or number of processing cores available for processing of parallel operations, implementing programmers know how to effect the balancing 'halving' of the rate of input cycles by doubling the cycle input size.)

In the context of the present disclosure, the term set is defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)).

Memory, as used herein when referencing to computers, is the functional hardware that for the period of use retains a specific structure which can be and is used by the computer to represent the coding, whether data or instruction, which the computer uses to perform its function. Memory thus can be volatile or static, and be any of a RAM, a PROM, an EPROM, an EEPROM, a FLASHEP-ROM, any other memory chip or cartridge, a carrier wave, or any other medium from which a computer can read data, instructions, or both.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods, equations, and algorithms described herein may be implemented by, e.g., appropriately programmed general purpose computers and computing devices. Typically a processor (e.g., a microprocessor) will receive instructions from a memory or like device, and execute those instructions, thereby performing a process or computing a value using a process described and delimited in an equation, as defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, and 3G.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments; these are machine operations.

While the present invention has been described in connection with the embodiments shown here, these descriptions are not intended to limit the scope of the invention to the particular forms (whether elements of any device or architecture, or steps of any method) set forth herein. It will be further understood that the elements or methods of the invention are not necessarily limited to the discrete elements or steps, or the precise connectivity of the elements or order of the steps described, particularly where elements or steps which are part of the prior art are not referenced (and are not claimed). To the contrary, the present descriptions are intended to cover such alternatives, modifications, and equivalents as may be included within the spirit and scope of the invention as defined by the appended claims and otherwise appreciated by one of ordinary skill in the art.

I claim:

1. A method, comprising:
at each of a plurality of receiver feeds, receiving at least one signal of interest (SOI) and at least one signal not of interest (SNOI);
calculating a set of receiver feed combining weights based on temporal coherence peaks occurring at intervals, wherein the intervals corresponding to the at least one SOI's known frame duration; and
performing dynamic interference cancellation and excision (DICE) of the at least one SNOI with the set of receiver feed combining weights.

2. The method recited in claim 1, wherein at least one of the receiving, calculating, and performing is implemented as an appliqué.

3. The method recited in claim 1, wherein the plurality of receiver feeds are coupled to at least one of a spatially diverse antenna array and a polarization diverse antenna array.

4. The method recited in claim 1, wherein said performing DICE exploits at least one of diversity signature, timing offset, and carrier offset between the at least one SOI and the at least one SNOI.

5. The method recited in claim 1, wherein one or more of the at least one SOI and the at least one SNOI comprises a commercial cellular waveform.

6. The method recited in claim 5, wherein the commercial cellular waveform comprises at least one of a 2G waveform, a 2.5G waveform, a 3G waveform, a 4G waveform, a 5G waveform, and a millimeter waveform.

7. The method recited in claim 1, wherein one or more of the at least one SOI and the at least one SNOI comprises a wireless local area networking waveform.

8. The method of claim 1, wherein the at least one SNOI comprises a satellite uplink emission.

9. The method of claim 1, wherein the at least one SOI comprises a periodic component.

10. A radio receiver comprising at least one processor, memory in electronic communication with the processor, and instructions stored in the memory, the instructions executable by the at least one processor to:
receive at least one signal of interest (SOI) and at least one signal not of interest (SNOI) from each of a plurality of receiver feeds;
calculate a set of receiver feed combining weights based on temporal coherence peaks occurring at intervals, wherein the intervals correspond to the at least one SOI's known frame duration; and
perform dynamic interference cancellation and excision (DICE) of the at least one SNOI with the set of receiver feed combining weights.

11. The radio receiver recited in claim 10, wherein the instructions executable by the at least one processor to at least one of receive, calculate, and perform is implemented as an appliqu.

12. The radio receiver recited in claim 10, wherein the plurality of receiver feeds are coupled to at least one of a spatially diverse antenna array and a polarization diverse antenna array.

13. The radio receiver recited in claim 10, wherein the instructions executable by the at least one processor to perform DICE exploits at least one of diversity signature, timing offset, and carrier offset between the at least one SOI and the at least one SNOI.

14. The radio receiver recited in claim 10, wherein one or more of the at least one SOI and the at least one SNOI comprises a commercial cellular waveform.

15. The radio receiver recited in claim 14, wherein the commercial cellular waveform comprises at least one of a 2G waveform, a 2.5G waveform, a 3G waveform, a 4G waveform, a 5G waveform, and a millimeter waveform.

16. The radio receiver recited in claim 10, wherein one or more of the at least one SOI and the at least one SNOI comprises a wireless local area networking waveform.

17. The radio receiver recited in claim 10, wherein the at least one SNOI comprises a satellite uplink emission.

18. The radio receiver recited in claim 10, wherein the at least one SOI comprises a periodic component.

19. A computer program product, comprising a computer-readable hardware storage device having computer-readable program code stored therein, the program code containing instructions executable by one or more processors of a computer system to:
  receive at least one signal of interest (SOI) and at least one signal not of interest (SNOI) from each of a plurality of receiver feeds;
  calculate a set of receiver feed combining weights based on temporal coherence peaks occurring at intervals, wherein the intervals corresponding to the at least one SOI's known frame duration; and
  perform dynamic interference cancellation and excision (DICE) of the at least one SNOI with the set of receiver feed combining weights.

20. The computer program product recited in claim 19, wherein the at least one SOI comprises a periodic component.

* * * * *